United States Patent
Yang et al.

(10) Patent No.: US 9,245,354 B2
(45) Date of Patent: Jan. 26, 2016

(54) SYSTEM AND METHOD HAVING TRANSPARENT COMPOSITE MODEL FOR TRANSFORM COEFFICIENTS

(71) Applicant: En-hui Yang, Petersburg (CA)

(72) Inventors: En-hui Yang, Petersburg (CA); Xiang Yu, Kitchener (CA); Jin Meng, Waterloo (CA); Chang Sun, Kitchener (CA)

(73) Assignee: En-hui Yang (CA)

( * ) Notice: Subject to any disclaimer, the term of this patent is extended or adjusted under 35 U.S.C. 154(b) by 124 days.

(21) Appl. No.: 14/273,636

(22) Filed: May 9, 2014

(65) Prior Publication Data

US 2014/0348438 A1 Nov. 27, 2014

Related U.S. Application Data

(60) Provisional application No. 61/827,321, filed on May 24, 2013.

(51) Int. Cl.
*G06K 9/46* (2006.01)
*G06T 9/00* (2006.01)
*H04N 19/126* (2014.01)
(Continued)

(52) U.S. Cl.
CPC .............. *G06T 9/00* (2013.01); *H04N 19/126* (2014.11); *H04N 19/136* (2014.11); *H04N 19/18* (2014.11); *H04N 19/625* (2014.11)

(58) Field of Classification Search
CPC ........ G06T 9/00; H03M 7/30; H03M 7/3059; H03M 7/3079; H03M 7/607; H04N 19/126; H04N 19/136; H04N 19/18; H04N 19/625

USPC ....................................................... 382/248
See application file for complete search history.

(56) References Cited

U.S. PATENT DOCUMENTS 6,005,916 A * 12/1999 Johnson .................. A61B 5/05
378/87
6,233,361 B1 * 5/2001 Downs .................. G01S 7/4802
348/E5.064

(Continued)

OTHER PUBLICATIONS

Image Processing Principles and Applications; Tinku Acharya and Ajoy K. Ray; Wiley-Interscience; A John Wiley & Sons, Inc., Publication; Copyright 2005.

(Continued)

*Primary Examiner* — Ali Bayat
(74) *Attorney, Agent, or Firm* — Dureska, Kennedy & Moore, L.L.C.; Bent L. Moore; David P. Dureska

(57) ABSTRACT

To better handle the flat tail phenomenon commonly seen in transform coefficients such as DCT coefficients, a system and method having a model dubbed a transparent composite model (TCM) are described. Given a sequence of transform coefficients, a TCM first separates the tail of the sequence from the main body of the sequence. A first distribution such as a uniform, truncated Laplacian, or truncated geometric distribution can be used to model transform coefficients in the flat tail while at least one parametric distribution (e.g. truncated Laplacian, generalized Gaussian (GG), and geometric distributions) can be used to model data in the main body. A plurality of boundary values can be used to bound a plurality of distribution models. The plurality of boundary values and other parameters of the TCM can be estimated via maximum likelihood (ML) estimation or greedy estimation.

30 Claims, 28 Drawing Sheets

(51) Int. Cl.
*H04N 19/136* (2014.01)
*H04N 19/18* (2014.01)
*H04N 19/625* (2014.01)

(56) References Cited

U.S. PATENT DOCUMENTS

| | | | | |
|---|---|---|---|---|
| 6,366,614 | B1* | 4/2002 | Pian | H04N 19/176 375/240.02 |
| 2010/0246673 | A1* | 9/2010 | Tanaka | H04N 19/44 375/240.12 |
| 2015/0286785 | A1* | 10/2015 | Hielscher | A61B 5/0073 382/131 |

OTHER PUBLICATIONS

Modeling of the DCT Coefficients of Images; M.I.H. Bhuiyan; M. Omair Ahmad, Fellow, IEEE, and M.N.S. Swamy, Fellow, IEEE; pp. 272-275; Copyright 2008 IEEE.

On the Distribution of the DCT Coefficients; T. Eude; R. Grisel, H. Cherifi and R. Debrie; pp. V-365-V368; Copyright 1994 IEEE.

A Mathematical Analysis of the DCT Coefficient Distributions for Images; IEEE Transactions on Image Processing, vol. 9, No. 10, Oct. 2000; Edmund Y. Lam, Member, IEEE, and Joseph W. Goodman, Fellow, IEEE; pp. 1661-1666.

Adaptive Runlength Coding; IEEE Signal Processing Letters, vol. 10, No. 3, Mar. 2003; Chengjie Tu, Student Member, IEEE, and Trac D. Tran, Member IEEE; pp. 61-64.

Context-Based Entropy Coding of Block Transform Coefficients for Image Compression; IEEE Transactions on Image Processing, vol. 11, No. 11, Nov. 2002; Chengjie Tu, Student Member, IEEE, and Trac D. Tran, Member, IEEE.

Context-Based, Adaptive, Lossless Image Coding; IEEE Transactions on Communications, vol. 45, No. 4, Apr. 1997; Xiaolin Wu, Senior Member, IEEE, and Nasir Memon, Member, IEEE; pp. 437-444.

Distribution shape of two-dimensional DCT coefficients of natural images; F. Muller; Electronics Letters, Oct. 28, 1993, vol. 29 No. 22; pp. 1935-1936.

Efficient Scalar Quantization of Exponential and Laplacian Random Variables; IEEE Transactions on Information Theory, vol. 42, No. 5, Sep. 1996; pp. 1365-1374.

Frame Bit Allocation for the H.264/AVC Video Coder Via Cauchy-Density-Based Rate and Distortion Models; IEEE Transactions on Circuits and Systems for Video Technology, vol. 15, No. 8, Aug. 2005; Nejat Kamaci, Stodent Member, IEEE, Yucel Altunbasak, Senior Member, IEEE, and Russell M. Mersereau, Fellow, IEEE; pp. 994-1006.

Gaussian DCT Coefficient Models; Saralees Nadarajah; Acta Appl Math (2009) 106: 455-472; Received: May 5, 2008/Accepted: Aug. 21, 2008/ Published online: Sep. 11, 2008; Copyright Springer Science+Business Media B.V. 2008.

Hidden Messages in Heavy-Tails: DCT-Domain Watermark Detection Using Alpha-Stable Models; IEEE Transactions on Multimedia, vol. 7, No. 4, Aug. 2005; Alexia Briassouli, Panagiotis Tsakalides, Member, IEEE, and Athanasios Stouraitis, Senior Member, IEEE; pp. 700-715.

Mathematical Statistics and Data Analysis; Second Edition; John A. Rice; University of California, Berkeley; Duxbury Press; An Imprint of Wadsworth Publishing Company, Belmont, California; Copyright 1995 by Wadsworth, Inc.

Modeling DCT Coefficients for Fast Video Encoding; IEEE Transactions on Circuits and Systems for Video Technology, vol. 9, No. 4, Jun. 1999; I-Ming Pao and Ming-Ting Sun, Fello, IEEE; pp. 608-618.

Wavelet-Based Texture Retrieval Using Generalized Gaussian Density and Kullback—Leibler Distance; IEEE Transactions on Image Processing, vol. 11, No. 2, Feb. 2002; Minh N. Do, Member, IEEE and Martin Vetterli, Fellow, IEEE; pp. 146-158.

Overview of the High Efficiency Video Coding (HEVC) Standard; IEEE Transactions on Circuits and Systems for Video Technology, vol. 22, No. 12, Dec. 2012; Gary J. Sullivan, Fellow, IEEE, Jens-Rainer Ohm, Member, IEEE, Woo-Jin Han, Member, IEEE, and Thomas Wiegand, Fellow, IEEE; pp. 1649-1558.

* cited by examiner

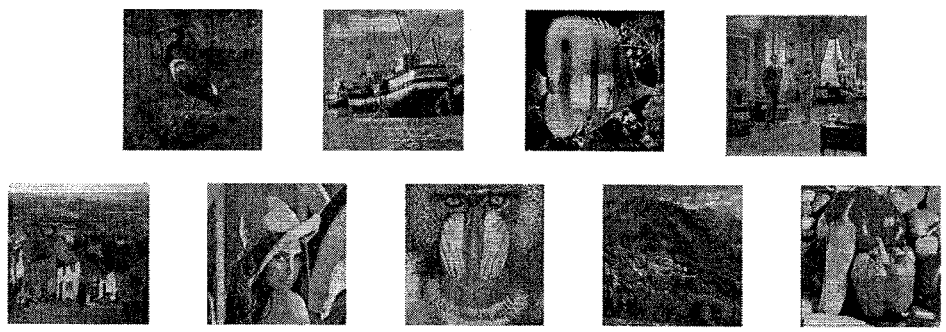
Figure 6: Test image set 1.
Figure 7: Test image set 2.
Figure 8: Test image set 3.

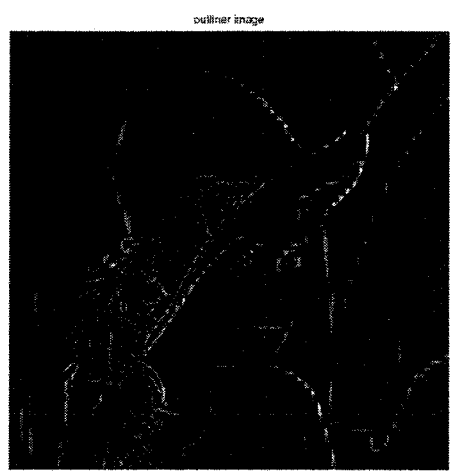
Figure 10

Algorithm 1: An algorithm for computing the ML estimate of $(y_c, b, \theta)$ in a general continuous TCM 1. Sort $\{|Y_i|\}_{i=1}^n$ in ascending order into $W_1 \leq W_2 \leq \cdots \leq W_n$.
2. Determine
$$m = \min\{i : W_i \geq d\}$$
the smallest integer $i$ such that $W_i \geq d$.
3. For each $y_c \in \{d, W_m, W_{m+1}, \cdots, W_n\}$, do
4.     Set
$$N_1^+(y_c) = \{i : |Y_i| \leq y_c\} \text{ and } N_1(y_c) = \{i : |Y_i| < y_c\}.$$
5.     Compute
$$b^+(y_c) = \frac{|N_1^+(y_c)|}{n} \text{ and } b^-(y_c) = \frac{|N_1(y_c)|}{n}.$$
6.     Determine $\theta^+(y_c)$ and $\theta^-(y_c)$ to be the ML estimate of $\theta$ for the truncated distribution $\frac{1}{2F(y_c|\theta)-1} f(y|\theta)$ over the sample sets $\{Y_i : i \in N_1^+(y_c)\}$ and $\{Y_i : i \in N_1(y_c)\}$, respectively.
7.     If $g^+(y_c, b^+(y_c), \theta^+(y_c)|Y_1^n) \geq g^-(y_c, b^-(y_c), \theta^-(y_c)|Y_1^n)$, then
8.         set $(b(y_c), \theta(y_c)) = (b^+(y_c), \theta^+(y_c))$
9.     else
10.        set $(b(y_c), \theta(y_c)) = (b^-(y_c), \theta^-(y_c))$.
11.     end if
12. end for
13. Determine
$$y_c^* = \arg\max_{y_c \in \{d, W_m, \cdots, W_n\}} g(y_c, b(y_c), \theta(y_c)|Y_1^n).$$
14. Set $b^* = b(y_c^*)$ and $\theta^* = \theta(y_c^*)$.

Figure 12

Algorithm 2: An iterative algorithm for computing the ML estimate of $\lambda$ in a truncated Laplacian distribution 1. Compute
$$C = \frac{1}{|S|}\sum_{i \in S} |Y_i|.$$
2. If $C = 0$, then
3.     Set $\lambda_{y_c} = 0$;
4. else
5.     if $C \geq y_c/2$, then
6.         Set $\lambda_{y_c} = \infty$;
7.     else
8.         Initialization: set $\lambda_0 = C$;
9.         For $i \geq 1$, compute
$$\lambda_i = C + \frac{y_c \cdot e^{-y_c/\lambda_{i-1}}}{1 - e^{-y_c/\lambda_{i-1}}}; \qquad (25)$$
10.         Repeat Step 9 for $i = 1, 2, \cdots$ until $\lambda_i - \lambda_{i-1} < \varepsilon$, where $\varepsilon > 0$ is a small prescribed threshold, and then output the final $\lambda_i$ as an approximation for $\lambda_{y_c}$.
11.     end if
12. end if

Figure 13

Algorithm 3: An iterative algorithm for computing the ML estimate $\lambda_K$ of $\lambda$ in a truncated geometric distribution 1. If $K = 1$, then
2.     Select $\lambda_1 > 0$ arbitrarily.
3. else
4.     Compute
$$C = \frac{1}{|N_1(K)|} \sum_{j \in N_1(K)} (|u_j| - 1).$$
5.     if $C = 0$, then
6.         Set $\lambda_K = 0$;
7.     else
8.         if $C \geq \frac{K-1}{2}$, then
9.             Set $\lambda_K = \infty$;
10.         else
11.             Initialization: set $C_0 = C$ and $\lambda^{(0)} = q/\ln\frac{1+C_0}{C_0}$.
12.             For $i \geq 1$, compute
$$\begin{cases} C_i = C + \frac{K}{e^{Kq/\lambda^{(i-1)}} - 1} \\ \lambda^{(i)} = \frac{q}{\ln\frac{1+C_i}{C_i}} \end{cases} \quad (38)$$
13.             Repeat Step 12 for $i = 1, 2, \cdots$ until $\lambda^{(i)} - \lambda^{(i-1)} < \varepsilon$, where $\varepsilon > 0$ is a small prescribed threshold, and then output the final $\lambda^{(i)}$ as an approximation for $\lambda_K$.
14.         end if
15.     end if
16. end if

Figure 14

Algorithm 4: An algorithm for computing the ML estimate $(b^*, p^*, \lambda^*, K^*)$ in the GMTCM.

1. Determine $N_0 = \{j : u_j = 0\}$.
2. For $K = 1, 2, \cdots, a$, do
3.     Set $N_1(K) = \{j : 0 < |u_j| \leq K\}$, and $N_2(K) = \{j : |u_j| > K\}$.
4.     Compute
$$b(K) = \frac{|N_0| + |N_1(K)|}{n}$$
$$p(K) = \frac{|N_0|}{|N_0| + |N_1(K)|}$$
5.     Determine $\lambda_K$ according to Algorithm 3.
6. End for
7. Determine
$$K^* = arg\ max_{1 \leq K \leq a} G(K, b(K), p(K), \lambda_K). \quad (39)$$
8. Set $b^* = b(K^*)$, $p^* = p(K^*)$, and $\lambda^* = \lambda(K^*)$.

Figure 15

Table 1: Overall comparisons between the LPTCM and GG model for 9 images for continuous DCT coefficients.

| | bird | boat | fish | couple | Hill | Lenna | Baboon | Mountain | Pepper |
|---|---|---|---|---|---|---|---|---|---|
| $w_{\chi^2}(\%)$ | 98 | 60 | 8 | 68 | 68 | 67 | 51 | 84 | 87 |

Figure 16

Table 2: Overall comparisons between the GMTCM and GG model for all images coded using JPEG with QF= 100.

| | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 95 | 38 | 100 | 44 | 59 | 60 | 49 | 48 | 71 | 95 | 78 | 8 | 48 | 52 | 83 | 62 | 40 | 60 |
| $w_{\chi^2}$ (%) | 98 | 57 | 100 | 59 | 67 | 67 | 52 | 83 | 84 | 83 | 89 | 8 | 62 | 52 | 89 | 71 | 65 | 65 |

Figure 17

Table 3: Overall comparisons between the GMTCM and GG model for all images coded using JPEG with QF= 90.

| | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 89 | 73 | 97 | 69 | 82 | 75 | 79 | 83 | 85 | 100 | 92 | 79 | 86 | 78 | 93 | 76 | 85 | 75 |
| $w_{\chi^2}$ (%) | 95 | 73 | 98 | 67 | 80 | 71 | 79 | 84 | 87 | 98 | 90 | 78 | 79 | 73 | 91 | 73 | 89 | 75 |

Figure 18

Table 4: Overall comparisons between the GMTCM and GG model for all images coded using JPEG with QF= 80.

| | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 98 | 76 | 98 | 79 | 88 | 79 | 86 | 81 | 86 | 100 | 97 | 87 | 86 | 70 | 94 | 80 | 91 | 85 |
| $w_{\chi^2}$ (%) | 98 | 78 | 90 | 79 | 82 | 74 | 84 | 83 | 86 | 100 | 95 | 81 | 86 | 68 | 91 | 78 | 95 | 79 |

Figure 19

Table 5: Overall comparisons between the GMTCM and GG model for all images coded using JPEG with QF= 70.

| | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 94 | 83 | 95 | 82 | 79 | 77 | 90 | 98 | 84 | 98 | 98 | 87 | 89 | 73 | 97 | 85 | 95 | 87 |
| $w_{\chi^2}$ (%) | 97 | 83 | 89 | 79 | 91 | 80 | 84 | 94 | 87 | 98 | 97 | 87 | 89 | 75 | 94 | 85 | 95 | 83 |

Figure 20

Table 6: The $\chi^2$ distances by the GG model, GMTCM, and Laplacian model for all 63 ACs from JPEG-coded image 'bird' with QF= 100.

| | DC | AC$_1$ | AC$_2$ | AC$_3$ | AC$_4$ | AC$_5$ | AC$_6$ | AC$_7$ |
|---|---|---|---|---|---|---|---|---|
| $\chi^2_{GGD}$ | / | 1865.8 | 8306.8 | 143029.2 | 573.7 | 3083254.5 | 1209.3 | 393208.6 |
| $\chi^2_{GMTCM}$ | / | 626.4 | 400.2 | 354.0 | 165.7 | 196.9 | 117.9 | 214.2 |
| $\chi^2_{Lap}$ | / | 13693.8 | 1167961.2 | 24820290.1 | 2864.0 | 54766368.0 | 14985.7 | 2147913.6 |
| | AC$_8$ | AC$_9$ | AC$_{10}$ | AC$_{11}$ | AC$_{12}$ | AC$_{13}$ | AC$_{14}$ | AC$_{15}$ |
| $\chi^2_{GGD}$ | 725.9 | 970.9 | 3402.4 | 1691.2 | 971.8 | 297.2 | 3151.8 | 1688.5 |
| $\chi^2_{GMTCM}$ | 625.9 | 291.7 | 283.3 | 212.4 | 117.4 | 83.2 | 110.7 | 108.2 |
| $\chi^2_{Lap}$ | 1268.3 | 4270.2 | 119380.5 | 31807.7 | 6085.1 | 411.4 | 16082.8 | 3419.1 |
| | AC$_{16}$ | AC$_{17}$ | AC$_{18}$ | AC$_{19}$ | AC$_{20}$ | AC$_{21}$ | AC$_{22}$ | AC$_{23}$ |
| $\chi^2_{GGD}$ | 323.0 | 2486.4 | 1090.2 | 5094.3 | 16945.6 | 92796.0 | 1548.0 | 4859.1 |
| $\chi^2_{GMTCM}$ | 323.1 | 386.2 | 335.3 | 149.0 | 146.3 | 163.2 | 94.6 | 128.7 |
| $\chi^2_{Lap}$ | 936.5 | 232262.8 | 16655.1 | 216901.8 | 90093.3 | 1133827.9 | 5835.9 | 7650.7 |
| | AC$_{24}$ | AC$_{25}$ | AC$_{26}$ | AC$_{27}$ | AC$_{28}$ | AC$_{29}$ | AC$_{30}$ | AC$_{31}$ |
| $\chi^2_{GGD}$ | 524.0 | 11203.6 | 1521.0 | 1719.7 | 66035.3 | 1405.5 | 401.2 | 669.0 |
| $\chi^2_{GMTCM}$ | 255.9 | 293.2 | 121.8 | 102.6 | 127.8 | 89.2 | 48.8 | 75.5 |
| $\chi^2_{Lap}$ | 1626.7 | 272019.0 | 11216.7 | 3628.5 | 124178.4 | 1359.2 | 509.2 | 406.9 |
| | AC$_{32}$ | AC$_{33}$ | AC$_{34}$ | AC$_{35}$ | AC$_{36}$ | AC$_{37}$ | AC$_{38}$ | AC$_{39}$ |
| $\chi^2_{GGD}$ | 371.6 | 14887.1 | 5097.1 | 2624.6 | 1549.7 | 5950.8 | 149.4 | 163.2 |
| $\chi^2_{GMTCM}$ | 211.1 | 183.6 | 137.9 | 143.8 | 74.5 | 72.8 | 62.4 | 79.0 |
| $\chi^2_{Lap}$ | 839.4 | 448377.9 | 35570.0 | 7394.5 | 5400.7 | 955.2 | 207.0 | 276.6 |
| | AC$_{40}$ | AC$_{41}$ | AC$_{42}$ | AC$_{43}$ | AC$_{44}$ | AC$_{45}$ | AC$_{46}$ | AC$_{47}$ |
| $\chi^2_{GGD}$ | 542.4 | 753.5 | 1106.4 | 2986.5 | 640.6 | 8886.9 | 90.3 | 325.7 |
| $\chi^2_{GMTCM}$ | 191.6 | 199.1 | 145.2 | 70.9 | 51.7 | 86.5 | 52.7 | 125.2 |
| $\chi^2_{Lap}$ | 3143.8 | 4156.0 | 2946.3 | 1112.4 | 1004.9 | 2871.7 | 111.1 | 217.1 |
| | AC$_{48}$ | AC$_{49}$ | AC$_{50}$ | AC$_{51}$ | AC$_{52}$ | AC$_{53}$ | AC$_{54}$ | AC$_{55}$ |
| $\chi^2_{GGD}$ | 269.7 | 322.4 | 1268.6 | 2242.9 | 173.9 | 204.2 | 154.5 | 296.6 |
| $\chi^2_{GMTCM}$ | 80.5 | 80.3 | 72.0 | 65.1 | 44.7 | 46.8 | 67.8 | 173.4 |
| $\chi^2_{Lap}$ | 347.2 | 448.7 | 2625.0 | 7492.4 | 291.8 | 1815.9 | 685.3 | 37040.2 |
| | AC$_{56}$ | AC$_{57}$ | AC$_{58}$ | AC$_{59}$ | AC$_{60}$ | AC$_{61}$ | AC$_{62}$ | AC$_{63}$ |
| $\chi^2_{GGD}$ | 357.9 | 5109.4 | 11828.1 | 299.5 | 166.1 | 349.8 | 485.2 | 1422.4 |
| $\chi^2_{GMTCM}$ | 106.8 | 158.9 | 108.7 | 87.4 | 63.5 | 108.1 | 188.9 | 455.8 |
| $\chi^2_{Lap}$ | 926.2 | 22503.0 | 151694.1 | 217.1 | 320.9 | 205.3 | 1491.4 | 1485.5 |

Figure 21

Table 7: The $\chi^2$ distances by the GG model, GMTCM, and Laplacian model for all 63 ACs from JPEG-coded image 'boat' with QF= 100.

|  | DC | $AC_1$ | $AC_2$ | $AC_3$ | $AC_4$ | $AC_5$ | $AC_6$ | $AC_7$ |
|---|---|---|---|---|---|---|---|---|
| $\chi^2_{GGD}$ | / | 718.6 | 620.4 | 557.8 | 477.3 | 545.8 | 424.7 | 585.6 |
| $\chi^2_{GMTCM}$ | / | 1485.9 | 1746.8 | 1547.5 | 1006.4 | 704.1 | 420.7 | 263.4 |
| $\chi^2_{Lap}$ | / | 23188.5 | 1602820.9 | 2277420.6 | 87297.8 | 84635.5 | 22433.5 | 9073.9 |
|  | $AC_8$ | $AC_9$ | $AC_{10}$ | $AC_{11}$ | $AC_{12}$ | $AC_{13}$ | $AC_{14}$ | $AC_{15}$ |
| $\chi^2_{GGD}$ | 625.6 | 350.8 | 428.2 | 372.8 | 426.1 | 544.3 | 385.0 | 514.5 |
| $\chi^2_{GMTCM}$ | 1033.2 | 644.9 | 869.8 | 708.7 | 831.5 | 585.9 | 233.0 | 177.3 |
| $\chi^2_{Lap}$ | 4716.9 | 2929.6 | 56551.9 | 26189.7 | 105759.6 | 173222.2 | 2525.0 | 2154.7 |
|  | $AC_{16}$ | $AC_{17}$ | $AC_{18}$ | $AC_{19}$ | $AC_{20}$ | $AC_{21}$ | $AC_{22}$ | $AC_{23}$ |
| $\chi^2_{GGD}$ | 353.4 | 210.4 | 359.9 | 295.7 | 386.4 | 811.7 | 1781.4 | 5439.2 |
| $\chi^2_{GMTCM}$ | 1056.5 | 715.0 | 509.7 | 426.2 | 342.7 | 232.0 | 261.4 | 140.8 |
| $\chi^2_{Lap}$ | 2067.7 | 7645.7 | 11720.4 | 9907.7 | 10029.4 | 15323.1 | 24484.1 | 15670.3 |
|  | $AC_{24}$ | $AC_{25}$ | $AC_{26}$ | $AC_{27}$ | $AC_{28}$ | $AC_{29}$ | $AC_{30}$ | $AC_{31}$ |
| $\chi^2_{GGD}$ | 423.1 | 253.4 | 627.2 | 345.9 | 263.7 | 612.9 | 4627.0 | 311.7 |
| $\chi^2_{GMTCM}$ | 1161.9 | 519.6 | 402.4 | 317.8 | 217.5 | 169.7 | 90.5 | 82.0 |
| $\chi^2_{Lap}$ | 305790.3 | 47552.3 | 161111.6 | 6907.1 | 776.7 | 3291.2 | 3625.1 | 163.1 |
|  | $AC_{32}$ | $AC_{33}$ | $AC_{34}$ | $AC_{35}$ | $AC_{36}$ | $AC_{37}$ | $AC_{38}$ | $AC_{39}$ |
| $\chi^2_{GGD}$ | 217.0 | 205.3 | 480.7 | 282.3 | 697.8 | 1489.9 | 19910.2 | 702.5 |
| $\chi^2_{GMTCM}$ | 520.7 | 221.2 | 250.4 | 164.5 | 98.6 | 84.9 | 114.4 | 90.6 |
| $\chi^2_{Lap}$ | 1957.0 | 864.1 | 27640.4 | 385.2 | 1122.3 | 442.3 | 538.8 | 143.8 |
|  | $AC_{40}$ | $AC_{41}$ | $AC_{42}$ | $AC_{43}$ | $AC_{44}$ | $AC_{45}$ | $AC_{46}$ | $AC_{47}$ |
| $\chi^2_{GGD}$ | 181.0 | 971.7 | 5953.7 | 989.6 | 281.1 | 492.0 | 88.4 | 221.1 |
| $\chi^2_{GMTCM}$ | 239.5 | 118.2 | 162.8 | 105.4 | 59.7 | 106.8 | 75.4 | 100.0 |
| $\chi^2_{Lap}$ | 830.9 | 5867.0 | 8405.0 | 1626.7 | 144.8 | 195.7 | 180.1 | 162.9 |
|  | $AC_{48}$ | $AC_{49}$ | $AC_{50}$ | $AC_{51}$ | $AC_{52}$ | $AC_{53}$ | $AC_{54}$ | $AC_{55}$ |
| $\chi^2_{GGD}$ | 179.6 | 165.0 | 2095.7 | 991.8 | 78.8 | 83.1 | 44.1 | 275670.1 |
| $\chi^2_{GMTCM}$ | 84.0 | 72.9 | 54.7 | 82.8 | 94.8 | 87.9 | 116.8 | 153.2 |
| $\chi^2_{Lap}$ | 361.6 | 166.9 | 406.7 | 234.6 | 229.2 | 192.5 | 195.5 | 267.2 |
|  | $AC_{56}$ | $AC_{57}$ | $AC_{58}$ | $AC_{59}$ | $AC_{60}$ | $AC_{61}$ | $AC_{62}$ | $AC_{63}$ |
| $\chi^2_{GGD}$ | 114.5 | 162.0 | 186.3 | 29792.0 | 57.3 | 21.8 | 19.5 | 35.8 |
| $\chi^2_{GMTCM}$ | 50.2 | 80.6 | 58.4 | 121.8 | 130.0 | 92.8 | 116.8 | 63.5 |
| $\chi^2_{Lap}$ | 158.5 | 263.7 | 201.5 | 232.4 | 263.2 | 237.3 | 235.6 | 207.1 |

Figure 22

Table 8: The $\chi^2$ distances by the GG model, GMTCM, and Laplacian model for all 63 ACs from JPEG-coded image 'CS' with QF= 100.

| | DC | $AC_1$ | $AC_2$ | $AC_3$ | $AC_4$ | $AC_5$ | $AC_6$ | $AC_7$ |
|---|---|---|---|---|---|---|---|---|
| $\chi^2_{GGD}$ | / | 2799.9 | 2398.3 | 2294.5 | 16763.2 | 1278.9 | 2351.4 | 1748.8 |
| $\chi^2_{GMTCM}$ | / | 7160.3 | 11997.5 | 9240.4 | 8985.5 | 7275.2 | 5793.4 | 6573.5 |
| $\chi^2_{Lap}$ | / | $> 10^8$ | $> 10^8$ | $> 10^8$ | $> 10^8$ | $> 10^8$ | $> 10^8$ | $> 10^8$ |
| | $AC_8$ | $AC_9$ | $AC_{10}$ | $AC_{11}$ | $AC_{12}$ | $AC_{13}$ | $AC_{14}$ | $AC_{15}$ |
| $\chi^2_{GGD}$ | 1521.0 | 1628.4 | 1955.1 | 2326.6 | 4478.9 | 3068.7 | 2547.9 | 1620.9 |
| $\chi^2_{GMTCM}$ | 4892.6 | 10174.5 | 12482.9 | 10228.5 | 7571.3 | 5378.6 | 4246.4 | 4253.3 |
| $\chi^2_{Lap}$ | 1594300.4 | $> 10^8$ | $> 10^8$ | $> 10^8$ | $> 10^8$ | $> 10^8$ | $> 10^8$ | $> 10^8$ |
| | $AC_{16}$ | $AC_{17}$ | $AC_{18}$ | $AC_{19}$ | $AC_{20}$ | $AC_{21}$ | $AC_{22}$ | $AC_{23}$ |
| $\chi^2_{GGD}$ | 1848.8 | 2361.8 | 1525.7 | 3405.3 | 1148.9 | 812.9 | 992.0 | 1219.4 |
| $\chi^2_{GMTCM}$ | 7358.3 | 9899.6 | 11444.2 | 6551.7 | 8780.9 | 4704.3 | 3857.4 | 4044.8 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
| | $AC_{24}$ | $AC_{25}$ | $AC_{26}$ | $AC_{27}$ | $AC_{28}$ | $AC_{29}$ | $AC_{30}$ | $AC_{31}$ |
| $\chi^2_{GGD}$ | 5870.0 | 792.0 | 4033.0 | 907.4 | 3365.9 | 1733.2 | 975.6 | 3447.1 |
| $\chi^2_{GMTCM}$ | 7636.3 | 6833.0 | 8219.8 | 6433.3 | 6765.8 | 5048.2 | 4059.7 | 3794.9 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
| | $AC_{32}$ | $AC_{33}$ | $AC_{34}$ | $AC_{35}$ | $AC_{36}$ | $AC_{37}$ | $AC_{38}$ | $AC_{39}$ |
| $\chi^2_{GGD}$ | 6533.3 | 692.6 | 982.0 | 873.1 | 1395.8 | 1077.2 | 11402.8 | 738.4 |
| $\chi^2_{GMTCM}$ | 9725.8 | 6178.1 | 6915.2 | 5711.3 | 5990.6 | 4916.0 | 3471.8 | 3775.0 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
| | $AC_{40}$ | $AC_{41}$ | $AC_{42}$ | $AC_{43}$ | $AC_{44}$ | $AC_{45}$ | $AC_{46}$ | $AC_{47}$ |
| $\chi^2_{GGD}$ | 10212.4 | 1230.0 | 4877.1 | 521.9 | 1798.3 | 1420.5 | 536.3 | 2454.8 |
| $\chi^2_{GMTCM}$ | 9403.3 | 5657.7 | 5233.7 | 4510.4 | 4307.2 | 4036.9 | 3405.1 | 3564.0 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
| | $AC_{48}$ | $AC_{49}$ | $AC_{50}$ | $AC_{51}$ | $AC_{52}$ | $AC_{53}$ | $AC_{54}$ | $AC_{55}$ |
| $\chi^2_{GGD}$ | 7909.4 | 683.0 | 1561.2 | 1062.2 | 712.8 | 790.4 | 766.2 | 1676.7 |
| $\chi^2_{GMTCM}$ | 7141.0 | 5332.0 | 4684.6 | 4992.8 | 4659.5 | 3772.5 | 3946.3 | 3919.4 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
| | $AC_{56}$ | $AC_{57}$ | $AC_{58}$ | $AC_{59}$ | $AC_{60}$ | $AC_{61}$ | $AC_{62}$ | $AC_{63}$ |
| $\chi^2_{GGD}$ | 1016.9 | 669.2 | 1658.9 | 4382.9 | 5712.8 | 613.0 | 782.9 | 1445.4 |
| $\chi^2_{GMTCM}$ | 7528.6 | 5458.6 | 4388.5 | 4634.2 | 4637.1 | 3633.6 | 3808.7 | 4561.8 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |

Figure 23

Table 9: The $\chi^2$ distances by the GG model, GMTCM, and Laplacian model for all 63 ACs from JPEG-coded image 'CS' with QF= 90.

|  | DC | AC$_1$ | AC$_2$ | AC$_3$ | AC$_4$ | AC$_5$ | AC$_6$ | AC$_7$ |
|---|---|---|---|---|---|---|---|---|
| $\chi^2_{GGD}$ | / | 2064.6 | 1373.0 | 1031.1 | 3161.8 | 2111.8 | 1923.2 | 1913.3 |
| $\chi^2_{GMTCM}$ | / | 6234.6 | 6433.3 | 3214.5 | 1333.2 | 810.0 | 576.0 | 542.0 |
| $\chi^2_{Lap}$ | / | 80069048.4 | $> 10^8$ | $> 10^8$ | $> 10^8$ | $> 10^8$ | $> 10^8$ | $> 10^8$ |
|  | AC$_8$ | AC$_9$ | AC$_{10}$ | AC$_{11}$ | AC$_{12}$ | AC$_{13}$ | AC$_{14}$ | AC$_{15}$ |
| $\chi^2_{GGD}$ | 839.5 | 970.0 | 1045.0 | 1211.6 | 1134.3 | 867.5 | 1159.2 | 1645.9 |
| $\chi^2_{GMTCM}$ | 4139.8 | 7612.2 | 3355.0 | 1548.3 | 772.6 | 352.4 | 239.3 | 191.6 |
| $\chi^2_{Lap}$ | 844862.7 | $> 10^8$ | $> 10^8$ | $> 10^8$ | $> 10^8$ | $> 10^8$ | $> 10^8$ | $> 10^8$ |
|  | AC$_{16}$ | AC$_{17}$ | AC$_{18}$ | AC$_{19}$ | AC$_{20}$ | AC$_{21}$ | AC$_{22}$ | AC$_{23}$ |
| $\chi^2_{GGD}$ | 798.9 | 986.4 | 798.4 | 1046.6 | 2353.3 | 3106.8 | 7932.9 | 1605.4 |
| $\chi^2_{GMTCM}$ | 4912.7 | 3697.1 | 2648.6 | 746.2 | 439.4 | 138.8 | 133.6 | 236.2 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
|  | AC$_{24}$ | AC$_{25}$ | AC$_{26}$ | AC$_{27}$ | AC$_{28}$ | AC$_{29}$ | AC$_{30}$ | AC$_{31}$ |
| $\chi^2_{GGD}$ | 3396.9 | 496.1 | 1229.7 | 1276.2 | 770.4 | 2155.0 | 13454.7 | 1425.8 |
| $\chi^2_{GMTCM}$ | 4178.0 | 1842.1 | 1117.4 | 475.1 | 299.2 | 97.3 | 158.3 | 223.6 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
|  | AC$_{32}$ | AC$_{33}$ | AC$_{34}$ | AC$_{35}$ | AC$_{36}$ | AC$_{37}$ | AC$_{38}$ | AC$_{39}$ |
| $\chi^2_{GGD}$ | 2068.5 | 619.6 | 989.6 | 4952.7 | 4227.2 | 3825.0 | 17052.5 | 4682.8 |
| $\chi^2_{GMTCM}$ | 3242.1 | 1481.0 | 577.6 | 232.0 | 148.2 | 98.0 | 49.8 | 117.0 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
|  | AC$_{40}$ | AC$_{41}$ | AC$_{42}$ | AC$_{43}$ | AC$_{44}$ | AC$_{45}$ | AC$_{46}$ | AC$_{47}$ |
| $\chi^2_{GGD}$ | 2746.0 | 2182.2 | 3276.1 | 1867.3 | 20163.7 | 3692.8 | 10460.0 | 3205.8 |
| $\chi^2_{GMTCM}$ | 2033.3 | 577.4 | 235.9 | 135.4 | 144.6 | 46.0 | 71.0 | 81.8 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
|  | AC$_{48}$ | AC$_{49}$ | AC$_{50}$ | AC$_{51}$ | AC$_{52}$ | AC$_{53}$ | AC$_{54}$ | AC$_{55}$ |
| $\chi^2_{GGD}$ | 806.3 | 3255.5 | 1468.7 | 13230.9 | 5438.1 | 43188.2 | 80256.5 | 38402.9 |
| $\chi^2_{GMTCM}$ | 763.0 | 314.7 | 200.8 | 190.4 | 119.4 | 51.1 | 58.1 | 58.7 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |
|  | AC$_{56}$ | AC$_{57}$ | AC$_{58}$ | AC$_{59}$ | AC$_{60}$ | AC$_{61}$ | AC$_{62}$ | AC$_{63}$ |
| $\chi^2_{GGD}$ | 4765.6 | 10487.3 | 2637.0 | 3696.0 | 5416.9 | 8457.0 | 12351.7 | 11116.8 |
| $\chi^2_{GMTCM}$ | 561.6 | 204.3 | 121.9 | 83.0 | 85.9 | 49.4 | 57.5 | 73.5 |
| $\chi^2_{Lap}$ | $> 10^8$ | $> 10^8$ | $> 10^8$ | $> 10^8$ | $> 10^8$ | $> 10^8$ | $> 10^8$ | $> 10^8$ |

Figure 24

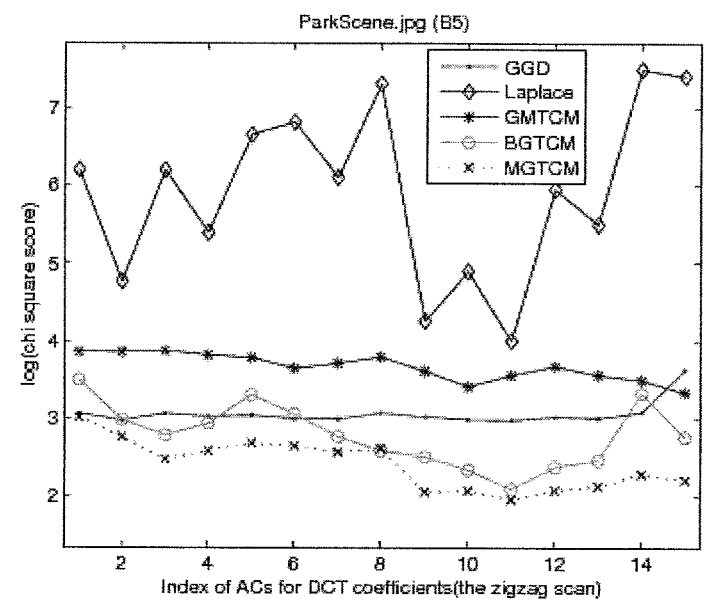
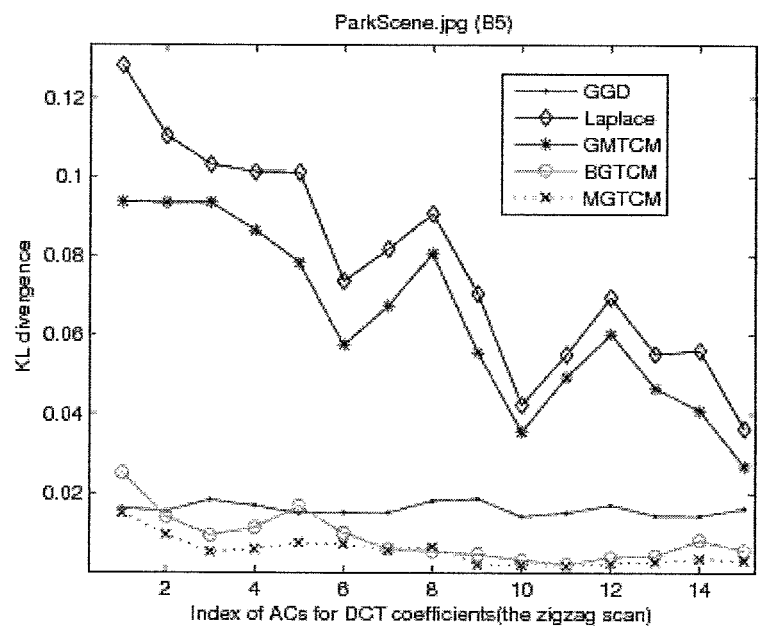
Figure 30

Algorithm 5: An algorithm for computing the ML estimate of $(y_{c_1}, b_1, \bar{\theta})$ in the bi-segment TCM.

1. Sort $\{|Y_i|\}_{i=1}^n$ in ascending order into $W_1 \leq W_2 \leq \cdots \leq W_n$.
2. Determine
$$m = \min\{i: W_i \geq d\}$$
the smallest integer $i$ such that $W_i \geq d$.
3. for each $y_c \in \{d, W_m, W_{m+1}, \cdots, W_n\}$ do
4.     Set
$$(b_1(y_{c_1}), \bar{\theta}(y_{c_1})) \triangleq arg\ max_{b_1, \bar{\theta}} g(y_{c_1}, b_1, \bar{\theta}|Y_1^n)$$
5. end for
6. Determine
$$y_{c_1}^* = arg\ max_{y_{c_1} \in \{d, W_m, W_{m+1}, \cdots, W_n\}} g(y_{c_1}, b_1(y_{c_1}), \bar{\theta}(y_{c_1})|Y_1^n)$$
7. Set $b_1^* = b_1(y_{c_1}^*)$ and $\bar{\theta}^* = \bar{\theta}(y_{c_1}^*)$.

Figure 31

Algorithm 6: A greedy algorithm for estimating $y_{c_1}$, $b_1$, and $\lambda_1$ in MLTCM.

1. Initialization: Set $y_s = 0$ and
$$W = (W_1, W_2, \cdots, W_n).$$
2. Determine an initial $T$ to be the minimum $T$ such that $T \geq T^*$, $W_T > 0$, and $W_{T+1} > W_T$. If no such $T$ exists, set $T = |W|$, the length of $W$, i.e., the number of samples in $W$, and compute $\lambda(W^T)$ as in (50) with $y_c = a - y_s$; then output $Y_c(W) = a - y_s$, $B(W) = \frac{T}{n}$, and $\Lambda(W) = \lambda(W^T)$ as estimates of $y_{c_1}$, $b_1$, and $\lambda_1$, respectively, and stop.
3. Compute $\lambda^+(W^T)$ and $\lambda^-(W^T)$ as in (52) and (53) with $y_c = W_T$, respectively.
4. Determine $\Delta T = |\{i: W_i = W_{T+1}\}|$.
5. Compute $\lambda(W^{T+\Delta T})$ as in (50) with $y_c = W_{T+\Delta T}$.
6. If $\lambda(W^{T+\Delta T}) \notin [\lambda^-(W^T), \lambda^+(W^T)]$, then $W^T$ and $W_{T+1}^{T+\Delta T}$ are deemed to come from different models. Compute $\lambda(W^T)$ as in (50) with $y_c = W_{T+\Delta T}$. Then output $Y_c(W) = W_{T+\Delta T}$, $B(W) = \frac{T}{n}$, and $\Lambda(W) = \lambda(W^T)$ as estimates of $y_{c_1}$, $b_1$, and $\lambda_1$, respectively, and stop.
7. Otherwise, $W^T$ and $W_{T+1}^{T+\Delta T}$ are deemed to come from the same Laplacian model. Update $T$ into $T + \Delta T$.
8. If $T = |W|$, output $Y_c(W) = W_T$, $B(W) = \frac{T}{n}$, and $\Lambda(W) = \lambda(W^T)$ as estimates of $y_{c_1}$, $b_1$, and $\lambda_1$, respectively, and stop.
9. Otherwise, go back to Step 3.

Figure 32

Algorithm 7: A greedy algorithm for determining $l$ and estimating $\bar{y}_c$, $\bar{b}$, and $\bar{\lambda}$ in MLTCM 1. Sort $|Y_1|, |Y_2|, \cdots, |Y_n|$ in ascending order into $W_1 \leq W_2 \leq \cdots \leq W_n$ and set
$$W = (W_1, W_2, \cdots, W_n).$$
2. Initialization: Set $t = 0$, $j = 1$, $y_s = 0$, and $U = W$.
3. while $|U| > 0$, i.e., $U$ is not empty do
4.     Run Algorithm 6 with initialization $y_s$ and $U$ to get $T(U)$, $Y_c(U)$, $B(U)$, and $\Lambda(U)$.
5.     Set $y_{c_j} = y_s + Y_c(U)$, $b_j = B(U)$, and $\lambda_j = \Lambda(U)$.
6.     Update $y_s$ by setting $y_s = y_{c_j}$.
7.     Increase $t$ by $T(U)$, and $j$ by 1.
8.     Update $U$ by setting
$$U = (W_{t+1} - y_s, W_{t+2} - y_s, \cdots, W_n - y_s).$$
9. end while

Figure 33

Algorithm 8: A greedy algorithm for estimating $K_1$, $b_1$, and $\lambda_1$ in MGTCM.

1. Initialization: Set $K_s = 0$ and
$$W = (W_1, W_2, \cdots, W_{\hat{n}}).$$
2. Determine an initial $T$ to be the minimum $T$ such that $T \geq T^*$ and $W_{T+1} > W_T$. If no such $T$ exists, set $T = |W|$, the length of $W$, i.e., the number of samples in $W$, and compute $\lambda(W^T)$ as in (21) with $K = a - K_s$; then output $K(W) = a - K_s$, $B(W) = \frac{T}{n}$, and $\Lambda(W) = \lambda(W^T)$ as estimates of $K_1$, $b_1$, and $\lambda_1$, respectively, and stop.
3. Compute $\lambda^+(W^T)$ and $\lambda^-(W^T)$ as in (63) and (64) with $K = W_T$, respectively.
4. Determine $\Delta T = |\{i: W_i = W_{T+1}\}|$.
5. Compute $\lambda(W^{T+\Delta T})$ as in (62) with $K = W_{T+\Delta T}$.
6. If $\lambda(W^{T+\Delta T}) \notin [\lambda^-(W^T), \lambda^+(W^T)]$, then $W^T$ and $W_{T+1}^{T+\Delta T}$ are deemed to come from different models. Compute $\lambda(W^T)$ as in (62) with $K = W_T$. Then output $K(W) = W_T$, $B(W) = \frac{T}{n}$, and $\Lambda(W) = \lambda(W^T)$ as estimates of $K_1$, $b_1$, and $\lambda_1$, respectively, and stop.
7. Otherwise, $W^T$ and $W_{T+1}^{T+\Delta T}$ are deemed to come from the same geometric model. Update $T$ into $T + \Delta T$.
8. If $T = |W|$, output $K(W) = W_T$, $B(W) = \frac{T}{n}$, and $\Lambda(W) = \lambda(W^T)$ as estimates of $K_1$, $b_1$, and $\lambda_1$, respectively, and stop.
9. Otherwise, go back to Step 3.

Figure 34

Algorithm 9: A greedy algorithm for determining $l$ and estimating $\bar{K}$, $\bar{b}$, and $\bar{\lambda}$ in MGTCM from $u^n$.

1. Set $N_0 = \{i: u_i = 0\}$, $b_0 = |N_0|/n$, and $\hat{n} = n - |N_0|$.
2. Sort $|u_i|$, $i \notin N_0$, in ascending order into $W_1 \leq W_2 \leq \cdots \leq W_{\hat{n}}$ and set
$$W = (W_1, W_2, \cdots, W_{\hat{n}}).$$
3. Initialization: Set $t = 0$, $j = 1$, $K_s = 0$, and $U = W$.
4. while $|U| > 0$, i.e., $U$ is not empty do
5.     Run Algorithm 8 with initialization $K_s$ and $U$ to get $T(U)$, $K(U)$, $B(U)$, and $\Lambda(U)$.
6.     Set $K_j = K_s + K(U)$, $b_j = B(U)$, and $\lambda_j = \Lambda(U)$.
7.     Update $K_s$ by setting $K_s = K_j$.
8.     Increase $t$ by $T(U)$, and $j$ by 1.
9.     Update $U$ by setting
$$U = (W_{t+1} - K_s, W_{t+2} - K_s, \cdots, W_{\hat{n}} - K_s).$$
10. end while

Figure 35

Table 10: Overall comparisons between the BLTCM and GG model for modeling 15 low frequency continuous DCT coefficients.

|  | bird | boat | fish | Cp | hill | Lenna | Bb | Mt | Pp |
|---|---|---|---|---|---|---|---|---|---|
| $w_d$ (%) | 100 | 60 | 100 | 87 | 87 | 100 | 100 | 87 | 100 |
| $w_{\chi^2}$ (%) | 100 | 87 | 100 | 100 | 100 | 100 | 100 | 87 | 100 |

Figure 36

Table 11: Overall comparisons between the LPTCM and GG model for modeling 15 low frequency DCT coefficients.

|  | bird | boat | fish | Cp | hill | Lenna | Bb | Mt | Pp |
|---|---|---|---|---|---|---|---|---|---|
| $w_d$ (%) | 80 | 0 | 0 | 0 | 7 | 0 | 40 | 40 | 40 |
| $w_{\chi^2}$ (%) | 93 | 0 | 0 | 0 | 13 | 20 | 40 | 60 | 60 |

Figure 37

Table 12: Overall comparisons between BGTCM and the GG model for modeling 15 low frequency DCT coefficients.

|  | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 100 | 60 | 100 | 93 | 100 | 100 | 100 | 100 | 100 | 100 | 100 | 87 | 100 | 80 | 87 | 80 | 93 | 67 |
| $w_{\chi^2}$ (%) | 100 | 80 | 100 | 87 | 93 | 100 | 100 | 80 | 100 | 100 | 100 | 93 | 100 | 87 | 100 | 87 | 80 | 87 |

Figure 38

Table 13: Overall comparisons between the GMTCM and GG model for modeling 15 low frequency DCT coefficients.

|  | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 93 | 0 | 100 | 0 | 20 | 20 | 40 | 60 | 60 | 73 | 67 | 13 | 47 | 0 | 60 | 7 | 93 | 7 |
| $w_{\chi^2}$ (%) | 80 | 0 | 100 | 0 | 20 | 13 | 53 | 47 | 40 | 80 | 67 | 13 | 20 | 0 | 47 | 7 | 60 | 0 |

Figure 39

Table 14: Overall comparisons between the MGTCM and BGTCM model for modeling low frequency DCT coefficients.

|  | bird | boat | fish | Cp | hill | Lenna | Bb | Mt | Pp | SE | SS | CS | BbT | B1 | B2 | B3 | B4 | B5 |
|---|---|---|---|---|---|---|---|---|---|---|---|---|---|---|---|---|---|---|
| $w_d$ (%) | 93 | 100 | 80 | 100 | 100 | 100 | 73 | 93 | 100 | 13 | 40 | 20 | 100 | 67 | 100 | 100 | 100 | 93 |
| $w_{\chi^2}$ (%) | 100 | 100 | 100 | 93 | 100 | 93 | 100 | 100 | 100 | 13 | 13 | 13 | 93 | 67 | 100 | 93 | 100 | 93 |

Figure 40

SYSTEM AND METHOD HAVING TRANSPARENT COMPOSITE MODEL FOR TRANSFORM COEFFICIENTS

CROSS-REFERENCE TO RELATED APPLICATIONS

This application claims the benefit of priority to U.S. Provisional Patent Application Ser. No. 61/827,321 filed May 24, 2013 entitled TRANSPARENT COMPOSITE MODEL FOR DCT COEFFICIENTS: DESIGN AND ANALYSIS, the contents of which are hereby incorporated by reference into the Detailed Description of Example Embodiments.

TECHNICAL FIELD

Embodiments of the present invention generally relate to modeling of transform coefficients such as DCT coefficients, and in particular to methods and systems having transparent composite model for transform coefficients.

BACKGROUND

From its earlier adoption in JPEG to its recent application in HEVC (High Efficiency Video Coding), the newest video coding standard [3], the discrete cosine transform (DCT) has been widely applied in digital signal processing, particularly in lossy image and video coding. It has thus attracted, during the past few decades, a lot of interest in understanding the statistical distribution of DCT coefficients (see, for example, [1], [4], [7], [9], and references therein). Deep and accurate understanding of the distribution of DCT coefficients would be useful to quantization design [12], entropy coding, rate control [7], image understanding and enhancement [1], and image and video analytics [13] in general.

In the literature, Laplacian distributions, Cauchy distributions, Gaussian distributions, mixtures thereof, and generalized Gaussian (GG) distributions have all been suggested to model the distribution of DCT coefficients (see, for example, [2], [4], [9], and references therein). Depending on the actual image data sources used and the need to balance modeling accuracy and model's simplicity/practicality, each of these models may be justified to some degree for some specific application. In general, it is believed that in terms of modeling accuracy, GG distributions with a shape parameter and a scale parameter achieve the best performance [2][9]. However, parameter estimation for GG distributions is difficult and hence the applicability of the GG model to applications, particularly online applications, may be limited. On the other hand, the Laplacian model has been found to balance well between complexity and modeling accuracy; it has been widely adopted in image and video coding [12], although its modeling accuracy is significantly inferior to that of the GG model [2].

SUMMARY

To better handle the flat tail phenomenon commonly seen in DCT coefficients, a system and method is provided including a model dubbed a transparent composite model (TCM). Given a sequence of DCT coefficients, a TCM first separates the tail of the sequence from the main body of the sequence. Then, a uniform distribution is used to model DCT coefficients in the flat tail while a different parametric distribution (such as truncated Laplacian, generalized Gaussian (GG), and geometric distributions) is used to model data in the main body. The TCM is continuous if each DCT coefficient is regarded continuous (i.e., analog), and discrete if each DCT coefficient is discrete. The separate boundary and other parameters of the TCM can be estimated via maximum likelihood (ML) estimation. Efficient online algorithms with global convergence are developed to compute the ML estimates of these parameters. Analysis and experimental results show that for real-valued continuous AC coefficients, (1) the TCM with truncated GG distribution as its parametric distribution (GGTCM) offers the best modeling accuracy among pure Laplacian models, pure GG models, and the TCM with truncated Laplacian distribution as its parametric distribution (LPTCM), at the cost of extra complexity; and (2) LPTCM offers a modeling accuracy comparable to pure GG models, but with a lower complexity. On the other hand, for discrete/integer DCT coefficients, which are mostly seen in real-world applications of DCT, extensive experiments show via both the divergence test and Chi-square test that the discrete TCM with truncated geometric distribution as its parametric distribution (GMTCM) models AC coefficients more accurately than pure Laplacian models and GG models in majority cases while having simplicity and practicality similar to those of pure Laplacian models. In addition, it is demonstrated that the GMTCM also exhibits a good capability of feature extraction—DCT coefficients in the flat tail identified by the GMTCM are truly outliers, and these outliers across all AC frequencies of an image represent an outlier image revealing some unique global features of the image. This, together with the low complexity of GMTCM, makes the GMTCM a desirable choice for modeling discrete/integer DCT coefficients in real-world applications, such as image and video coding, image understanding, image enhancement, etc.

To further improve modeling accuracy, the concept of TCM can be extended by further separating the main portion into multiple sub-portions and modeling each sub-portion by a different parametric distribution (such as truncated Laplacian, generalized Gaussian (GG), and geometric distributions). The resulting model is dubbed a multiple segment TCM (MTCM). In the case of general MTCMs based on truncated Laplacian and geometric distributions (referred to as MLTCM and MGTCM, respectively), a greedy algorithm is developed for determining a desired number of segments and for estimating the corresponding separation boundaries and other MTCM parameters. For bi-segment TCMs, an efficient online algorithm is further presented for computing the maximum likelihood (ML) estimates of the separation boundary and other parameters. Experiments based on Kullback-Leibler (KL) divergence and $\chi^2$ test show that (1) for real-valued continuous AC coefficients, the bi-segment TCM based on truncated Laplacian (BLTCM) models AC coefficients more accurately than the LPTCM and GG model while having simplicity and practicality similar to those of LPTCM and pure Laplacian; and (2) for discrete (integer or quantized) DCT coefficients, the bi-segment TCM based on truncated geometric distribution (BGTCM) significantly outperforms the GMTCM and GG model in terms of modeling accuracy, while having simplicity and practicality similar to those of GMTCM. Also shown is that the MGTCM derived by the greedy algorithm further improves the modeling accuracy over BGTCM at the cost of more parameters and slight increase in complexity.

In accordance with an example embodiment, there is provided a method for modelling a set of transform coefficients, the method being performed by a device and including: determining at least one boundary coefficient value; determining one or more parameters of a first distribution model for transform coefficients of the set the magnitudes of which are greater than one of the boundary coefficient values; determining parameters of at least one further distribution model for transform coefficients of the set the magnitudes of which are less than the one of the boundary coefficient values; and performing a device operation on at least part of a composite distribution model which is a composite of the first distribution model and the at least one further distribution model having the respective determined parameters.

In accordance with an example embodiment, there is provided a method for a set of transform coefficients, the method being performed by a device and including: determining at least one boundary coefficient value which satisfies a maximum likelihood estimation between the set of transform coefficients and a composite distribution model which is a composite of a plurality of distribution models each for a subset of transform coefficients of the set bounded by each of the at least one boundary coefficient values; and performing a device operation on at least one of the subsets of transform coefficients.

In accordance with an example embodiment, there is provided a method for modelling a set of transform coefficients, the method being performed by a device and including: determining a boundary coefficient value; determining one or more parameters of a uniform distribution model for transform coefficients of the set the magnitudes of which are greater than the boundary coefficient value; determining parameters of a parametric distribution model for transform coefficients of the set the magnitudes of which are less than the boundary coefficient value; and performing a device operation on at least part of a composite distribution model which is a composite of the uniform distribution model and the parametric distribution model having the respective determined parameters.

In accordance with an example embodiment, there is provided a device, including memory, a component configured to access a set of transform coefficients, and a processor configured to execute instructions stored in the memory in order to perform any or all of the described methods.

In accordance with an example embodiment, there is provided a non-transitory computer-readable medium containing instructions executable by a processor for performing any or all of the described methods.

BRIEF DESCRIPTION OF THE DRAWINGS

Reference will now be made, by way of example, to the accompanying drawings which show example embodiments, in which:

FIG. 6 illustrates a test image set 1: From left to right, top-down, they are referred as 'bird', 'boat', 'fish', 'couple/Cp', 'hill', 'lena', 'baboon/Bb', 'mountain/Bt', and 'pepper/Pp', respectively.

FIG. 7 illustrates test image set 2: These images are referred as 'B1', 'B2', 'B3', 'B4', and 'B5', respectively.

FIG. 8 illustrates a test image set 3: These images are the first frame of four class-F sequences for HEVC screen content tests. The original file names, which also indicate the image resolution, are 'SlideEditing_1280×720', 'SlideShow_1280×720', 'Chinaspeed_1024×768', and 'BasketballDrillText_832×480', respectively. In the text, their names are abbreviated as 'SE', 'SS', 'CS' and 'BbT'.

FIG. 10 illustrates an original image (top), inlier image (middle), and outlier image (bottom), with demonstration of the perceptual importance of outlier coefficients by the image of 'Lenna'.

FIG. 12 illustrates Algorithm 1: Computing the ML estimate of $(y_c, b, \theta)$ in a general continuous TCM, in accordance with an example embodiment.

FIG. 13 illustrates Algorithm 2: An iterative algorithm for computing the ML estimate of $\lambda$ in a truncated Laplacian distribution, in accordance with an example embodiment.

FIG. 14 illustrates Algorithm 3: An iterative algorithm for computing the ML estimate $\lambda_K$ of $\lambda$ in a truncated geometric distribution, in accordance with an example embodiment.

FIG. 15 illustrates Algorithm 4: An algorithm for computing the ML estimate $(b^*, p^*, \lambda^*, K^*)$ in the GMTCM, in accordance with an example embodiment.

FIG. 16 shows Table 1: Overall comparisons between the LPTCM and GG model for 9 images for continuous DCT coefficients.

FIG. 17 shows Table 2: Overall comparisons between the GMTCM and GG model for all images coded using JPEG with QF=100.

FIG. 18 shows Table 3: Overall comparisons between the GMTCM and GG model for all images coded using JPEG with QF=90.

FIG. 19 shows Table 4: Overall comparisons between the GMTCM and GG model for all images coded using JPEG with QF=80.

FIG. 20 shows Table 5: Overall comparisons between the GMTCM and GG model for all images coded using JPEG with QF=70.

FIG. 21 shows Table 6: The $\chi^2$ distances by the GG model, GMTCM, and Laplacian model for all 63 ACs from JPEG-coded image 'bird' with QF=100.

FIG. 22 shows Table 7: The $\chi^2$ distances by the GG model, GMTCM, and Laplacian model for all 63 ACs from JPEG-coded image 'boat' with QF=100.

FIG. 23 shows Table 8: The $\chi^2$ distances by the GG model, GMTCM, and Laplacian model for all 63 ACs from JPEG-coded image 'CS' with QF=100.

FIG. 24 shows Table 9: The $\chi^2$ distances by the GG model, GMTCM, and Laplacian model for all 63 ACs from JPEG-coded image 'CS' with QF=90.

FIG. 30 illustrates the $\chi^2$ scores and KL divergence scores by GGD, Laplace, GMTCM, BGTCM and MGTCM for the first 15 low-frequency ACs along the zigzag order from JPEG-coded image 'B5' with QF=100.

FIG. 31 illustrates Algorithm 5: An algorithm for computing the ML estimate of $(y_{c_1}, b_1, \overline{\theta})$ in the bi-segment TCM, in accordance with an example embodiment.

FIG. 32 illustrates Algorithm 6: A greedy algorithm for estimating $y_{c_1}$, $b_1$, and $\lambda_1$ in MLTCM, in accordance with an example embodiment.

FIG. 33 illustrates Algorithm 7: A greedy algorithm for determining l and estimating $\overline{y}_c$, $\overline{b}$, and $\overline{\lambda}$ in MLTCM, in accordance with an example embodiment.

FIG. 34 illustrates Algorithm 8: A greedy algorithm for estimating $K_1$, $b_1$, and $\lambda_1$ in MGTCM, in accordance with an example embodiment.

FIG. 35 illustrates Algorithm 9: A greedy algorithm for determining l and estimating $\overline{K}$, $\overline{b}$, and $\overline{\lambda}$ in MGTCM from u", in accordance with an example embodiment.

FIG. 36 shows Table 10: Overall comparisons between the BLTCM and GG model for modeling 15 low frequency continuous DCT coefficients.

FIG. 37 shows Table 11: Overall comparisons between the LPTCM and GG model for modeling 15 low frequency DCT coefficients.

FIG. 38 shows Table 12: Overall comparisons between BGTCM and the GG model for modeling 15 low frequency DCT coefficients.

FIG. 39 shows Table 13: Overall comparisons between the GMTCM and GG model for modeling 15 low frequency DCT coefficients.

FIG. 40 shows Table 14: Overall comparisons between the MGTCM and BGTCM model for modeling low frequency DCT coefficients.

Similar reference numerals may be used in different figures to denote similar components.

DETAILED DESCRIPTION OF EXAMPLE EMBODIMENTS

Figure 1:
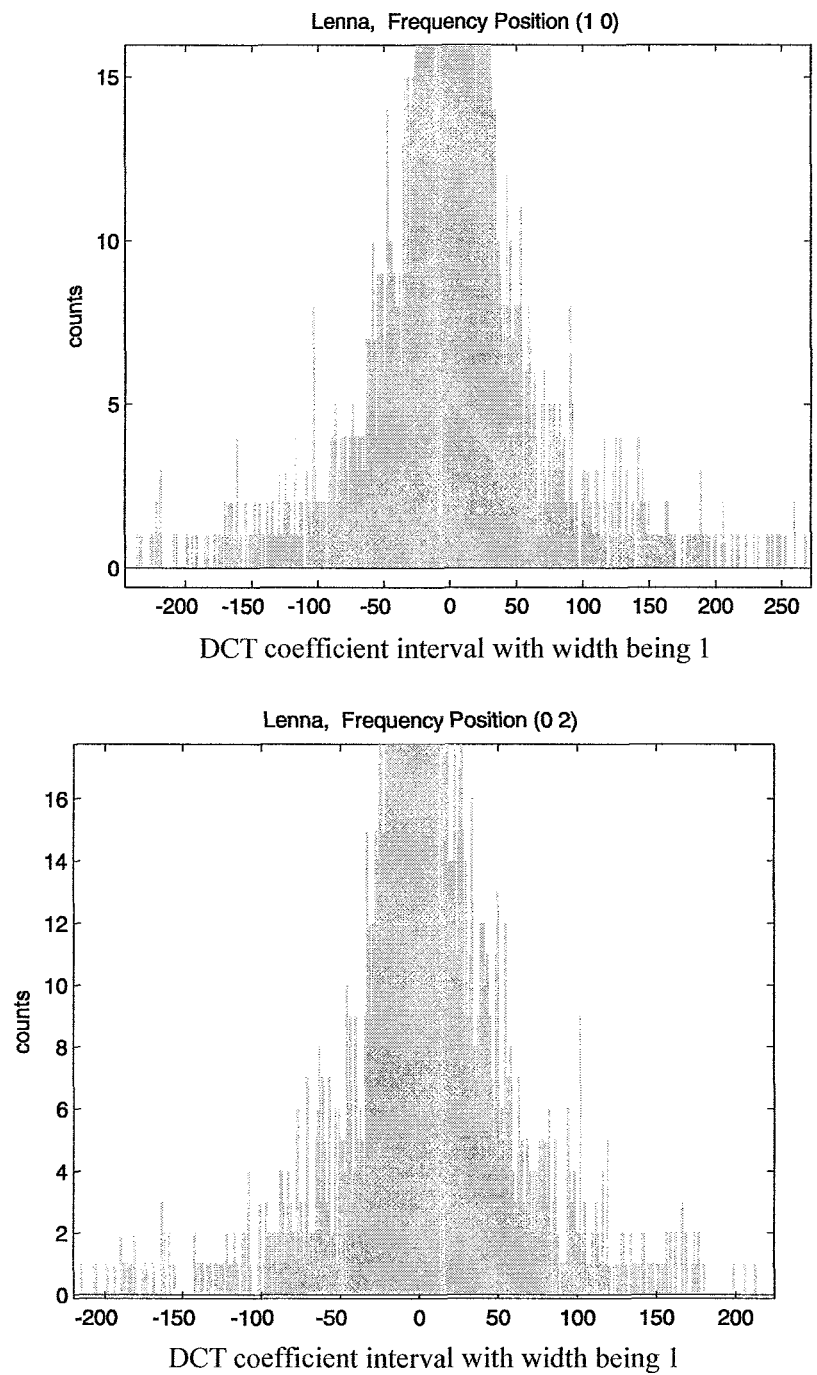
FIG. 1 illustrates separate Histograms of two AC components in the 8×8 DCT block of the 512×512 Lenna image.

In accordance with an example embodiment, there is provided a method for modelling a set of transform coefficients, the method being performed by a device and including: determining at least one boundary coefficient value; determining one or more parameters of a first distribution model for transform coefficients of the set the magnitudes of which are greater than one of the boundary coefficient values; determining parameters of at least one further distribution model for transform coefficients of the set the magnitudes of which are less than the one of the boundary coefficient values; and performing a device operation on at least part of a composite distribution model which is a composite of the first distribution model and the at least one further distribution model having the respective determined parameters.

In accordance with an example embodiment, there is provided a method for a set of transform coefficients, the method being performed by a device and including: determining at least one boundary coefficient value which satisfies a maximum likelihood estimation between the set of transform coefficients and a composite distribution model which is a composite of a plurality of distribution models each for a subset of transform coefficients of the set bounded by each of the at least one boundary coefficient values; and performing a device operation on at least one of the subsets of transform coefficients.

1 Introduction to TCM

Both Laplacian and GG distributions decay exponentially fast. However, in many cases it is observed herein that DCT coefficients have a relatively flat tail, which can not be effectively modeled by an exponentially decaying function (see FIGS. 1-4 and associated description herein below). Although the tail portion of DCT coefficients is insignificant statistically, it contains values of large magnitude, which arguably represent important features or information about the underlying image, and hence should be handled with care. Indeed, improvement on modeling the tail portion could lead to better coding performance, as shown in [7] in video coding, where a Cauchy distribution, which decays much slowly than Laplacian distributions, was used to derive a rate model and a distortion model for DCT coefficients in rate control for video coding, leading to a significant coding gain. However, the Cauchy model may not model the main portion of DCT coefficients effectively, and is in general inferior to the GG model in term of the overall modeling accuracy [4]. Therefore, in addition to balancing modeling accuracy and model's simplicity/practicality, a good model of DCT coefficients also needs to balance the main portion and tail portion of DCT coefficients.

To better handle the flat tail phenomenon in DCT coefficients, in this disclosure, we develop a model dubbed transparent composite model (TCM), in which the tail portion of DCT coefficients is modeled separately from the main portion of DCT coefficients by a first distribution, and the main portion is modeled instead by a different parametric distribution such as truncated Laplacian, GG, and geometric distributions. This composite model introduces a boundary parameter to control which model to use for any given DCT coefficient; it is marked as transparent because there is no ambiguity regarding which model (the first distribution model or at least one further distribution model) a given DCT coefficient will fall into once the TCM is determined. The TCM is continuous if each DCT coefficient is regarded continuous (i.e., analog), and discrete if each DCT coefficient is discrete.

The separate boundary and other parameters of the TCM can be estimated via maximum likelihood (ML) estimation. We further propose efficient online algorithms with global convergence to compute the ML estimates of these parameters. Analysis and experimental results show that for real-valued continuous AC coefficients, (1) the TCM with truncated GG distribution as its parametric distribution (GGTCM) offers the best modeling accuracy among pure Laplacian models, pure GG models, and the TCM with truncated Laplacian distribution as its parametric distribution (LPTCM), at the cost of extra complexity; and (2) LPTCM matches up to pure GG models in term of modeling accuracy, but with simplicity and practicality similar to those of pure Laplacian models, hence having the best of both pure GG and Laplacian models. On the other hand, for discrete/integer DCT coefficients, which are mostly seen in real-world applications of DCT, extensive experiments show via both the divergence test and Chi-square test that the discrete TCM with truncated geometric distribution as its parametric distribution (GMTCM) models AC coefficients more accurately than pure Laplacian models and GG models in majority cases while having simplicity and practicality similar to those of pure Laplacian models. In addition, it is demonstrated that the GMTCM also exhibits a good capability of feature extraction. I.e., DCT coefficients in the flat tail identified by the GMTCM are truly outliers, and these outliers across all AC frequencies of an image represent an outlier image revealing some unique global features of the image. This, together with the simplicity of modeling and the low complexity of computing online the ML estimates of the parameters of the GMTCM, makes the GMTCM a desirable choice for modeling discrete/integer DCT coefficients in real-world applications, such as image and video coding, image understanding, image enhancement, etc.

2 DCT Models and the Flat Tail Phenomenon

This section first reviews briefly some relevant studies in the literature for modeling DCT coefficients. We then discuss the flat tail phenomenon in DCT coefficients.

2.1 Models in the Literature for DCT Coefficients 2.1.1 Gaussian Distributions

As Gaussian distributions are widely used in natural and social sciences for real-valued random variables, they have been naturally applied to model DCT coefficients [1]. The justification for the Gaussian model may come from the central limit theorem (CLT) [11], which states that the mean of a sufficiently large number of independent random variables will be approximately normally distributed. Consider the linear weighted summation nature of DCT. The CLT provides a meaningful guidance for modeling DCT coefficients with Gaussian distributions. A comprehensive collection of distributions based on Gaussian probability density function were studied in [8].

Although the Gaussian model is backed up by the CLT, it was observed that DCT coefficients for natural images/video usually possess a tail heavier than Gaussian distributions [2]. Consequently, generalized Gaussian distributions have been suggested for modeling DCT coefficients.

2.1.2 Generalized Gaussian Distributions

The DCT coefficients may be modeled with a generalized Gaussian distribution with zero mean, as follows $$f(y) = \frac{\beta}{2\alpha\Gamma(1/\beta)} e^{-(|y|/\alpha)^\beta} \quad (1)$$

where $\alpha$ is a positive scale parameter, $\beta$ defines a positive shape parameter, and $\Gamma(\cdot)$ denotes the gamma function.

It is easy to see that when $\beta=1$, the above GG distribution is de-generalized to a Laplacian distribution. When $\beta=2$, it becomes the Gaussian distribution with variance $\alpha^2/2$. With the free choice of the scale parameter $\alpha$ and the shape parameter $\beta$, the GG distribution has shown an effective way to parameterize a family of symmetric distributions spanning from Gaussian to uniform densities, and a family of symmetric distributions spanning from Laplacian to Gaussian distributions. As mentioned above, DCT coefficient distributions are observed to posses flat tails. In this regard, the GG distribution allows for either heavier-than-Gaussian tails with $\beta<2$, heavier-than-Laplacian tails with $\beta<1$, or lighter-than-Gaussian tails with $\beta>2$. As such, with this flexibility, the GG model outperforms in general both the Gaussian and Laplacian models in terms of modeling accuracy for modeling DCT coefficients.

Nevertheless, the benefit of accurate modeling by the GG model comes with some inevitable drawbacks. For example, the lack of closed-form cumulative distribution function (cdf) makes it difficult to apply the GG model in practice. Another main drawback is the high complexity for its parameter estimation. For example, given a sequence of samples $Y_i, i=1, \ldots, n$, the ML estimate of the shape parameter $\beta$ is the root of the following equation [2], $$\frac{\psi(1/\beta+1) + \log(\beta)}{\beta^2} + \frac{1}{\beta^2}\log\left(\frac{1}{n}\sum_{i=1}^{n}|Y_i|^\beta\right) - \frac{\sum_{i=1}^{n}|Y_i|^\beta \log|Y_i|}{\beta\sum_{i=1}^{n}|Y_i|^\beta} = 0, \quad (2)$$

where $$\psi(\tau) = \gamma + \int_0^1 (1-t^{\tau-1})(1-t)^{-1} dt$$

and $\gamma=0.577\ldots$ denotes the Euler constant. Clearly, the terms $\sum_{i=1}^{n}|Y_i|^\beta \log |Y_i|$ and $\beta\sum_{i=1}^{n}|Y_i|^\beta$ yield a significant amount of computation when a numerical iterative solution of $\beta$ is used.

2.1.3 Laplacian Distributions

Due to its ability to balance modeling accuracy and model's simplicity/practicality, the Laplacian model for DCT coefficients is the most popular one in use [10], [9]. A Laplacian density function with zero mean is given as follows, $$f(y) = \frac{1}{2\lambda} e^{-(|y|/\lambda)}, \quad (3)$$

where $\lambda$ denotes a positive scale parameter. Given a sequence of samples $Y_i=1, \ldots, n$, the ML estimate of $\lambda$ can be easily computed as $$\lambda = \frac{1}{n}\sum_{i=1}^{n}|Y_i|. \quad (4)$$

In addition, under the Laplacian distribution, the probability for an interval $[L, H]$ with $H>L\geq 0$ can also be computed easily as $$\frac{1}{2}\left(e^{-\frac{L}{\lambda}} - e^{-\frac{H}{\lambda}}\right).$$

2.1.4 Other Distributions

There are other distributions investigated in the literature for modeling DCT, [5], [7], [6], [8]. In [5], alpha-stable distributions were used to model DCT coefficients for watermark detection. As a special case of alpha-stable distributions, Cauchy distribution was used in [7] for modeling DCT coefficient in video coding. The alpha-stable distributions were reported to provide a satisfactory modeling accuracy for the corresponding image processing goals as in [5] and [7]. Yet, the lack of closed-form for the alpha-stable family distributions usually leads to difficulties for parameter estimation and a limited application for modeling DCT coefficients. In [6], a symmetric normal inverse Gaussian distribution was studied for modeling DCT coefficients, as follows:

$$f(y) = \frac{A(\delta, \alpha) K_1(\alpha\sqrt{\delta^2+y^2})}{\sqrt{\delta^2+y^2}}, \quad (5)$$

where $$K_\lambda(\xi) = \frac{1}{2}\int_0^\infty z^{\lambda-1}\exp\left(-\frac{1}{2}\xi(z+z^{-1})\right)dz,$$

and $$A(\delta, \alpha) = \frac{\delta\alpha}{\pi}\exp(\delta\alpha).$$

This model was tested using the Kolmogorov-Simrnov test and reported with improved modeling accuracy over General Gaussian and Laplacian distributions using the Kolmogorov-Simrnov test. Yet, its complexity is still significantly more than that of a Laplacian model. Moreover, the Kolmogorov-Simrnov test is generally regarded as less preferable for measuring the modeling accuracy than the $\chi^2$ test [2], and by $\chi^2$ test, the best modeling accuracy is achieved by the GG distributions. The test statistics $\chi^2$ is defined as $$\chi^2 = \sum_{i=1}^{I} \frac{(n_i - n \cdot p_i)^2}{n \cdot p_i} \quad (6)$$

where I is the number of intervals into which the sample space is partitioned, n is the total number of samples, $n_i$ denotes the number of samples in the ith interval, and $p_i$ is the probability under the underlying theoretical model that a sample falls into the interval i.

Similar as in [2], this disclosure prefers the $\chi^2$ test over the Kolmogorov-Simrnov for measuring the modeling accuracy. Besides the justification provided in [2] for using the $\chi^2$ test, our preference also roots in the flat-tail phenomena of DCT coefficients. Specifically, $\chi^2$ test better characterized a statistically insignificant tail portion in a distribution while the Kolmogorov-Simrnov test, which depends on a sample distribution function, tends to overlook the tail part. Nevertheless, the flat-tail phenomena has been widely observed for DCT coefficients, as in [5], [7]. In the following, more detailed discussions are present for the flat tail phenomena.

2.2 Flat Tails

Figure 2:
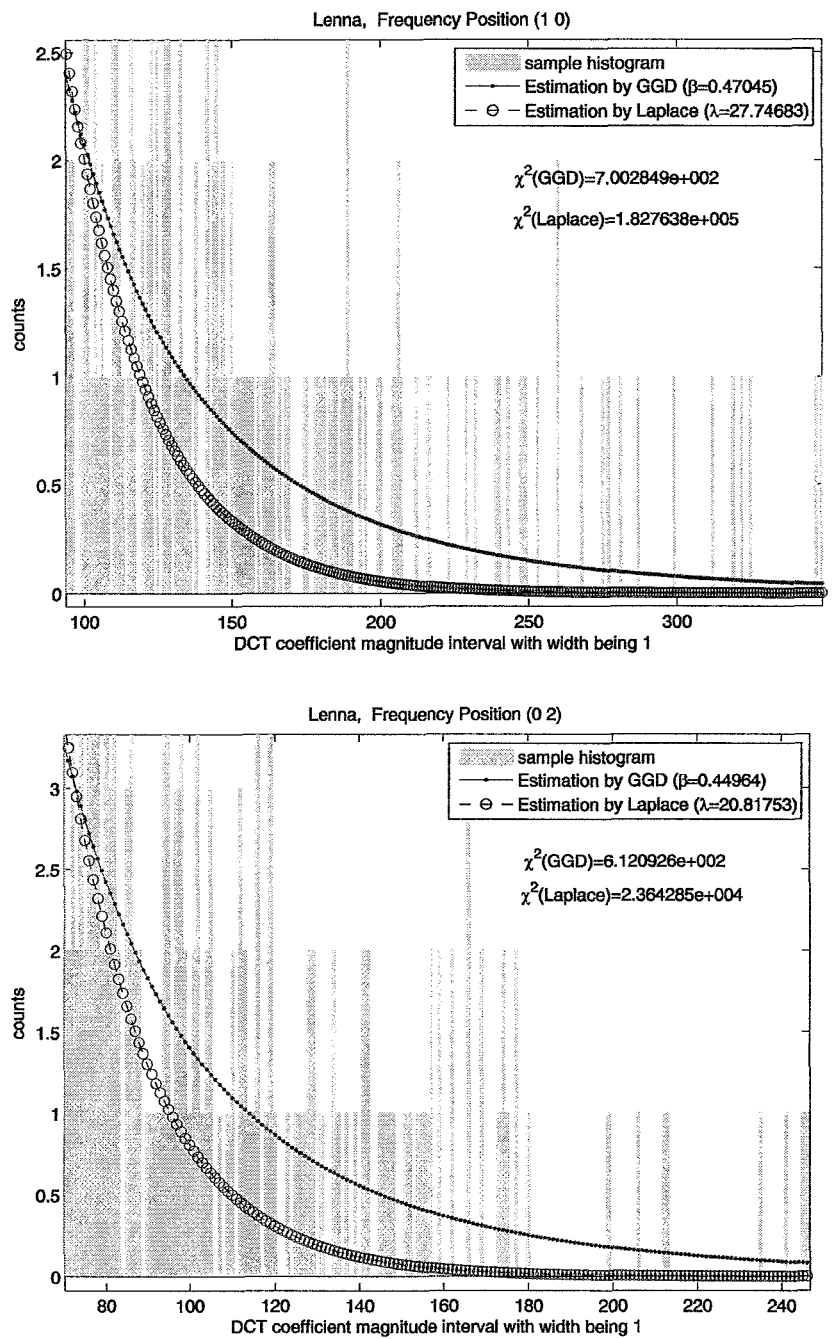
FIG. 2 illustrates detail of the Histograms of FIG. 1 of the flat tail phenomenon in the 512×512 Lenna image.

Laplacian, Gaussian, and GG distributions all decay exponentially fast. As illustrated in FIGS. 1 and 2, however, DCT coefficients usually possess a much heavier tail. FIG. 1 was obtained by applying the floating-point type-II 8×8 DCT to the well-known 512×512 Lenna image, where the vertical bars show the histogram of the DCT coefficients. It is evident from FIG. 1 that the histogram of the DCT coefficients first decays quite rapidly for the main portion of DCT coefficients and then becomes relatively flat for the tail portion of DCT coefficients. Statistically, the tail portion of DCT coefficients is insignificant. However, it contains DCT coefficients of large magnitude, which usually have greater impacts on image quality, image features, quantization, etc. than other coefficients and hence deserve a better fit in modeling.

FIG. 2 zooms in the tail portion of FIG. 1 and further compares the histogram of DCT coefficients against the GG and Laplacian models, where the vertical bars again represent the histogram of DCT coefficients, and the two illustrated curves show results from the GG and Laplacian models, respectively. In FIG. 2, the ML estimates of the parameters of the GG model were computed via Matlab codes from [13] while the λ value of the Laplacian model was computed using (4). For both models, the $\chi^2$ tests were performed to evaluate their respective modeling accuracy. According to the $\chi^2$ test, the GG model significantly outperforms the Laplacian model. Furthermore, in each case of FIG. 2, the obtained shape parameter β is much smaller than 1, meaning that the resulting GG distribution possesses a tail heavier than that of the Laplacian distribution. In comparison with the real data histogram shown in FIG. 2, however, the GG model still suffers from an exponentially bounded tail, which is much lighter than that of the DCT coefficients.

The flat tail phenomenon in the Lenna image is widely observed in other images as well. As shown in [2], the estimated shape parameter β for the GG distribution for various images is less than 1 in most cases, indicating that the data distribution possesses a tail heavier than that of the Laplacian distribution. In [7], it was also observed that the tail of DCT coefficients in video coding is much heavier than that of the Laplacian distribution, and a Cauchy distribution was used instead for deriving rate and distortion models for DCT coefficients. However, as mentioned before, the Cauchy model may not model the main portion of DCT coefficients effectively, and is in general inferior to the GG model in term of the overall modeling accuracy [4]. Therefore, it is advantageous to have a model which can balance well the main portion and tail portion of DCT coefficients while having both simplicity and superior modeling accuracy.

3 Continuous Transparent Composite Model

To better handle the flat tail phenomenon in DCT coefficients, we now separate the tail portion of DCT coefficients from the main portion of DCT coefficients and use a different model to model each of them. Since DCT coefficients in the tail portion are insignificant statistically, each of them often appears once or a few times in the entire image or video frame. Hence it would make sense to model them separately by a uniform distribution while modeling the main portion by a parametric distribution such as truncated Laplacian, GG, and geometric distributions, yielding a model we call a transparent composite model. In this section, we assume that DCT coefficients are continuous (i.e. can take any real value), and consider continuous TCMs.

3.1 Description of General Continuous TCMs

Consider a probability density function (pdf) f(y|θ) with parameters θ∈Θ where θ could be a vector, and Θ is the parameter space. Let F(y|θ) be the corresponding cdf, i.e.

$$F(y|\theta) \triangleq \int_{-\infty}^{y} f(u|\theta)du.$$

Assume that f(y|θ) is symmetric in y with respect to the origin, and F(y|θ) is concave as a function of y in the region y≥0. It is easy to verify that Laplacian, Gaussian, and GG distributions all satisfy this assumption. The TCM based on F(y|θ) is defined as $$p(y \mid y_c, b, \theta) \triangleq \qquad (7)$$

$$\begin{cases} \dfrac{b}{2F(y_c \mid \theta) - 1} f(y \mid \theta) & \text{if } |y| < y_c \\ \dfrac{1-b}{2(a - y_c)} & \text{if } y_c < |y| \le a \\ \max\left\{\dfrac{b}{2F(y_c \mid \theta) - 1} f(y_c \mid \theta), \dfrac{1-b}{2(a - y_c)}\right\} & \text{if } |y| = y_c \\ 0 & \text{otherwise} \end{cases}$$

where $0 \le b \le 1$, $0 < d \le y_c < a$, and a represents the largest magnitude a sample y can take. Here both a and d are assumed to be known. It is not hard to see that given $(y_c, b, \theta)$, as a function of y, $p(y \mid y_c, b, \theta)$ is indeed a pdf, and also symmetric with respect to the origin.

According to the TCM defined in (7), a sample y is generated according to the truncated distribution $$\frac{1}{2F(y_c \mid \theta) - 1} f(y \mid \theta)$$

with probability b, and according to the uniform distribution $$\frac{1}{2(a - y_c)}$$

(also called the outlier distribution) with probability 1-b. The composite model is transparent since given parameters $(y_c, b, \theta)$, there is no ambiguity regarding which distribution a sample $y \ne \pm y_c$ comes from. At $y = \pm y_c$, $p(y \mid y_c, b, \theta)$ can be defined arbitrarily since one can arbitrarily modify the value of a pdf over a set of zero Lebesgue measure without changing its cdf. As shown later, selecting $p(y \mid y_c, b, \theta)$ at $y = \pm y_c$ to be the maximum of $$\frac{b}{2F(y_c \mid \theta) - 1} f(y_c \mid \theta) \text{ and } \frac{1-b}{2(a - y_c)}$$

will facilitate our subsequent argument for ML estimation. Hereafter, samples from the outlier distribution will be referred to as outliers.

3.2 ML Estimate of TCM Parameters

In practice, parameters $y_c$, b, $\theta$ are often unknown and hence have to be estimated, say, through ML estimation. Let $Y_1^n = Y_1, Y_2, \ldots, Y_n$ be a sequence of DCT coefficients in an image or in a large coding unit (such as a block, a slice or a frame in video coding) at a particular frequency or across frequencies of interest. Assume that $Y_1^n$ behaves according to the TCM defined in (7) with $Y_{max} \triangleq \max\{|Y_i|: 1 \le i \le n\} < a$ and $Y_{max} \ge d$. (When $Y_{max} < d$, there would be no outliers and the ML estimate of $y_c$ and b is equal to d and 1, respectively.) We next investigate how to compute the ML estimate of $y_c$, b and $\theta$.

Given $Y_1^n$ with $d \le Y_{max} < a$, let $$N_1(y_c) \triangleq \{i : |Y_i| < y_c\}$$

$$N_2(y_c) \triangleq \{i : y_c < |Y_i|\}$$

$$N_3(y_c) \triangleq \{i : |Y_i| = y_c\}.$$

Then the log-likelihood function $g(y_c, b, \theta \mid Y_1^n)$ according to (7) is equal to $$g(y_c, b, \theta \mid Y_1^n) \stackrel{1)}{=} (|N_2(y_c)|)[\ln(1-b) - \ln 2(a - y_c)] + (|N_1(y_c)|) \qquad (8)$$
$$\{\ln b - \ln[2F(y_c \mid \theta) - 1]\} + \sum_{i \in N_1(y_c)} \ln f(Y_i \mid \theta) + |N_3(y_c)| \max$$
$$\{\ln(1-b) - \ln 2(a - y_c), \ln b - \ln[2F(y_c \mid \theta) - 1] + \ln f(y_c \mid \theta)\} =$$
$$|N_2(y_c)| \ln(1-b) + |N_1(y_c)| \ln b + \sum_{i \in N_1(y_c)} \ln f(Y_i \mid \theta) + |N_3(y_c)| \max$$
$$\{\ln(1-b) - \ln 2(a - y_c), \ln b - \ln[2F(y_c \mid \theta) - 1] + \ln f(y_c \mid \theta)\} -$$
$$|N_2(y_c)| \ln 2(a - y_c) - |N_1(y_c)| \ln[2F(y_c \mid \theta) - 1]$$

where $|S|$ denotes the cardinality of a finite set S, and the equality 1) is due to (7) and the fact that $\ln z$ is strictly increasing in the region $z > 0$. Since $F(y \mid \theta)$ is nondecreasing with respect to y, it follows from (8) that for any $Y_{max} < y_c < a$, $$g(y_c, b, \theta \mid Y_1^n) \le \qquad (9)$$
$$n\{\ln b - \ln[2F(Y_{max} \mid \theta) - 1]\} + \sum_{i=1}^{n} \ln f(Y_i \mid \theta) \le g(Y_{max}, b, \theta \mid Y_1^n).$$

Therefore, we have $$\max\{g(y_c, b, \theta \mid Y_1^n) : d \le y_c < a, 0 \le b \le 1, \theta\} =$$
$$\max\{g(y_c, b, \theta \mid Y_1^n) : d \le y_c \le Y_{max}, 0 \le b \le 1, \theta\}.$$

To continue, we now sort $|Y_1|, |Y_2|, \ldots, |Y_n|$ in ascending order into $W_1 \le W_2 \le \ldots \le W_n$. Note that $W_n = Y_{max}$. Let m be the smallest integer i such that $W_i \ge d$. Define $$I_m = (d, W_m)$$

and for any $m < i \le n$, $$I_i = (W_{i-1}, W_i).$$

Then it is easy to see that the interval $[d, Y_{max}]$ can be decomposed as $$[d, Y_{max}] = \{d, W_m, W_{m+1}, \ldots, W_n\} \cup (\cup_{i=m}^{n} I_i)$$

which, together with (9), implies that $$\max\{g(y_c, b, \theta \mid Y_1^n) : d \le y_c < a, 0 \le b \le 1, \theta\} = \qquad (10)$$
$$\max_{0 \le b \le 1} \max_{\theta} \max_{y_c \in [d, Y_{max}]} g(y_c, b, \theta \mid Y_1^n) =$$
$$\max_{b, \theta} \max \left\{ g(d, b, \theta \mid Y_1^n), g(W_i, b, \theta \mid Y_1^n), \right.$$
$$\left. \sup_{y_c \in I_i} [g(y_c, b, \theta \mid Y_1^n)] : m \le i \le n \right\}.$$

Note that for any nonempty $I_i$ with $i>m$, $N_1(y_c)$ and $N_2(y_c)$ remain the same and $N_3(y_c)$ is empty for all $y_c \in I_i$. Since by assumption $F(y|\theta)$ as a function of y is concave, it is not hard to verify that as a function of $y_c$ $$-|N_2(y_c)| \ln 2(a-y_c) - |N_1(y_c)| \ln [2F(y_c|\theta)-1]$$

is convex over $y_c \in I_i$, and hence its value over $y_c \in I_i$ is upper bounded by the maximum of its value at $y_c = W_i$ and $y_c = W_{i-1}$, i.e., the endpoints of $I_i$. Therefore, in view of (8), we have $$\sup_{y_c \in I_i} [g(y_c, b, \theta | Y_1^n)] \leq \max\{g(W_{i-1}, b, \theta | Y_1^n), g(W_i, b, \theta | Y_1^n)\}. \quad (11)$$

When $I_m$ is nonempty, a similar argument leads to $$\sup_{y_c \in I_m} [g(y_c, b, \theta | Y_1^n)] \leq \max\{g(d, b, \theta | Y_1^n), g(W_m, b, \theta | Y_1^n)\}. \quad (12)$$

Putting (10) to (12) together yields $$\max\{g(y_c, b, \theta | Y_1^n) : d \leq y_c < a, 0 \leq b \leq 1, \theta\} = \quad (13)$$
$$\max_{b,\theta} \max\{g(d, b, \theta | Y_1^n), g(W_i, b, \theta | Y_1^n) : m \leq i \leq n\}.$$

Therefore, the ML estimate of $y_c$ is equal to one of d, $W_m$, $W_{m+1}, \ldots, W_n$.

We are now led to investigating $$\max_{b,\theta} g(y_c, b, \theta | Y_1^n)$$

for each $y_c \in \{d, W_m, W_{m+1}, \ldots, W_n\}$.

Let $$N_1^+(y_c) \triangleq \{i : |Y_i| \leq y_c\}$$

$$N_2^+(y_c) \triangleq \{i : y_c \leq |Y_i|\}.$$

Further define $$g^+(y_c, b, \theta | Y_1^n) \triangleq (|N_2(y_c)|)[\ln(1-b) - \ln 2(a-y_c)] + \quad (14)$$
$$(|N_1^+(y_c)|)\{\ln b - \ln[2F(y_c|\theta)-1]\} + \sum_{i \in N_1^+(y_c)} \ln f(Y_i | \theta)$$

and $$g^-(y_c, b, \theta | Y_1^n) \triangleq (|N_2^+(y_c)|)[\ln(1-b) - \ln 2(a-y_c)] + \quad (15)$$
$$(|N_1(y_c)|)\{\ln b - \ln[2F(y_c|\theta)-1]\} + \sum_{i \in N_1(y_c)} \ln f(Y_i | \theta).$$

Note that the difference between $g^+(y_c, b, \theta | Y_1^n)$ and $g^-(y_c, b, \theta | Y_1^n)$ lies in whether or not we regard $y_c$ itself as an outlier when $y_c$ is equal to some $W_i$. Comparing (8) with (14) and (15), we have $$g(y_c, b, \theta | Y_1^n) = \max\{g^+(y_c, b, \theta | Y_1^n), g^-(y_c, b, \theta | Y_1^n)\} \quad (16)$$

and hence $$\max_{b,\theta} g(y_c, b, \theta | Y_1^n) = \quad (17)$$
$$\max\{\max_{b,\theta} g^+(y_c, b, \theta | Y_1^n), \max_{b,\theta} g^-(y_c, b, \theta | Y_1^n)\}.$$

Let
$$(b(y_c), \theta(y_c)) \triangleq \operatorname{argmax}_{b,\theta} g(y_c, b, \theta | Y_1^n)$$
$$(b^+(y_c), \theta^+(y_c)) \triangleq \operatorname{argmax}_{b,\theta} g^+(y_c, b, \theta | Y_1^n)$$
$$(b^-(y_c), \theta^-(y_c)) \triangleq \operatorname{argmax}_{b,\theta} g^-(y_c, b, \theta | Y_1^n).$$

Then from (14) and (15), it is not hard to see that $$b^+(y_c) = \frac{|N_1^+(y_c)|}{n} \text{ and } b^-(y_c) = \frac{|N_1(y_c)|}{n} \quad (18)$$

and $\theta^+(y_c)$ and $\theta^-(y_c)$ are the ML estimate of $\theta$ for the truncated distribution $$\frac{1}{2F(y_c|\theta)-1} f(y|\theta)$$

over the sample sets $\{Y_i : i \in N_1^+(y_c)\}$ and $\{Y_i : i \in N_1(y_c)\}$, respectively. In view of (17), one can then determine $(b(y_c), \theta(y_c))$ by setting $$(b(y_c), \theta(y_c)) = \begin{cases} (b^+(y_c), \theta^+(y_c)) & \text{if } g^+(y_c, b^+(y_c), \theta^+(y_c) | Y_1^n) \geq g^-(y_c, b^-(y_c), \theta^-(y_c) | Y_1^n) \\ (b^-(y_c), \theta^-(y_c)) & \text{otherwise.} \end{cases}$$

Finally, the ML estimate of $(y_c, b, \theta)$ can be determined as $$y_c^* = \arg\max_{y_c \in \{d, W_m, \ldots, W_n\}} g(y_c, b(y_c), \theta(y_c) | Y_1^n)$$

$$b^* = b(y_c^*)$$

$$\theta^* = \theta(y_c). \quad (20)$$

Summarizing the above derivations into Algorithm 1 (FIG. 12) for computing $(y_c^*, b^*, \theta^*)$, we have proved the following result.

Theorem 1: The vector $(y_c^*, b^*, \theta^*)$ computed by Algorithm 1 is indeed the ML estimate of $(y_c, b, \theta)$ in the TCM specified in (7).

Remark 1: When implementing Algorithm 1 for a sequence $\{Y_i\}_{i=1}^n$ of DCT coefficients with a flat tail as shown in FIGS. 1 and 2, one can choose a to be $Y_{max}$ and apply Algorithm 1 to the sample set $\{Y_i: |Y_i| < Y_{max}, 1 \le i \le n\}$. As for the selection of $d>0$, it follows from Algorithm 1 that the larger d is, the less computation Algorithm 1 would have. In our experiments, we have found that choosing $d>0$ such that n−m is around 20% of n is a good choice since the flat tail portion is normally not significant statistically and would contain less than 20% of the total samples.

Depending on whether or not Step 6 in Algorithm 1 can be implemented efficiently, the computation complexity of Algorithm 1 varies from one parametric family $f(y|\theta)$ to another. For some parametric family $f(y|\theta)$ such as Laplacian distributions, Step 6 can be easily solved and hence Algorithm 1 can be implemented efficiently. On the other hand, when $f(y|\theta)$ is the GG family, Step 6 is quite involved. In the next two subsections, we will examine Step 6 in two cases: (1) $f(y|\theta)$ is the Laplacian family, and the corresponding TCM is referred to as the LPTCM; and (2) $f(y|\theta)$ is the GG family, and the corresponding TCM is referred to as the GGTCM.

3.3 LPTCM

Plugging the Laplacian density function in (3) into (7), we get the LPTCM given by $$p(y | y_c, b, \lambda) \triangleq \begin{cases} \frac{b}{1 - e^{-y_c/\lambda}} \frac{1}{2\lambda} e^{-|y|/\lambda} & \text{if } |y| < y_c \\ \frac{1-b}{2(a-y_c)} & \text{if } y_c < |y| \le a \\ \max\left\{\frac{b}{1 - e^{-y_c/\lambda}} \frac{1}{2\lambda} e^{-|y|/\lambda}, \frac{1-b}{2(a-y_c)}\right\} & \text{if } |y| = y_c \\ 0 & \text{otherwise.} \end{cases} \quad (21)$$

With reference to Step 6 in Algorithm 1, let S be either $N_1^+(y_c)$ or $N_1(y_c)$. Then Step 6 in Algorithm 1 is equivalent to determining the ML estimate (denoted by $\lambda_{y_c}$) of $\lambda$ in the truncated Laplacian distribution $$p(y | \lambda) \triangleq \begin{cases} \frac{1}{1 - e^{-y_c/\lambda}} \frac{1}{2\lambda} e^{-|y|/\lambda} & \text{if } |y| \le y_c \\ 0 & \text{otherwise} \end{cases} \quad (22)$$

from the sample set $\{Y_i : i \in S\}$. Since $|Y_i| \le y_c$ for any $i \in S$, the log-likelihood function of the sample set $\{Y_i : i \in S\}$ with respect to $p(y|\lambda)$ is equal to $$L(\lambda) \triangleq -|S|[\ln 2\lambda + \ln(1 - e^{-y_c/\lambda})] - \frac{1}{\lambda} \sum_{i \in S} |Y_i|.$$

Then we have $$\lambda_{y_c} = \arg\max_{0 \le \lambda \le \infty} L(\lambda).$$

It is not hard to verify that $L(1/t)$ as a function of $t>0$ is strictly concave. Computing the derivative of $L(\lambda)$ with respect to $\lambda$ and setting it to 0 yields $$\lambda - \frac{y_c \cdot e^{-y_c/\lambda}}{1 - e^{-y_c/\lambda}} - \frac{1}{|S|} \sum_{i \in S} |Y_i| = 0. \quad (23)$$

It can be shown (see the proof of Theorem 2 below) that $$s(\lambda) \triangleq \lambda - \frac{y_c \cdot e^{-y_c/\lambda}}{1 - e^{-y_c/\lambda}}$$

is a strictly increasing function of $\lambda > 0$, and $$\lim_{\lambda \to 0^+} s(\lambda) = 0 \text{ and } \lim_{\lambda \to \infty} s(\lambda) = \frac{y_c}{2}. \quad (24)$$

Let $$C = \frac{1}{|S|} \sum_{i \in S} |Y_i|.$$

Then it follows that (1) when $C=0$, $\lambda_{y_c}=0$, in which case the corresponding truncated Laplacian distribution is de-generated to a delta function; (2) when $C \ge y_c/2$, $\lambda_{y_c}=\infty$, in which case the corresponding truncated Laplacian distribution is de-generated to the uniform distribution over $[-y_c, y_c]$, and (3) when $0 < C < y_c/2$, $\lambda_{y_c}$ is equal to the unique root to (23).

We are now led to solving (23) when $0<C<y_c/2$. To this end, we developed the iterative procedure described in Algorithm 2 (FIG. 13).

Theorem 2 below shows that Algorithm 2 converges exponentially fast when $0<C<y_c/2$.

Theorem 2: Assume that $0<C<y_c/2$. Then $\lambda_i$ computed in Step 9 of Algorithm 2 strictly increases and converges exponentially fast to $\lambda_{y_c}$ as $i \to \infty$.

Proof: Define $$r(\lambda) = \lambda - \frac{y_c \cdot e^{-y_c/\lambda}}{1 - e^{-y_c/\lambda}} - C.$$

It is not hard to verify that the derivative of $r(\lambda)$ with respect to $\lambda$ is $$r'(\lambda) = 1 - \frac{e^{-y_c/\lambda}}{[1 - e^{-y_c/\lambda}]^2} \frac{y_c^2}{\lambda^2} > 0 \quad (26)$$

for any $\lambda > 0$. Therefore, $r(\lambda)$ is strictly increasing over $\lambda > 0$.

Since $\lambda_0 = C > 0$, it follows from (25) that $\lambda_1 > \lambda_0$. In general, for any $i \ge 1$, we have $$\lambda_{i+1} - \lambda_i = \frac{y_c \cdot e^{-y_c/\lambda_i}}{1 - e^{-y_c/\lambda_i}} - \frac{y_c \cdot e^{-y_c/\lambda_{i-1}}}{1 - e^{-y_c/\lambda_{i-1}}} \qquad (27)$$

$$= y_c \left[ \frac{1}{e^{y_c/\lambda_i} - 1} - \frac{1}{e^{y_c/\lambda_{i-1}} - 1} \right]$$

which implies that $\lambda_{i+1} - \lambda_i > 0$ whenever $\lambda_i - \lambda_{i-1} > 0$. By mathematic induction, it then follows that $\lambda_i$ strictly increases as i increases.

We next show that all $\lambda_i$, $i \geq 1$, are bounded. Indeed, it follows from (25) that $$r(\lambda_i) = \lambda_i - \frac{y_c \cdot e^{-y_c/\lambda_i}}{1 - e^{-y_c/\lambda_i}} - C$$

$$= \lambda_i - \lambda_{i+1}$$

$$< 0$$

which, together with (26) and the fact that $r(\lambda_{y_c})=0$, implies that $\lambda_i < \lambda_{y_c}$. Therefore $\lambda_i$ converges as $i \to \infty$. Letting $i \to \infty$ in (25) yields $$\lim_{i \to \infty} \lambda_i = \lambda_{y_c}. \qquad (28)$$

All remaining is to show that the convergence speed in (28) is exponentially fast. To this end, let $$\delta \triangleq \max_{\lambda_0 \leq \lambda \leq \lambda_{y_c}} \frac{e^{-y_c/\lambda}}{[1 - e^{-y_c/\lambda}]^2} \left( \frac{y_c}{\lambda} \right)^2.$$

Then it follows from (26) that $\delta < 1$. This, together with (27), implies that $$\lambda_{i+1} - \lambda_i \leq \delta(\lambda_i - \lambda_{i-1})$$

for any $i \geq 1$, and hence $\lambda_i$ converges to $\lambda_{y_c}$ exponentially fast. This completes the proof of Theorem 2.

Figure 3:
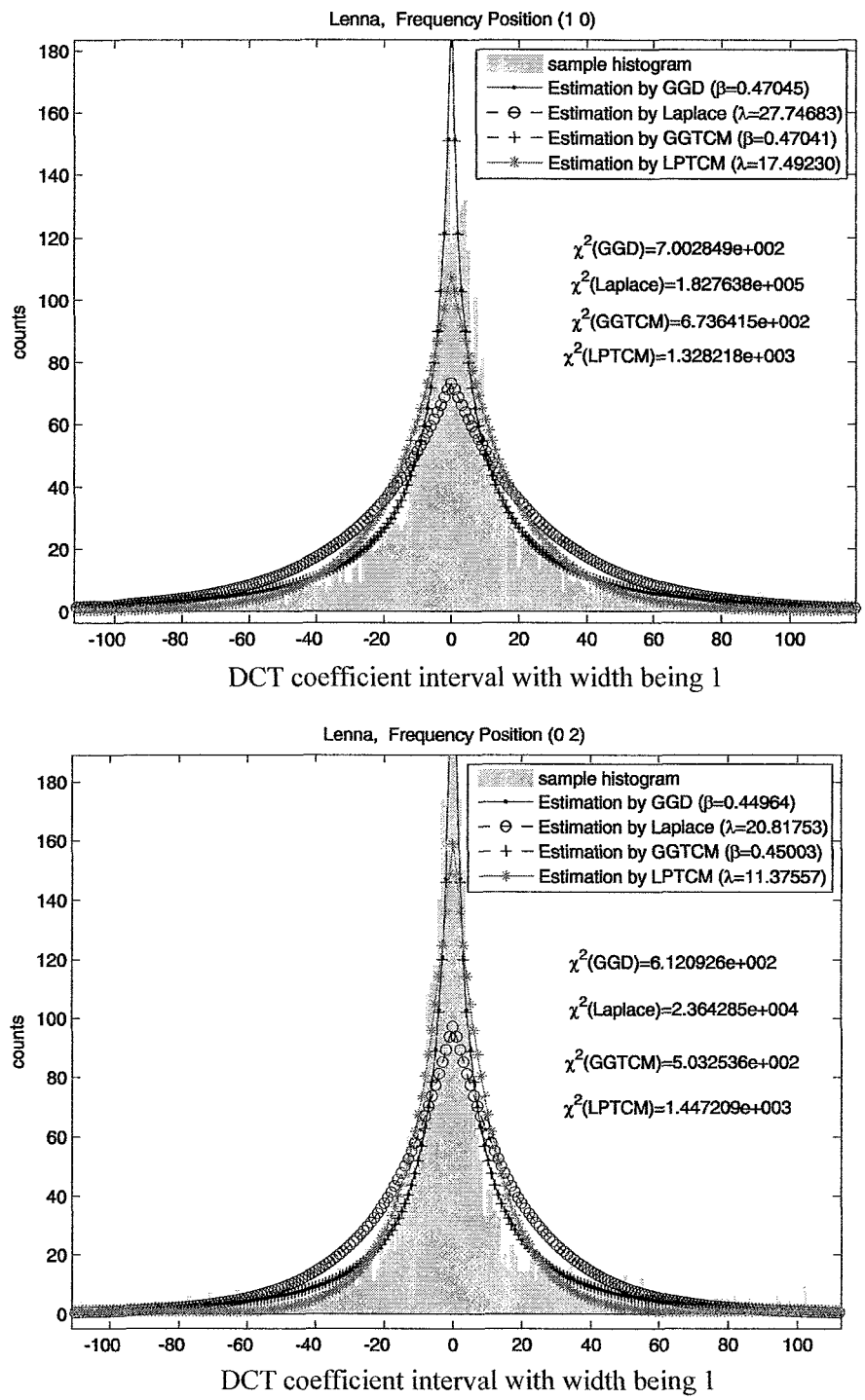
FIG. 3 illustrates the overall curves of the LPTCM and GGTCM for two AC components in the 8×8 DCT block of the 512×512 Lenna image.
Figure 4:
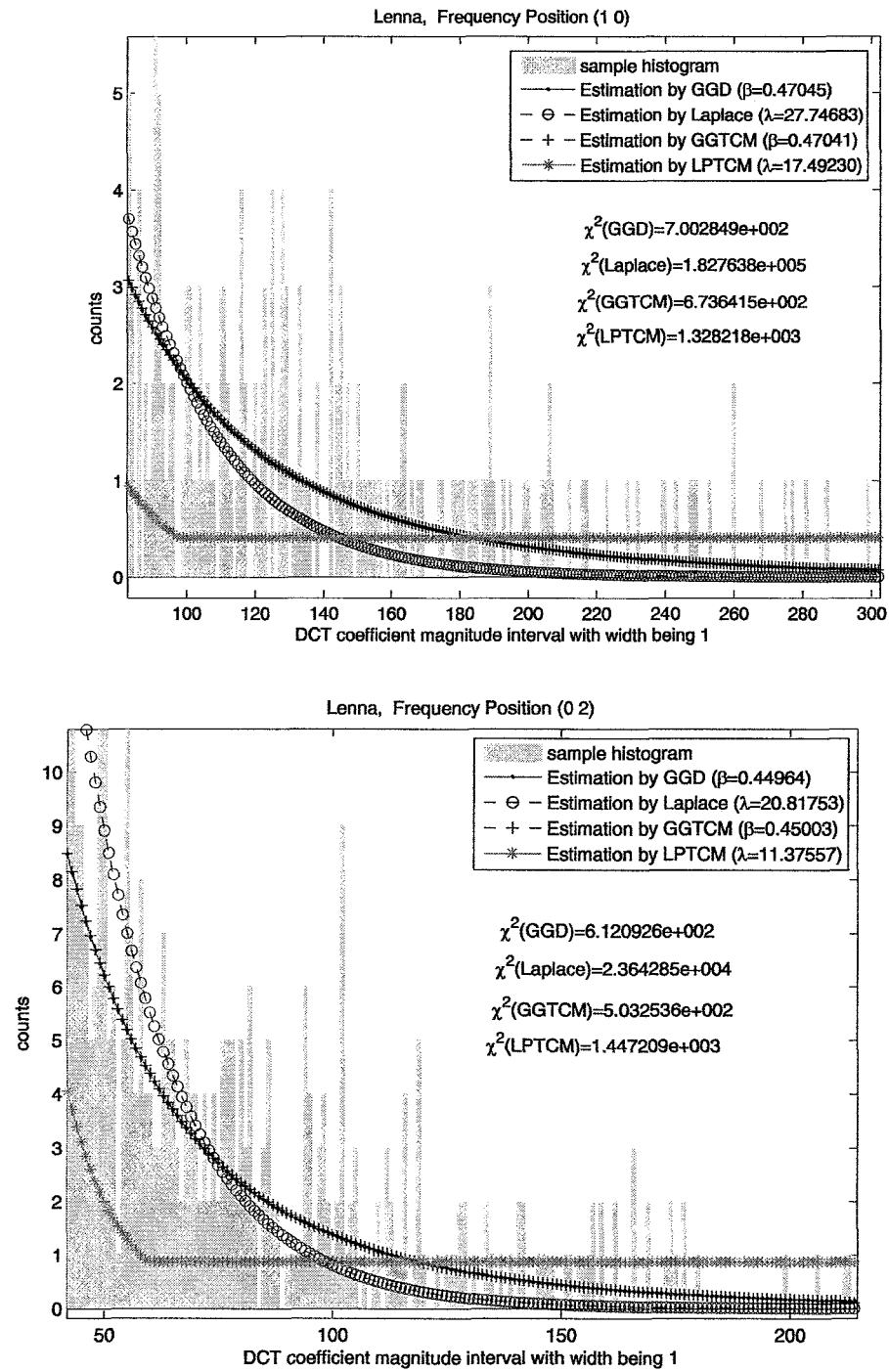
FIG. 4 illustrates detail of the overall curves of FIG. 3 of the tails of the LPTCM and GGTCM for two AC components in the 8×8 DCT block of the 512×512 Lenna image.

Plugging Algorithm 2 into Step 6 in Algorithm 1, one then gets an efficient algorithm for computing the ML estimate of $(y_c, b, \lambda)$ in the LPTCM. To illustrate the effectiveness of the LPTCM, the resulting algorithm was applied to the same DCT coefficients shown in FIG. 1. FIG. 3 shows the resulting LPTCM against the histogram of DCT coefficients on the whole in each respective case. FIG. 4 further zooms in the tail portion of FIG. 3. From FIGS. 3 and 4, it is clear that the LPTCM fits the histogram of DCT coefficients quite well and greatly improves upon the Laplacian model in each case. In comparison with the Laplacian model, it fits both the main and tail portions better. In terms of $\chi^2$ values, it matches up to the GG model. More detailed comparisons will be presented in Section 5.

3.4 GGTCM

Plugging the GG density function in (1) into (7), we get the GGTCM given by $$p(y \mid y_c, b, \alpha, \beta) \triangleq \qquad (29)$$

$$\begin{cases} \dfrac{b\beta}{2\alpha\gamma(1/\beta,(y_c/\alpha)^\beta)} e^{-(|y|/\alpha)^\beta} & \text{if } |y| < y_c \\ \dfrac{1-b}{2(a-y_c)} & \text{if } y_c < |y| \leq a \\ \max\left\{ \dfrac{b\beta}{2\alpha\gamma(1/\beta,(y_c/\alpha)^\beta)} e^{-(|y|/\alpha)^\beta}, \dfrac{1-b}{2(a-y_c)} \right\} & \text{if } |y| = y_c \\ 0 & \text{otherwise} \end{cases}$$

where $\gamma(s,x)$ is defined as $$\gamma(s,x) \triangleq \int_0^x t^{s-1} e^{-t} dt.$$

With reference to Algorithm 1, in this case, Step 6 in Algorithm 1 is equivalent to determining the ML estimate (denoted by $(\alpha_{y_c}, \beta_{y_c})$) of $(\alpha,\beta)$ in the truncated GG distribution $$p(y \mid \alpha, \beta) \triangleq \begin{cases} \dfrac{\beta}{2\alpha\gamma(1/\beta,(y_c/\alpha)^\beta)} e^{-(|y|/\alpha)^\beta} & \text{if } |y| \leq y_c \\ 0 & \text{otherwise} \end{cases} \qquad (30)$$

from the sample set $\{Y_i : i \in S\}$. Since $|Y_i| \leq y_c$ for any $i \in S$, the log-likelihood function of the sample set $\{Y_i : i \in S\}$ with respect to $p(y \mid \alpha,\beta)$ is equal to $$L(\alpha, \beta) \triangleq |S| \left[ \ln\beta - \ln 2\alpha - \ln\gamma\left(\frac{1}{\beta}, \left(\frac{y_c}{\alpha}\right)^\beta\right) \right] - \sum_{i \in S} \left| \frac{Y_i}{\alpha} \right|^\beta.$$

Therefore $$(\alpha_{y_c}, \beta_{y_c}) = \operatorname{argmax}_{\alpha,\beta} L(\alpha, \beta).$$

Computing the partial derivatives of $L(\alpha,\beta)$ with respect to $\alpha$ and $\beta$ and setting them to zero yields $$\begin{cases} \dfrac{1}{t} = \beta \left[ \dfrac{1}{|S|} \sum_{i \in S} \left| \dfrac{Y_i}{y_c} \right|^\beta + \dfrac{t^{1/\beta - 1} e^{-t}}{\gamma(1/\beta, t)} \right] \\ \beta = \ln t - \dfrac{\int_0^t y^{1/\beta - 1} e^{-y} \ln y \, dy}{\gamma(1/\beta, t)} + \dfrac{t\beta^2}{|S|} \sum_{i \in S} \left| \dfrac{Y_i}{y_c} \right|^\beta \ln\left| \dfrac{Y_i}{y_c} \right| \end{cases} \qquad (31)$$

where $t = (y_c/\alpha)^\beta$. One can then take a solution to (31) as $(\alpha_{y_c}, \beta_{y_c})$.

Unlike the case of LPTCM, however, solving (31) does not seem to be easy. In particular, at this point, we do not know whether (31) admits a unique solution. There is no developed algorithm with global convergence to compute such a solution either even if the solution is unique. As such, Step 6 in Algorithm 1 in the case of GGTCM is much more complicated than that in the case of LPTCM.

Suboptimal alternatives are to derive approximate solutions to (31). One approach is to solve the two equations in (31) iteratively, starting with an initial value of $\beta$ given by (2): (1) fix $\beta$ and solve the first equation in (31); (2) fix $\alpha$ and solve the second equation in (31); and (3) repeat these two steps until no noticeable improvement can be made. Together with this suboptimal solution to (31), Algorithm 1 was applied to to the same DCT coefficients shown in FIG. 1. FIG. 3 shows the resulting GGTCM against the histogram of DCT coefficients on the whole in each respective case. We note that the resulting GGTCM improves on the GG model marginally, which may be due to the suboptimal solution to (31).

4 Discrete Transparent Composite Model

Though DCT in theory provides a mapping from a real-valued space to another real-valued space and generates continuous DCT coefficients, in practice (particularly in lossy image and video coding), DCT is often designed and implemented as a mapping from an integer-valued space (e.g., 8-bits pixels) to another integer-valued space and gives rise to integer DCT coefficients (e.g., 12-bits DCT coefficients in H.264). In addition, since most images and video are stored in a compressed format such as JPEG, H.264, etc., for applications (e.g., image enhancement, image retrieval, image annotation, etc.) based on compressed images and video, DCT coefficients are available only in their quantized values. Therefore, it is desirable to establish a good model for discrete (integer or quantized) DCT coefficients as well.

Following the idea of continuous TCM, in this section we develop a discrete TCM which partitions discrete DCT coefficients into the main and tail portions, and models the main portion by a discrete parametric distribution and the tail portion by a discrete uniform distribution. The particular discrete parametric distribution we will consider is a truncated geometric distribution, and the resulting discrete TCM is referred to as the GMTCM. To provide a uniform treatment for both integer and quantized DCT coefficients, we introduce a quantization factor of step size. Then both integer and quantized DCT coefficients can be regarded as integers multiplied by a properly chosen step size.

4.1 GMTCM

Figure 5:
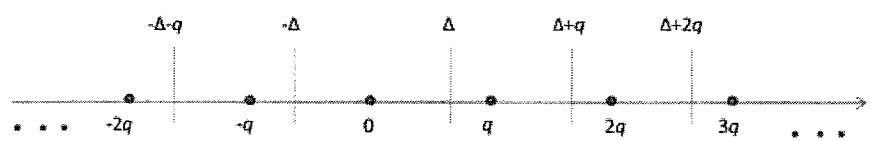
FIG. 5 illustrates uniform quantization with deadzone.

Uniform quantization with dead zone is widely used in image and video coding (see, for example, H.264 and HEVC). Mathematically, a uniform quantizer with dead zone and step size q is given by $$Q(X) = q \times \text{sign}(X) \times \text{round}\left(\frac{||X| - (\Delta - q/2)|}{q}\right)$$

where $q/2 \leq \Delta < q$. Its input-output relationship is shown in FIG. 5. Assume that the input X is distributed according to the Laplacian distribution in (3). Then the quantized index $$\text{sign}(X) \times \text{round}\left(\frac{||X| - (\Delta - q/2)|}{q}\right)$$

is distributed as follows $$p_0 = 1 - e^{-\frac{\Delta}{\lambda}} \quad (32)$$

$$p_i = \frac{1}{2} e^{-\frac{\Delta}{\lambda}} [1 - e^{-\frac{q}{\lambda}}] e^{-\frac{q}{\lambda}(|i|-1)}, \, i = \pm 1, \pm 2, \ldots$$

With the help of q, discrete (integer or quantized) DCT coefficients then take values of integers multiplied by q. (Hereafter, these integers will be referred to as DCT indices.) Note that $p_i$ in (32) is essentially a geometric distribution.

Using a geometric distribution to model the main portion of discrete DCT coefficients, we then get the GMTCM given by $$\begin{cases} p_0 = bp & (33) \\ p_i = b(1-p)\frac{1}{2}[1 - e^{-\frac{q}{\lambda}}]e^{-\frac{q}{\lambda}(|i|-1)} / (1 - e^{-\frac{q}{\lambda}K}) & \text{if } i = \pm 1, \pm 2, \ldots, \pm K \\ p_i = \frac{1-b}{2(a-K)} & \text{if } K < |i| \leq a \end{cases}$$

where $0 \leq p \leq 1$ is the probability of the zero coefficient, $0 \leq b \leq 1$, $1 \leq K \leq a$, and a is the largest index in a given sequence of DCT indices. Here a is assumed known, and b, p, $\lambda$ and K are model parameters.

4.2 ML Estimate of GMTCM Parameters 4.2.1 Algorithms

Let $u^n = u_1, u_2, \ldots, u_n$ be a sequence of DCT indices. Assume that $u^n$ behaves according to the GMTCM defined by (33) with $u_{max} \triangleq \max\{|u_i| : 1 \leq i \leq n\} \leq a$. We now investigate how to compute the ML estimate $(b^*, p^*, \lambda^*, K^*)$ of $(b, p, \lambda, K)$ from $u^n$.

Let $$N_0 = \{j : u_j = 0\}, N_1(K) = \{j : 0 < |u_j| \leq K\}, \text{ and}$$
$$N_2(K) = \{j : |u_j| > K\}.$$

The log-likelihood function of $u^n$ according to (33) is equal to $$G(K, \lambda, b, p) \triangleq \qquad (34)$$
$$|N_2(K)|\ln(1-b) + (|N_0| + |N_1(K)|)\ln b + |N_0|\ln p + |N_1(K)|\ln(1-p) -$$
$$|N_2(K)|\ln 2(a-K) + |N_1(K)|\ln \frac{1 - e^{-\frac{q}{\lambda}}}{2(1 - e^{-\frac{q}{\lambda}K})} - \frac{q}{\lambda}\sum_{j \in N_1(K)}(|u_j| - 1).$$

Then we have $$(b^*, p^*, \lambda^*, K^*) = \text{argmax}_{b, p, \lambda, K} G(K, \lambda, b, p). \qquad (35)$$

For any $1 \leq K \leq a$, let $$L(K, \lambda) \triangleq |N_1(K)|\ln \frac{1 - e^{-\frac{q}{\lambda}}}{2(1 - e^{-\frac{q}{\lambda}K})} - \frac{q}{\lambda}\sum_{j \in N_1(K)}(|u_j| - 1)$$

and $$(b(K), p(K), \lambda_K) \triangleq \text{argmax}_{b, p, \lambda} G(K, \lambda, b, p).$$

In view of (34), one can verify that $$b(K) = \frac{|N_0| + |N_1(K)|}{n} \qquad (36)$$

$$p(K) = \frac{|N_0|}{|N_0| + |N_1(K)|}$$

and whenever $K > 1$, $$\lambda_K = \text{argmax}_{0 \leq \lambda \leq \infty} L(K, \lambda).$$

When $K=1$, $G(K, \lambda, b, p)$ does not depend on $\lambda$ and hence $\lambda_1$ can selected arbitrarily.

We are now led to determining $\lambda_K$ for each $1 < K \leq a$. At this point, we invoke the following lemma, which is proved in Appendix A (below).

Lemma 1: Let $$g(t) \triangleq \frac{e^{-t}}{1-e^{-t}} - \frac{Ke^{-Kt}}{1-e^{-Kt}}.$$

Then for any $$1 < K \leq a, L\left(K, \frac{q}{t}\right)$$

as a function of t>0 is strictly concave, and for any K>1, g(t) is strictly decreasing over t∈(0,∞), and $$\lim_{t \to 0^+} g(t) = \frac{K-1}{2} \text{ and } \lim_{t \to \infty} g(t) = 0,$$

Computing the derivative of L(K,λ) with respect to λ and setting it to 0 yields $$\frac{e^{-q/\lambda}}{1-e^{-q/\lambda}} - K\frac{e^{-Kq/\lambda}}{1-e^{-Kq/\lambda}} - C = 0 \quad (37)$$

where $$C = \frac{1}{|N_1(K)|} \sum_{j \in N_1(K)} (|u_j| - 1).$$

In view of Lemma 1, then it follows that (1) when C=0, $\lambda_K$=0; (2) when $$C \geq \frac{K-1}{2}, \lambda_K = \infty;$$

and (3) when $$0 < C < \frac{K-1}{2},$$

is the unique solution to (37). In Case (3), the iterative procedure described in Algorithm 3 (FIG. 14) can be used to find the unique root of (37).

Combining the above derivations together, we get a compete procedure for computing the ML estimate (b*, p*, λ*, K*) of (b, p, λ, K) in the GMTCM, which is described in Algorithm 4 (FIG. 15).

Remark 2: When implementing Algorithm 4 for actual DCT indices {$u_i$: 1≤i≤n} with flat tail, there is no need to start Algorithm 4 with K=1. Instead, one can first choose $K_0$ such that |$N_2(K_0)$| is a fraction of n and then run Algorithm 4 for K∈[$K_0$, a]. In our experiments, we have found that choosing $K_0$ such that |$N_2(K_0)$| is around 20% of n is a good choice.

4.2.2 Convergence and Complexity Analysis

In parallel with Algorithm 2, Algorithm 3 also converges exponentially fast when 0<C<(K−1)/2. In particular, we have the following result, which is proved in Appendix B (below).

Theorem 3: Assume that 0<C<(K−1)/2. Then $\lambda^{(i)}$ computed in Step 12 of Algorithm 3 strictly increases and converges exponentially fast to $\lambda_K$ as i→∞.

The complexity of computing the ML estimate of the GMTCM parameters comes from two parts. The first part is to evaluate the cost of (34) over a set of K. The second part is to compute $\lambda_K$ for every K using the Algorithm 3. Note that C in Algorithm 3 can be easily pre-computed for interesting values of K. Thus, the main complexity of Algorithm 3 is to evaluate the two simple equations in (38) for a small number of times in light of the exponential convergence, which is generally negligible. Essentially, the major complexity for the parameter estimation by Algorithms 3 and 4 is to collect the data histogram {$h_j$,j=1, . . . , a} once. Compared with the complexity of solving (2) for GG parameters, where the data samples and the parameters to be estimated are closely tied together as in the $\Sigma_{i=1}^{n}|x_i|^\beta \log |x_i|$ term and the $\beta\Sigma_{i=1}^{n}|x_i|^\beta$ term, the complexity of parameter estimation in the case of GMTCM is significantly lower.

Remark 3: In our discussion on TCMs for DCT coefficients so far, DCT coefficients are separated into two portions: the main portion and tail portion. As will be apparent to one skilled in the art, the main portion could be further separated into multiple sub-portions with each sub-portion modeled by a different parametric distribution. The resulting TCM would be called a multiple segment TCM (MTCM), described in greater detail below. In addition, the tail portion could be modeled by another parametric distribution such as a truncated Laplacian, GG, or geometric distribution as well since a uniform distribution is a de-generated Laplacian, GG, or geometric distribution.

Remark 4: Although we have used both continuous and discrete DCT coefficients as our data examples, all TCM models discussed so far are applied equally well to other types of data such as wavelet transform coefficients, prediction residuals arising from prediction in predictive coding and other prediction applications, and data which is traditionally modeled by Laplacian distributions.

5 Experimental results on Tests of Modeling Accuracy

This section presents experimental results obtained from applying TCMs to both continuous and discrete DCT coefficients and compare them with those from the Laplacian and GG models.

5.1 Test Materials and Performance Metric

Two criteria are applied in this disclosure to test modeling accuracy: the $\chi^2$ test, as defined in (6), and the divergence distance test defined as follows $$d = \sum_{i=1}^{I} p_i \ln \frac{p_i}{q_i}, \quad (40)$$

where I is the number of intervals into which the sample space is partitioned in the continuous case or the alphabet size of a discrete source, $p_i$ represents probabilities observed from the data, and $q_i$ stands for probabilities obtained from a given model. Note that $p_i$=0 is dealt with by defining 0 ln 0=0.

Three sets of testing images are deliberately selected to cover a variety of image content. The first set, as shown in FIG. 6, includes 9 standard 512×512 images with faces, animals, buildings, landscapes, etc, referred to as, from left to right and row by row, 'bird', 'boat', 'fish', 'couple/Cp', 'hill', 'lenna', 'baboon/Bb', 'mountain/Bt', and 'pepper/Pp', respectively. The second set, as shown in FIG. 7, has five high definition (1920×1080) frames selected from the first frame of each class-B sequences used for HEVC standardization tests [3], and referred to as, from left to right, 'B1', 'B2', 'B4', and 'B5', respectively. The third set, as shown in FIG. 8, is taken from the first frame of four class-F sequences used for HEVC screen content tests, and referred to as, from left to right, 'SE', 'SS', 'CS', and 'BbT', respectively.

Tests for continuous DCT coefficients were conducted by computing 8×8 DCT using floating point matrix multiplication. In our tests for discrete DCT coefficients, a raw image was first compressed using a Matlab JPEG codec with various quality factors (QF) ranging from 100, 90, 80, to 70; the resulting quantized DCT coefficients and corresponding quantization step sizes were then read from obtained JPEG files.

Tests were carried out for five different models: the Laplacian model, GG model, GGTCM, LPTCM, and GMTCM. Due to its high computation complexity, GGTCM was applied only to continuous DCT coefficients. On the other hand, GMTCM is applicable only to discrete coefficients. The Laplacian and GG models were applied to both continuous and discrete DCT coefficients; the same parameter estimation algorithms, (4) for the Laplacian model and (2) for the GG model, were used for both continuous and discrete DCT coefficients.

5.2 Overall Comparisons for Each Image

In the continuous case, the GGTCM outperforms the GG model, the LPTCM outperforms the Laplacian model, and the GG models outperforms the Laplacian model in general, as one would expect. An interesting comparison in this case is between the GG model and LPTCM. Table 1 (FIG. 16) shows the percentage $w_{\chi^2}$ of frequencies among 63 AC positions that are in favor of the LPTCM over the GG model for each of 9 images in Set 1 in terms of the $\chi^2$ metric. For example, for the image 'bird', in terms of the $\chi^2$ metric, the LPTCM is better than the GG model for 62 out of 63 frequencies; for the image 'lenna', the LPTCM is better than the GG model for 42 out of 63 frequencies. Overall, it would be fair to state that the LPTCM and GG model behave similarly in terms of modeling accuracy. And yet, the LPTCM has much lower computation complexity than the GG model.

In the discrete case, comparisons were conducted among the GMTCM, GG model, and Laplacian model in terms of both the divergence distance and $\chi^2$ value. As expected, the GMTCM is always better than the Laplacian model according to both the divergence distance and $\chi^2$ value, and hence the corresponding results are not included here. For the comparison between the GMTCM and GG model, results are shown in Tables 2, 3, 4, and 5 for quantized DCT coefficients from JPEG coded images with various QFs, where $w_d$ stands for the percentage of frequencies among all tested AC positions that are in favor of the GMTCM over the GG model in terms of the divergence distance, and $w_{\chi^2}$ has a similar meaning but in terms of the $\chi^2$ value. In Tables 2, all 63 AC positions were tested; in Tables 3, 4, and 5, all AC positions with 6 or more different non-zero AC coefficient magnitudes were tested. These tables show that when all quantization step sizes are 1, corresponding to QF=100, the comparison between the GMTCM and GG model is similar to that between the LPTCM and GG model, i.e., their performances are close to each other. However, with quantization step sizes increasing, the GMTCM starts to outperform the GG model significantly, as shown in Tables 3, 4, and 5, for all tested images.

5.3 Comparisons of $\chi^2$ Among Three Models for Individual Frequencies

In the above overall comparisons, Table 2 (FIG. 17) shows that the GMTCM and GG model are close, while the GMTCM wins the majority over the GG model for all other cases as shown in Tables 3-5 (FIGS. 18-20). We now zoom in to look at the $\chi^2$ values for all tested frequency positions for several representative images: (1) 'bird' which is strongly in favor of the GMTCM in Table 2; (2) 'CS' which is strongly in favor of the GG model in Table 2; and (3) 'boat' for which the GMTCM and GG model tie more or less in Table 2. The respective $\chi^2$ values are presented in Tables 6, 7, and 8, respectively. Table 6 (FIG. 21) shows the $x^2$ distances by the GG model, GMTCM, and Laplacian model for all 63 ACs from JPEG-coded image 'bird' with QF=100. Table 7 (FIG. 22) shows the $\chi^2$ distances by the GG model, GMTCM, and Laplacian model for all 63 ACs from JPEG-coded image 'boat' with QF=100. Table 8 (FIG. 23) shows the $\chi^2$ distances by the GG model, GMTCM, and Laplacian model for all 63 ACs from JPEG-coded image 'CS' with QF=100.

From Tables 6, 7, and 8, it is fair to say that (1) the GMTCM dramatically improves the modeling accuracy over the Laplacian model; (2) when the GMTCM is better than the GG model, $\chi_{GMTCM}^2$ is often much smaller, up to 15658 tunes smaller, than $\chi_{GGD}^2$; and (3) when the GG model is better than the GMTCM, the difference between $\chi_{GMTCM}^2$ and $\chi_{GGD}^2$ is not as significant as one would see in Case (2)—for example, in Table 8, $\chi_{GGD}^2$ is only up to 9 times smaller than $\chi_{GMTCM}^2$.

Another interesting result is observed in Table 9 (FIG. 24), which shows the $\chi^2$ values for JPEG coded 'CS' image with QF=90. Compared with the case where the source is JPEG coded with smaller step size QF=100 as shown in Table 8, most ACs now show better modeling accuracy by the GMTCM than by the GG model when the quantization step size increases.

6 Applications

Figure 25:
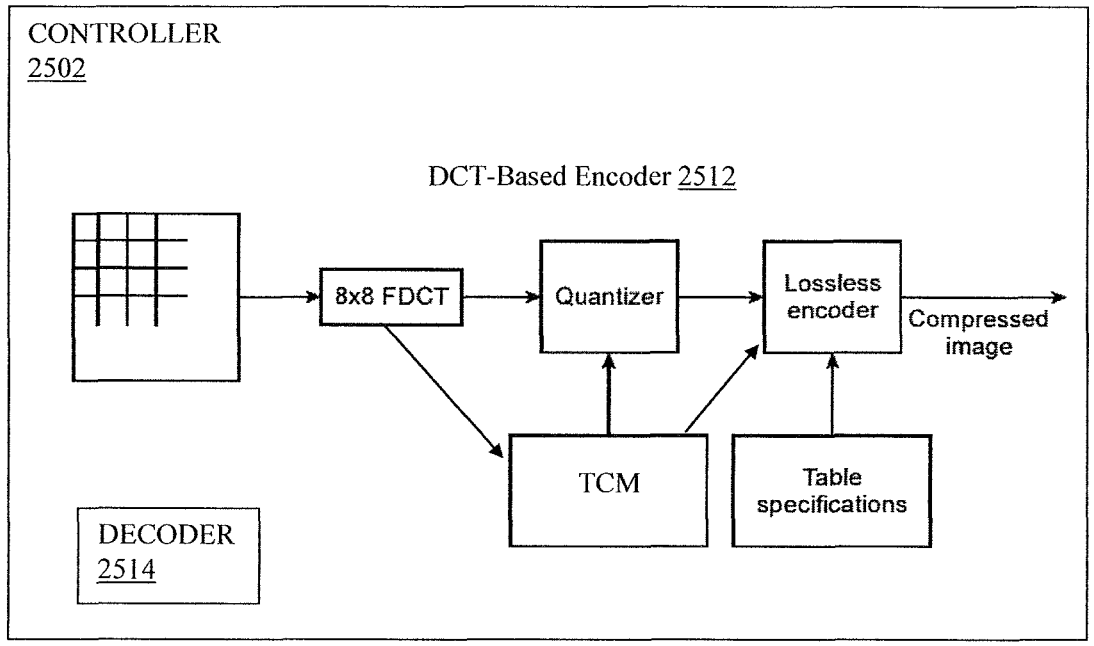
FIG. 25 illustrates a block diagram of an example device, in accordance with an example embodiment.

This section briefly discusses applications of TCM in various areas such as data compression and image understanding. For example, as shown in FIG. 25, a computer device 2500 can be used to implement the methods of example embodiments described herein. The computer device 2500 can include a controller 2502 or processor operably coupled to, for example, a memory 2504, a communication subsystem 2506, a display 2508, and other input or output devices 2510. The controller can include modules configured to implement an encoder 2512 and/or a decoder 2514, in accordance with example embodiments. The communication subsystem 2506 can be used to access DCT coefficients stored in a second device or server, for example. The communication subsystem 2506 can be used to send communications to another device.

6.1 Data Compression

As DCT is widely used in image/video compression, e.g. in JPEG, H.264, and HEVC, an accurate model for DCT coefficients would be helpful to further improvement in compression efficiency, complexity, or both in image/video coding.

6.1.1 Lossless Coding Algorithm Design

Entropy coding design in image and video coding such as JPEG, H.264 and HEVC is closely related to understanding the DCT coefficient statistics, due to the wide application of DCT in image and video compression. The superior modeling accuracy by TCM has been utilized by us to design an entropy coding scheme for discrete DCT coefficients (such as in JPEG images). Specifically, GMTCM parameters are calculated and coded for each frequency. Then, a bit-mask is coded to identify outliers, so that outliers and DCT coefficients within the main portion can be further coded separately with their respective context modeling. For DCT coefficients within the main portion, parameters of the truncated geometric distributions are encoded and then used to further improve the coding efficiency. In spite of the overhead for coding outliers flags, the new entropy codec shows on average 25% rate saving when compared with a standard JPEG entropy codec for high fidelity JPEG images (with quantization step size being 1 for most low frequency AC positions), which are significantly better than other state-of-the-art lossless coding methods for DCT coefficients [15] and for gray-scale images [16]. A suitable decoder can implement at least some or all of the functions of the encoder, as an inverse.

6.1.2 Lossy Coding Algorithm Design

Quantization design, as the core of lossy coding, roots in the rate distortion theory, which generally requires a statistic model to provide guidance to practical designs. Quantization design in DCT-based image and video coding usually assumes a Laplacian distribution due to its simplicity and fair modeling accuracy [12]. Since the LPTCM improves dramatically upon the Laplacian model in terms of modeling accuracy while having similar simplicity, it has been applied by us in to design quantizers for DCT coefficients and a DCT-based non-predictive image compression system, which is significantly better than JPEG and the state-of-the-art DCT-based non-predictive image codec [14] in terms of compression efficiency and compares favorably with the state-of-the-art DCT-based predictive codecs such as H.264/AVC intra coding and HEVC intra coding in high rate cases in terms of the trade-off between compression efficiency and complexity.

For example, as shown in FIG. 25, the controller 2502 can be configured to implement an encoder 2512. For example, an image/video encoder can include three steps: forward DCT (FDCT), quantization, and lossless encoding. The encoder first partitions an input image into 8×8 blocks and then processes these 8×8 image blocks one by one in raster scan order. Each block is first transformed from the pixel domain to the DCT domain by an 8×8 FDCT. A TCM model having respective parameters is generated which models the DCT coefficients. The resulting DCT coefficients are then quantized based on the determined TCM model. In an example embodiment, as shown, the quantization can be optimized using the determined TCM model. The DCT indices from the quantization are encoded in a lossless manner, for example, based on the determined TCM model again. The encoded DCT indices along with parameters of the determined TCM model are finally either saved into a compressed file or sent to the decoder. If the original input image is a multiple component image such as an RGB color image, the pipeline process of FDCT, quantization, and lossless encoding is conceptually applied to each of its components (such as its luminance component Y and chroma components Cr and Cb in the case of RGB color images) independently.

6.2 Image Understanding

Image understanding is another application for DCT coefficient modeling. It is interesting to observe that in natural images the statistically insignificant outliers detected by the GMTCM carry perceptually important information, which shed lights into DCT-based image analysis.

6.2.1 Featured Outlier Images Based on GMTCM

One important parameter in the GMTCM model is the cutting point $y_c = Kq$ between a parametric distribution for the main portion and the uniform distribution for the flat tail portion. Statistically, the outlier coefficients that fall beyond $y_c$ into the tail portion are not significant—although the actual number of outliers varies from one frequency to another and from one image to another, it typically ranges in our experiments from less than 0.1% of the total number of AC coefficients to 19% with an average around 1.2%. However, from the image quality perception perspective, the outliers carry very important information, as demonstrated by FIGS. 9, 10 and 11.

Figure 9:
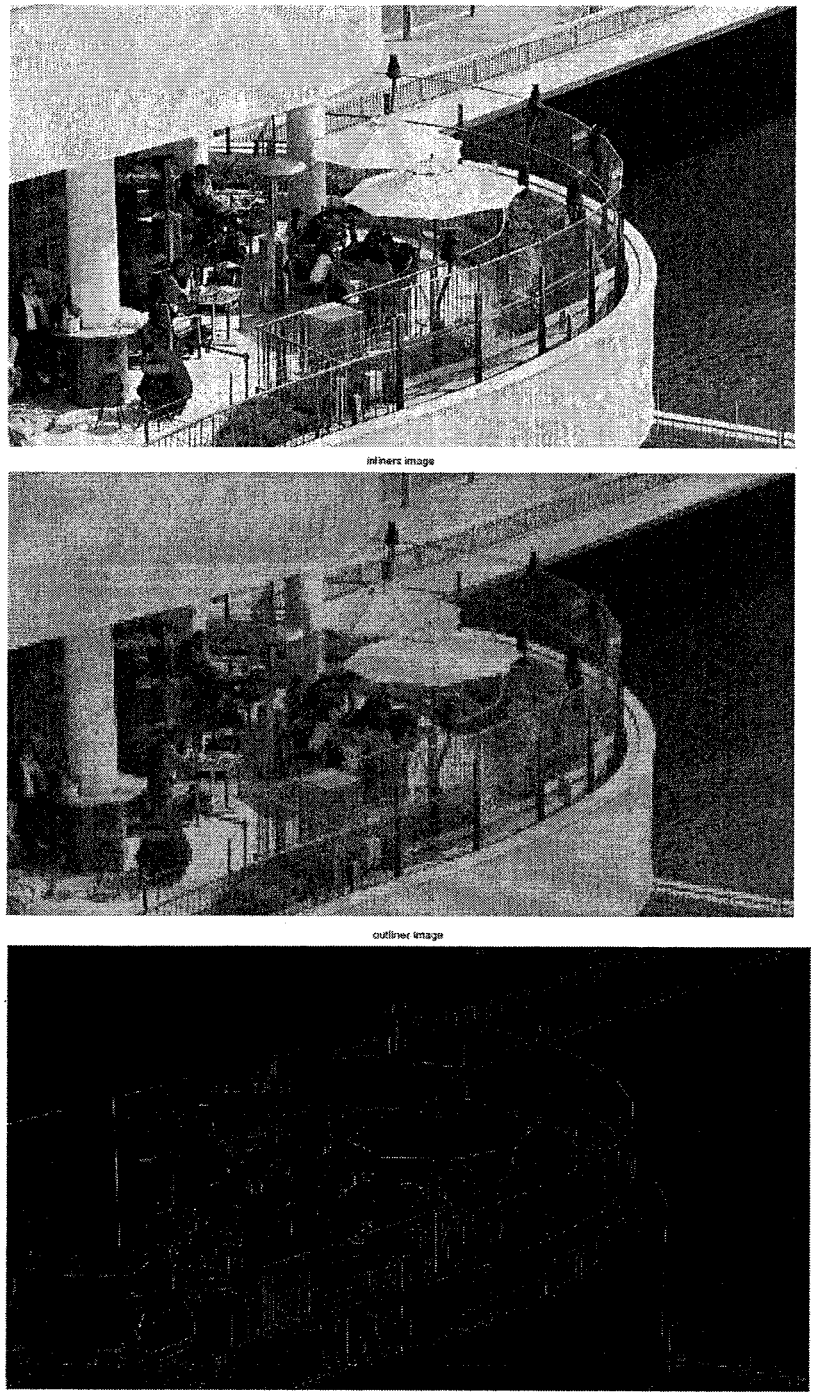
FIG. 9 illustrates an original image (top), inlier image (middle), and outlier image (bottom), with demonstration of the perceptual importance of outlier coefficients by the image of 'terrace'.
Figure 11:
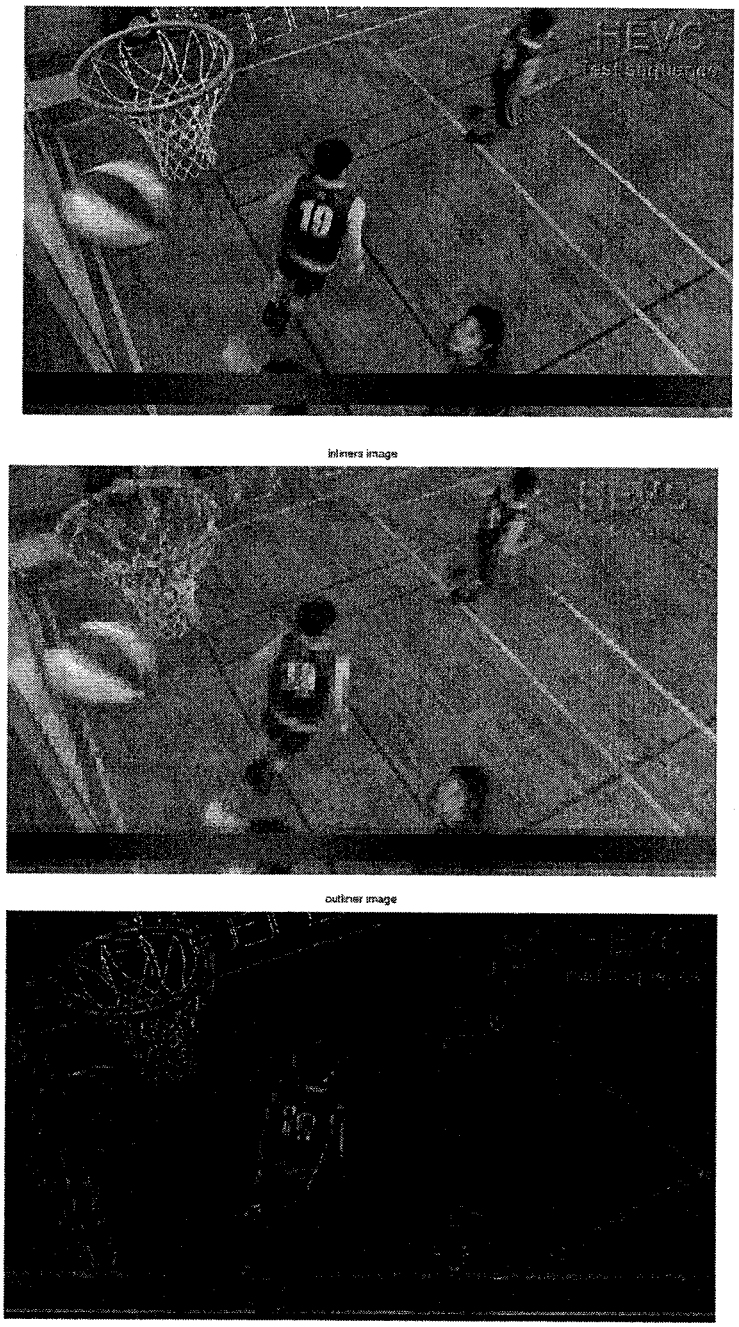
FIG. 11 illustrates an original image (top), inlier image (middle), and outlier image (bottom), with demonstration of the perceptual importance of outlier coefficients by the image of 'BbT'.

FIGS. 9-11 each include an original image, a so-called inlier image, and a so-called outlier image. An inlier image is generated by first forcing all outlier coefficients to zero and then performing the inverse DCT. An outlier image, on the other hand, is generated by first keeping only outliers, forcing all other DCT coefficients to zero, and then performing the inverse DCT. Three original images are taken from the three test sets with one from each set to show the perceptual importance of their respective outliers.

As the inlier image contains all DC components and inlier AC components, a down-sizing operation would impact our perception on the difference between the original image and the inlier image. Hence, FIGS. 9-11 are presented in a possibly large size. In FIG. 9, the outlier image captures most structural information as the railing. In FIG. 10, the outlier image shows a fine sketch of the face, while the inlier image with all statistically significant coefficients shows an undesired quality, particularly with the blurring of eyes. In FIG. 11, the basketball net is well sketched in the outlier image, but is much blurred in the inlier image. From these figures, it is evident that the tail portion is perceptually important. This, together with the statistical insignificance of outliers, makes the outlier image appealing to image understanding. On one hand, compared with the original image, the outlier image achieves dramatic dimension reduction. On the other hand, due to the preservation of perceptually important global information of the original image in the outlier image, some aspects of image understanding can be carried out instead from the outlier image with perhaps better accuracy and less computation complexity.

It is interesting to show the information rate for outliers, i.e., how many bits are needed to represent outlier images. We have also applied TCM to enhance entropy coding design for DCT coefficients, where outliers are encoded separately from inliers. It is observed that outliers only consume about 5% of the total bits.

Finally, it is worthwhile to point out that outlier images are related to, but different from conventional edge detection. An outlier image captures some global uniqueness in an image, while edges are usually detected based on local irregularity in the pixel domain. For example, the large area of vertical patterns on the left-top corner of FIG. 9 is not captured as outliers because those vertical patters repeat themselves many times in the image, while it shows up as edges.

6.2.2 Image Similarity

Similarity measurement among images plays a key role in image management, which attracts more and more attention in industry nowadays due to the fast growth of digital photography in the past decade. One application of DCT models is to measure the similarity among images by estimating the model parameters of different images and calculating a distribution distance. Because DCT coefficients well capture some spatial patterns in the pixel domain, e.g., $AC_1$ reflecting a vertical pattern and $AC_8$ preserving a horizontal pattern, the distribution distance between DCT coefficient models well represents the similarity between two images. Apparently, this type of similarity measurement roots in data histogram. Yet, in practice, histogram is not a good choice to be used, as it requires a flat overhead. This is particularly problematic for a large scale image management system. On the other hand, model-based distribution distances use only a few parameters with negligible overhead, thus providing a good similarity measurement between digital images particularly when the modeling accuracy is high. The inventors have studied along this line to use the GMTCM for image similarity and show promising performance.

The outlier images shown and discussed in Subsection 6.2.1 can be used to further enhance image similarity testing based on model-based distribution distances. Since outliers are insignificant statistically, their impact on model-based distribution distances may not be significant. And yet, if two images look similar, their respective outlier images must look similar too. As such, one can build other metrics based on outlier images to further enhance image similarity testing. In addition, an outlier image can also be used to detect whether a given image is scenic and to help improving face detection. These and other applications using the GMTCM are contemplated as being within the scope of the present disclosure.

Figure 26:
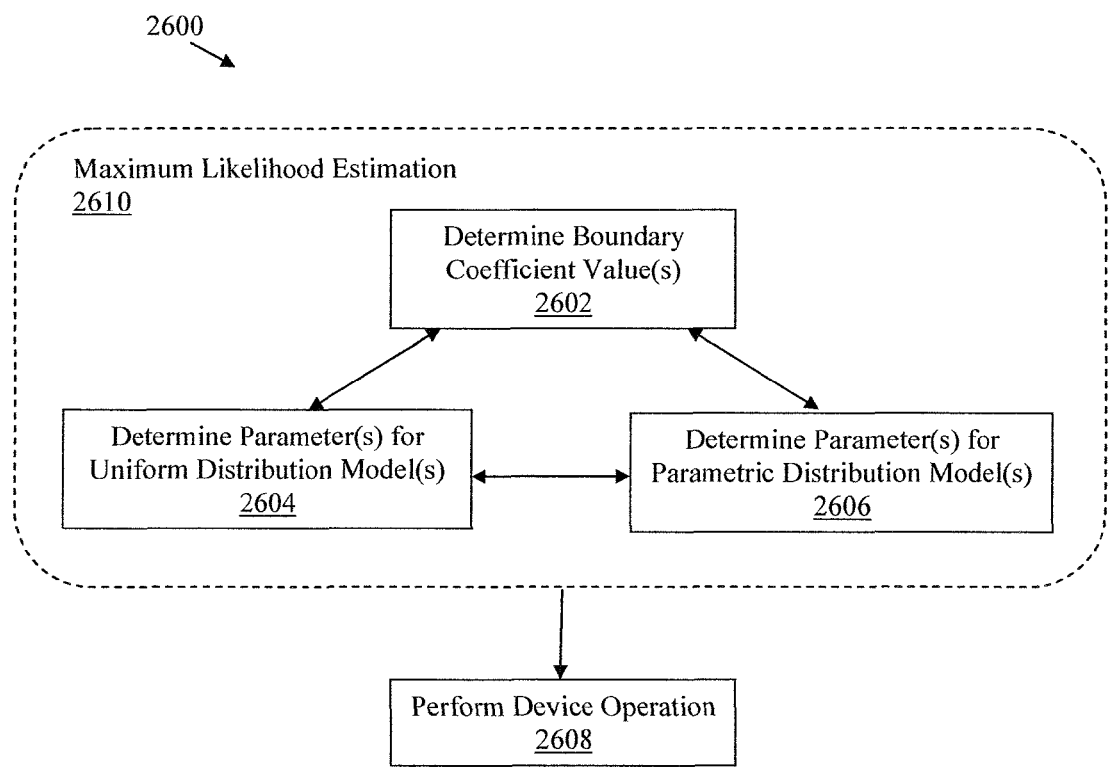
FIG. 26 illustrates an example method for modelling a set of transform coefficients, in accordance with an example embodiment.

Reference is now made to FIG. 26, which shows an example method 2600 for modelling a set of transform coefficients, for example implemented by the device 2500 (FIG. 25) or a plurality of devices, in accordance with an example embodiment. At event 2602, the method 2600 includes determining at least one boundary coefficient value, for example using maximum likelihood estimation 2610. At event 2604, the method 2600 includes determining one or more parameters of a first distribution model, for example a uniform distribution model or other model, for transform coefficients of the set the magnitudes of which are greater than one of the boundary coefficient values. At event 2606, the method 2600 includes determining parameters of at least one further distribution model, such as at least one parametric distribution model, for transform coefficients of the set the magnitudes of which are less than one of the boundary coefficient values. The events 2602, 2604, 2606 are illustrated with double-arrows because of the co-dependence between the variables or parameters of the events 2602, 2604, 2606, including any iterative processes.

From the method 2600, a composite distribution model can be defined as a composite of the first distribution model (e.g. uniform distribution model) and the at least one further distribution model having the respective determined parameters. At event 2608, the method 2600 includes performing a device operation on at least part of the composite distribution model. For example, the device operation may be implemented on one of the distribution models but not the others. In an example embodiment, the device operation is performed on the entire composite distribution model.

In an example embodiment, the at least one parametric distribution model includes at least one of: a Laplacian distribution model, a generalized Gaussian model, and a geometric distribution model.

Referring to event 2608, in some example embodiments, the device operation includes at least one of storing on a memory, transmitting to a second device, transmitting to a network, outputting to an output device, displaying on a display screen, improving data compression of the set of transform coefficients using the composite distribution model, determining image similarity between different images by comparing at least part of the composite distribution model, determining a goodness-of-fit between the composite distribution model and the set of transform coefficients, and generating an identifier which associates the composite distribution model with the set of transform coefficients.

The set of transform coefficients includes: discrete cosine transform coefficients, Laplace transform coefficients, Fourier transform coefficients, wavelet transform coefficients, prediction residuals arising from prediction in predictive coding and other prediction applications, or data which is traditionally modeled by Laplacian distributions. The set of transform coefficients can be generated in real-time (e.g. from a source image or media file), obtained from the memory 2504 (FIG. 25) or from a second device.

Reference is still made to FIG. 26, which illustrates another example method 2600 for a set of transform coefficients using TCM, for example implemented by the device 2500 (FIG. 25), in accordance with an example embodiment. In an example embodiment, the method 2600 can be used to filter the set of transform coefficients which are bounded by one of the boundary coefficient values, for example.

At event 2610, the method 2600 includes determining at least one boundary coefficient value which satisfies a maximum likelihood estimation between the set of transform coefficients and a composite distribution model which is a composite of a plurality of distribution models each for a subset of transform coefficients of the set bounded by each of the at least one boundary coefficient values. This can include determining one or more parameters of a first distribution model, for example at least one uniform distribution model, for transform coefficients of the set the magnitudes of which are greater than one of the boundary coefficient values. This can include determining parameters of at least one further distribution model, such as at least one parametric distribution model, for transform coefficients of the set the magnitudes of which are less than the one of the boundary coefficient values. The maximum likelihood estimation at event 2610 is illustrated with double-arrows because of the co-dependence between the variables or parameters between the at least one boundary coefficient value and the distribution models.

At event 2608, the method 2600 includes performing a device operation on at least one of the subsets of transform coefficients. In some example embodiments, the device operation on the at least one of the subsets of transform coefficients includes at least one of: encoding, storing on a memory, transmitting to a second device, transmitting to a network, outputting to an output device, decoding, displaying a decoded version on a display screen, determining image similarity between different images by comparison of the at least one of the subsets of discrete transform coefficients, and generating an identifier which associates the composite distribution model with the at least one of the subsets of discrete transform coefficients.

Still referring to event 2608, the device operation on the subset of coefficients can be used to filter an image using the boundary coefficient value, for example maintaining at least one subset bounded by the boundary coefficient value and setting the remaining subsets of coefficient values to a zero value. The remaining subset(s) can then be decoded and displayed on a display, for example. This has been illustrated in detail with respect to FIGS. 9-11, for example.

7 Conclusions to TCM

Motivated by the flat tail phenomenon in DCT coefficients and its perceptual importance, this disclosure has developed a model dubbed transparent composite model (TCM) for modeling DCT coefficients, which separates the tail portion of DCT coefficients from the main portion of DCT coefficients and uses a different distribution to model each portion: a uniform distribution for the tail portion and a parametric distribution such as truncated Laplacian, generalized gaussian (GG), and geometric distributions for the mail portion. Efficient online algorithms with global convergence have been developed to compute the ML estimates of the parameters in the TCM. It has been shown that among the Laplacian model, GG model, GGTCM, and LPTCM, the GGTCM offers the best modeling accuracy for real-valued DCT coefficients at the cost of large extra complexity. On the other hand, for discrete DCT coefficients, tests over a wide variety of images based on both divergence distance and $\chi^2$ test have shown that the GMTCM outperforms both the Laplacian and GG models in term of modeling accuracy in majority cases while having simplicity and practicality similar to those of the Laplacian model, thus making the GMTCM a desirable choice for modeling discrete DCT coefficients in real-world applications. In addition, it has been demonstrated that the tail portion identified by the GMTCM gives rise to an image called an outlier image, which, on one hand, achieves dramatic dimension reduction in comparison with the original image, and on the other hand preserves perceptually important unique global features of the original image. It has been further suggested that the applications of the TCM, in particular the LPTCM and GMTCM, include image and video coding, quantization design, entropy coding design, and image understanding and management (image similarity testing, scenic image blind detection, face detection, etc.).

Appendix A

In this appendix, we prove Lemma 1.

First note that g(t) can be rewritten as $$g(t) = K - 1 + \frac{1}{1 - e^{-t}} - \frac{K}{1 - e^{-Kt}}.$$

Its derivative is equal to $$g'(t) = \frac{-e^{-t}}{(1-e^{-t})^2} + \frac{K^2 e^{-Kt}}{(1-e^{-Kt})^2}$$

$$= -\frac{e^{-t}}{(1-e^{-Kt})^2}\left[\frac{(1-e^{-Kt})^2}{(1-e^{-t})^2} - K^2 e^{-(K-1)t}\right]$$

$$= -\frac{e^{-t}}{(1-e^{-Kt})^2}\left[\left(\sum_{i=0}^{K-1} e^{-it}\right)^2 - K^2 e^{-(K-1)t}\right]$$

$$= -\frac{e^{-t}}{(1-e^{-Kt})^2}\left[\left(\sum_{i=0}^{K-1} e^{-it}\right) - Ke^{-(K-1)t/2}\right] \cdot \left[\left(\sum_{i=0}^{K-1} e^{-it}\right) + Ke^{-(K-1)t/2}\right].$$

It is not hard to verify that $$\left[\left(\sum_{i=0}^{K-1} e^{-it}\right) - Ke^{-(K-1)t/2}\right] = \sum_{i=0}^{K_L} \left(e^{-it/2} - e^{-\frac{K-1-i}{2}t}\right)^2 > 0$$

whenever K>1, where $$K_L = \text{floor}\left(\frac{K}{2}\right) - 1.$$

This, together with (41), implies that $g^1(t) < 0$ for any $t > 0$ whenever K>1. Hence g(t) is strictly decreasing over $t \in (0, \infty)$.

Next we have $$\lim_{t \to 0^+} g(t) = \lim_{t \to 0^+} \frac{e^{-t}}{1-e^{-Kt}}\left[\sum_{i=0}^{K-1} e^{-it} - K \cdot e^{-(K-1)t}\right]$$

$$= \lim_{t \to 0^+} \frac{\sum_{i=0}^{K-1} e^{-it} - K \cdot e^{-(K-1)t}}{1-e^{-Kt}}$$

$$= \frac{1}{2}(K - 1).$$

Finally, the strict concavity of $$L\left(K, \frac{q}{t}\right)$$

as a function of t to follows from (41) and the fact that $$\frac{\partial^2 L\left(K, \frac{q}{t}\right)}{\partial t^2} = |N_1(K)|g'(t).$$

This completes the proof of Lemma 1.

APPENDIX B

In this appendix, we prove Theorem 3.

First, arguments similar to those in the proof of Theorem 2 can be used to show that $\lambda^{(i)}$ is upper bounded by $\lambda_K$, strictly increases, and converges to $\lambda_K$ as $i \to \infty$. Therefore what remains is to show that the convergence is exponentially fast. To this end, let $$h(\lambda) \triangleq \frac{e^{-q/\lambda}}{1 - e^{-q/\lambda}}.$$

In view of (38), it follows that $$h(\lambda^{(i+1)}) = C + \frac{K}{e^{Kq/\lambda^{(i)}} - 1}$$

$$= C + Kh(\lambda^{(i)}/K)$$

and hence $$h(\lambda^{(i+1)}) - h(\lambda^{(i)}) = Kh(\lambda^{(i)}/K) - Kh(\lambda^{(i-1)}/K)$$

$$= \frac{Kh(\lambda^{(i)}/K) - Kh(\lambda^{(i-1)}/K)}{h(\lambda^{(i)}) - h(\lambda^{(i-1)})}[h(\lambda^{(i)}) - h(\lambda^{(i-1)})]$$

$$\leq \delta[h(\lambda^{(i)}) - h(\lambda^{(i-1)})]$$

where $$\delta = \sup\left\{\frac{Kh(\lambda/K) - Kh(\nu/K)}{h(\lambda) - h(\nu)} : \lambda, \nu \in [\lambda^{(0)}, \lambda_K], \lambda \neq \nu\right\}.$$

In view of Lemma 1 and its proof (particularly (41)), it is not hard to verify that $0 < \delta < 1$. Therefore, as $i \to \infty$, $h(\lambda^{(i)})$ converges to $h(\lambda_K)$ exponentially fast. Since the derivative of $h(\lambda)$ is positive over $\lambda \in [\lambda^{(0)}, \lambda_K]$ and bounded away from 0, it follows that $\lambda^{(i)}$ also converges to $\lambda_K$ exponentially fast. This competes the proof of Theorem 3.

8 Introduction to MTCM

The above example embodiments have shown that (1) for real-valued continuous AC coefficients, LPTCM offers a superior trade-off between modeling accuracy and complexity; and (2) for discrete (integer or quantized) DCT coefficients, which are mostly seen in real-world applications of DCT, GMTCM models AC coefficients more accurately than the Laplacian model and GG model in majority cases while having simplicity and practicality similar to those of the Laplacian model. When limited to AC coefficients at low frequencies, however, GMTCM only ties up with the GG model in terms of modeling accuracy. Since DCT coefficients at low frequencies are generally more important than those at high frequencies to human perception, it would be advantageous to further improve the modeling accuracy of LPTCM and GMTCM for low frequency DCT coefficients without sacrificing modeling simplicity and practicality.

In accordance with at least some example embodiments, we extend the concept of TCM by further separating the main portion of DCT coefficients into multiple sub-portions and modeling each sub-portion by a different parametric distribution (such as truncated Laplacian, GG, and geometric distributions). The resulting model is dubbed a multiple segment TCM (MTCM). In the case of general MTCMs based on truncated Laplacian and geometric distributions (referred to as MLTCM and MGTCM, respectively), a greedy algorithm is developed for determining a desired number of segments and for estimating the corresponding separation boundaries and other MTCM parameters. For bi-segment TCMs, an efficient online algorithm is further presented for computing the maximum likelihood (ML) estimate of their parameters. Experiments based on Kullback-Leibler (KL) divergence and $\chi^2$ test show that (1) for real-valued continuous AC coefficients, the bi-segment TCM based on truncated Laplacian (BLTCM) models AC coefficients more accurately than LPTCM and the GG model while having simplicity and practicality similar to those of LPTCM and pure Laplacian; and (2) for discrete DCT coefficients, the bi-segment TCM based on truncated geometric distributions (BGTCM) significantly outperforms GMTCM and the GG model in terms of modeling accuracy, while having simplicity and practicality similar to those of GMTCM. Also shown is that the MGTCM derived by the greedy algorithm further improves the modeling accuracy over BGTCM at the cost of more parameters and slight increase in complexity. Therefore, BLTCM/MLTCM and BGTCM/MGTCM represent the state of the art in terms of modeling accuracy for continuous and discrete DCT coefficients (or similar type of data), respectively, which, together with their simplicity and practicality, makes them a desirable choice for modeling DCT coefficients (or similar type of data) in real-world image/video applications.

9 Review of TCM

In this section, we briefly review the concept of TCM for continuous DCT coefficients, as described in detail above.

Let $f(y|\theta)$ be a probability density function (pdf) with parameter $\theta \in \Theta$, where $\theta$ could be a vector, and $\Theta$ is the parameter space. Let $F(y|\theta)$ be the corresponding cumulative distribution function (cdf), i.e.

$$F(y|\theta) \triangleq \int_{-\infty}^{y} f(u|\theta) du.$$

Equation numbers will re-start from (1) for convenience of reference.

Assume that $f(y|\theta)$ is symmetric in y with respect to the origin, and $F(y|\theta)$ is concave as a function of y in the region $y \leq 0$. It is easy to verify that Laplacian, Gaussian, and GG distributions all satisfy this assumption. The continuous TCM based on $F(y|\theta)$ is defined as $$p(y|y_c, b, \theta) \triangleq \begin{cases} \frac{b}{2F(y_c|\theta)-1} f(y|\theta) & \text{if } |y| < y_c \\ \frac{1-b}{2(a-y_c)} & \text{if } y_c < |y| \leq a \\ \max\left\{\frac{b}{2F(y_c|\theta)-1} f(y_c|\theta), \frac{1-b}{2(a-y_c)}\right\} & \text{if } |y| = y_c \\ 0 & \text{otherwise} \end{cases} \quad (42)$$

where $0 \leq b \leq 1$, $0 < d \leq y_c < a$, and a represents the largest magnitude a sample y can take. Here both a and d are assumed to be known. It is not hard to see that given $(y_c, b, \theta)$, as a function of y, $p(y|y_c, b, \theta)$ is indeed a pdf, and also symmetric with respect to the origin.

According to the TCM defined in (42), a sample y is generated according to the truncated distribution $$\frac{1}{2F(y_c|\theta)-1} f(y|\theta)$$

with probability b, and according to the uniform distribution $$\frac{1}{2(a-y_c)}$$

(also called the outlier distribution) with probability 1−b. The composite model is transparent since given parameters $(y_c, b, \theta)$, there is no ambiguity regarding which distribution a sample $y \neq \pm y_c$ comes from. The ML estimates of the separation boundary $y_c$ and parameter $(\theta, b)$ can be computed efficiently through the online algorithm with global convergence developed in Sections 3 and 4 above, especially when $f(y|74)$ is Laplacian. As described in Sections 3 to 6 above, the value of b is on average around 0.99. As such, the portions modeled by the truncated distribution $$\frac{1}{2F(y_c|\theta)-1} f(y|\theta)$$

and the outlier distribution are referred to as the main and tail portions, respectively.

10 Continuous Multiple Segment Transparent Composite Model

To improve the modeling accuracy of TCM, especially for AC coefficients at low frequencies, we now further separate the main portion of DCT coefficients into multiple sub-portions and model each sub-portion independently by a different parametric distribution, yielding a model we call a multiple segment transparent composite model. Assuming DCT coefficients are continuous (i.e. can take any real value), in this section we describe and analyze continuous MTCMs.

10.1 Description of General Continuous MTCMs

Separate the main portion further into l sub-portions. The MTCM based on $F(y|\theta)$ with l+1 segments is defined as $$p(y|\bar{y}_c, \bar{b}, \bar{\theta}) \triangleq \begin{cases} \frac{b_1}{2F(y_{c_1}|\theta_1)-1} f(y|\theta_1) & \text{if } |y| < y_{c_1} \\ \frac{b_2}{2[F(y_{c_2}|\theta_2)-F(y_{c_1}|\theta_2)]} f(y|\theta_2) & \text{if } y_{c_1} < |y| < y_{c_2} \\ \vdots \\ \frac{b_l}{2[F(y_{c_l}|\theta_l)-F(y_{c_{l-1}}|\theta_l)]} f(y|\theta_l), & \text{if } y_{c_{l-1}} < |y| < y_{c_l} \\ \frac{b_{l+1}}{2[F(a|\theta_{l+1})-F(y_{c_l}|\theta_{l+1})]} f(y|\theta_{l+1}), & \text{if } y_{c_l} < |y| \leq a \\ 0 & \text{otherwise} \end{cases} \quad (43)$$

-continued where $\bar{y}_c = (y_{c_1}, y_{c_2}, \ldots, y_{c_l})$ with $0 < d \le y_{c_1} < y_{c_2} < \ldots < y_{c_l} < y_{c_{l+1}} = a$ $\bar{b} = (b_1, b_2, \ldots, b_{l+1})$ with $b_i \ge 0$ and $b_1 + b_2 + \ldots + b_{l+1} = 1$, $\bar{\theta} = (\theta_1, \theta_2, \ldots, \theta_{l+1})$, and $$p(y \mid \bar{y}_c, \bar{b}, \bar{\theta}) = \max\left\{\frac{b_1}{2[F(y_{c_i} \mid \theta_i) - F(y_{c_{i-1}} \mid \theta_i)]} f(y \mid \theta_i),\right.$$
$$\left.\frac{b_{i+1}}{2[F(y_{c_{i+1}} \mid \theta_{i+1}) - F(y_{c_i} \mid \theta_{i+1})]} f(y \mid \theta_{i+1})\right\}$$

whenever $y = \pm |y_{c_i \text{ for } i=}1, 2, \ldots 1$ with $y_{c_0=0}$.

Note that in the MTCM defined in (43), the tail portion is also modeled by a truncated distribution based on $f(y|\theta)$. This deviation from the TCM defined in (42) is motivated by the observation that given $\bar{y}_c$, the uniform distribution over $(y_{c_{l, a}}]\cup[{}^a, -y_{c_l})$ is actually the limiting distribution of $$\frac{1}{2[F(a \mid \theta_{l+1}) - F(y_{c_l} \mid \theta_{l+1})]} f(y \mid \theta_{l+1})$$

as some parameter in $\theta_{l+1}$ goes to $\infty$ for most parametric distributions $f(y|\theta)$ such as the Laplacian, Gaussian, and GG distributions. Therefore, leaving $\theta_{l+1}$ to be determined by ML estimation would improve modeling accuracy in general.

Depending on $f(y|\theta)$, estimating the MTCM parameters $\bar{y}_c$, $\bar{b}$, $\bar{\theta}$ in a general case for arbitrary l may be difficult. In the following, we shall instead focus on special cases where $l=1$ or $f(y|\theta)$ is Laplacian, and develop accordingly effective ways for estimating $\bar{y}_c, \bar{b}, \bar{\theta}$.

10.2 ML Estimates of Bi-Segment TCM Parameters

In the case of bi-segment TCM, we have $l=1$ and the parameters to be estimated are $y_{c_1}$, $b_1$, $\theta_1$, and $\theta_2$. To develop an attractive algorithm for computing the ML estimates of $y_{c_1}$, $b_1$, $\theta_1$, and $\theta_2$, we further assume that $f(y|\theta)$ is differentiable for $y \ge 0$ and $F''(y|\theta)[1-F(y|\theta)] + [F'(y|\theta)]^2 \ge 0$ (44)

for any $y \ge 0$. It is not hard to verify that the Laplacian, Gaussian, and GG distributions with the shape parameter $\beta \le 1$ all satisfy (44).

Let $Y_1^n = (Y_1, Y_2, \ldots, Y_n)$ be a sequence of DCT coefficients in an image or in a large coding unit (such as a block, a slice or a frame in video coding) at a particular frequency or across frequencies of interest. Assume that $Y_1^n$ behaves according to the MTCM defined in (43) with $l=1$ and with $Y_{max} \triangleq \max\{|Y_i|: 1 \le i \le n\} < a$ and $Y_{max} \le d$. (When $Y_{max} < d$, the ML estimates of $y_{c_1 \text{ and } b_1}$ are equal to d and 1, respectively.) We next investigate how to compute the ML estimates of $y_{c_1}$, $b_1$, $\theta_1$, and $\theta_2$ under the condition (44).

Given $Y_1^n$ with $d \le Y_{max} < a$, define $N_1(y_{c_1}) \triangleq \{i: |Y_i| < y_{c_1}\}$ $N_2(y_{c_1}) \triangleq \{i: y_{c_1} < |Y_i|\}$ $N_3(y_{c_1}) \triangleq \{i: |Y_i| = y_{c_1}\}$.

Then the log-likelihood function $g(y_{c_1}, b_1, \bar{\theta} | Y_1^n)$ according to (43) with $l=1$ is equal to $$g(y_{c_1}, b_1, \bar{\theta} \mid Y_1^n) = \sum_{i \in N_1(y_{c_1})} \ln f(Y_i \mid \theta_1) + \quad (45)$$
$$\sum_{i \in N_2(y_{c_1})} \ln f(Y_i \mid \theta_2) + |N_1(y_{c_1})| \ln b_1 + |N_2(y_{c_1})| \ln(1 - b_1) +$$
$$|N_3(y_{c_1})| \max\left\{\ln \frac{b_1 f(y_{c_1} \mid \theta_1)}{2F(y_{c_1} \mid \theta_1) - 1}, \ln \frac{(1-b_1) f(y_{c_1} \mid \theta_2)}{2[F(a \mid \theta_2) - F(y_{c_1} \mid \theta_2)]}\right\} -$$
$$|N_1(y_{c_1})| \ln[2F(y_{c_1} \mid \theta_1) - 1] - |N_2(y_{c_1})| \ln 2[F(a \mid \theta_2) - F(y_{c_1} \mid \theta_2)]$$

where $|S|$ denotes the cardinality of a finite set S. In view of (44) and the assumption that $F(y|\theta)$ is concave, one can verify that given $|N_1(y_{c_1})|$ and $|N_2(y_{c_1})|$, $-|N_1(y_{c_1})| \ln [2F(y_{c_1}|\theta_1)-1] - |N_2(y_{c_1})| \ln 2[F(a|\theta_2) - F(y_{c_1}|\theta_2)]$ as a function of $y_{c_1}$ is convex. Sort $|Y_1|, |Y_2|, \ldots, |Y_n|$ in ascending order into $W_1 \le W_2 \le \ldots \le W_n$. Note that $W_n = Y_{max}$. Let $m \triangleq \min\{i: W_i \ge d\}$. Then using an argument similar to the proof of Theorem 1 in subsection 3.2 (above), one can show that $\max\{g(y_{c_1}, b_1, \bar{\theta} \mid Y_1^n): d \le y_{c_1} < a, 0 \le b_1 \le 1, \bar{\theta}\} =$ (46)
$$\max_{b_1, \bar{\theta}} \max_{y_{c_1} \in \{d, W_m, W_{m+1}, \ldots, W_n\}} g(y_{c_1}, b_1, \bar{\theta} \mid Y_1^n).$$

Therefore, the ML estimate of $y_{c_1}$ is equal to one of d, $W_m$, $W_{m+1}, \ldots, W_n$.

For any $y_{c_1 \in \{d, W_m, W_{m+1}, \ldots, W_n\}}$, let $(b_1(y_{c_1}), \bar{\theta}(y_c 1)) \triangleq \arg\max_{b_1, \bar{\theta}} g(y_{c_1}, b_1, \bar{\theta}|Y_1^n)$.

Given $y_{c_1}$, $b_1(y_{c_1})$ and $\theta_i(y_{c_1})$, $i=1,2$, can be computed in a manner similar to Algorithm 1 (FIG. 12). In particular, when $f(y|\theta)$ is Laplacian, $\theta_i(y_{c_1})$, $i=1, 2$, can be computed by the exponentially fast convergent Algorithm 2 (FIG. 13). Then the ML estimates of $y_{c_1}$, $b_1$, $\theta_1$, and $\theta_2$ are determined as $y_{c_1}^* = \arg\max_{y_{c_1} \in \{d, W_m, W_{m+1}, \ldots, W_n\}} g(y_{c_1}, b_1(y_{c_1}), \bar{\theta}(y_{c_1}) \mid Y_1^n)$ (47)

$b_1^* = b_1(y_{c_1}^*)$ $\theta_i^* = \theta_i(y_{c_1}^*), i = 1, 2.$

Summarizing the above derivations into Algorithm 5 (FIG. 31) for computing $(y_{c_1}^*, b_1^*, \bar{\theta}^*)$, we have proved the following result.

Theorem 4: The vector $(y_{c_1}^*, b_1^*, \bar{\theta}^*)$ computed by Algorithm 5 is indeed the ML estimate of $(y_{c_1}, b_1, \bar{\theta})$ in the bi-segment TCM specified in (43) with $l=1$.

Remark 5: When $f(y|\theta)$ is Laplacian, the distribution of the tail in the bi-segment TCM specified in (43) with $l=1$ approaches the uniform distribution over $(y_{c_1}, a] \cup [-a, -y_{c_1})$ as $\theta_2$ goes to $\infty$. Therefore, the BLTCM derived by Algorithm 5 in conjunction with Algorithm 2 (FIG. 13) is better than the LPTCM derived by Algorithm 1 (FIG. 12) in conjunction with Algorithm 2 (FIG. 13) in term of modeling accuracy. This is further confirmed by experiments in Section 12, below.

10.3 Estimates of MLTCM Parameters

Suppose now that $f(y|\theta)$ is Laplacian. Plugging the Laplacian density function $$\frac{1}{2\lambda} e^{-(|y|/\lambda)}$$

into (43), we get the MLTCM with l+1 segments given by $$p(y | \bar{y}_c, \bar{b}, \bar{\theta}) \triangleq \tag{48}$$

$$\begin{cases} \frac{b_1}{1-e^{-y_{c_1}/\lambda_1}} \frac{1}{2\lambda_1} e^{-\frac{|y|}{\lambda_1}} & \text{if } |y| < y_{c_1} \\ \frac{b_2}{1-e^{-(y_{c_2}-y_{c_1})/\lambda_2}} \frac{1}{2\lambda_2} e^{-\frac{|y|-y_{c_1}}{\lambda_2}} & \text{if } y_{c_1} < |y| < y_{c_2} \\ \vdots \\ \frac{b_{l+1}}{1-e^{-(y_{c_{l+1}}-y_{c_l})/\lambda_{l+1}}} \frac{1}{2\lambda_{l+1}} e^{-\frac{|y|-y_{c_l}}{\lambda_{l+1}}} & \text{if } y_{c_l} < |y| \leq a \\ 0 & \text{otherwise.} \end{cases}$$

where $\bar{y}_c = (y_{c_1}, y_{c_2}, \ldots, y_{c_l})$ with $$0 < y_{c_1} < y_{c_2} < \ldots < y_{c_l} < y_{c_{l+1}} = a$$

$\bar{b} = (b_1, b_2, \ldots b_{l+1})$ with $b_i \geq 0$ and $b_1 + b_2 + \ldots + b_l + b_{l+1} = 1$, $\bar{\lambda} = (\lambda_1, \lambda_2, \ldots \lambda_{l+1})$ with $\lambda_i \geq 0$, $i=1, 2, \ldots, l+1$, and $$p(y | \bar{y}_c, \bar{b}, \bar{\lambda}) =$$

$$\max\left\{ \frac{b_i}{1-e^{-(y_{c_i}-y_{c_{i-1}})/\lambda_i}} e^{-(y_{c_i}-y_{c_{i-1}})/\lambda_i}, \frac{b_{i+1}}{1-e^{-(y_{c_{i+1}}-y_{c_i})/\lambda_{i+1}}} \frac{1}{2\lambda_{i+1}} \right\}$$

whenever $|y|=y_{c_i}$, $i=1, 2, \ldots, 1$, with $y_{c_0}=0$.

In practice, neither l nor $(\bar{y}_c, \bar{b}, \bar{\lambda})$ is known. Given $Y_1^n$ with $0 < K_{max} < a$, we next present a greedy algorithm for determining a desired value of l and for estimating the corresponding parameters $\bar{y}_c, \bar{b}, \bar{\lambda}$. To this end, let us first consider a generic truncated Laplacian distribution $$p(y) = \begin{cases} \frac{1}{1-e^{-y_c/\lambda}} \frac{1}{2\lambda} e^{-(|y|/\lambda)} & \text{if } |y| < y_c \\ 0 & \text{otherwise.} \end{cases} \tag{49}$$

Let $V^T = (V_1, V_2, \ldots, V_T)$ be a sequence of samples drawn independently according to the generic truncated Laplacian distribution given in (49). From the proof of Theorem 2, the ML estimate $\lambda(V^T)$ of $\lambda$ from $V^T$ is the unique solution to $$\lambda - \frac{y_c e^{-y_c/\lambda}}{1-e^{-y_c/\lambda}} - C = 0 \tag{50}$$

where $$C = \frac{1}{T} \sum_{i=1}^{T} |V_i|$$

and by convention, the solution to (50) is equal to 0 if $C \leq 0$, and $+\infty$ if $C \geq y_c/2$. From the central limit theorem and strong law of large numbers, we have $$\frac{\frac{1}{T}\sum_{i=1}^{T} |V_i| - \left[\lambda - \frac{y_c e^{-y_c/\lambda}}{1-e^{-y_c/\lambda}}\right]}{\sqrt{\sigma^2/T}} \to \mathcal{N}(0, 1) \text{ in distribution}$$

and $$\frac{1}{T}\sum_{i=1}^{T} |V_i|^2 - \left[\frac{1}{T}\sum_{i=1}^{T} |V_i|\right]^2 \to \sigma^2 \text{ with probability 1}$$

where $$\sigma^2 = E|V_1|^2 - [E|V_1|]^2 = \frac{1}{1-e^{-y_c/\lambda}} \int_0^{y_c} y^2 \frac{1}{\lambda} e^{-y/\lambda} dy - \left[\lambda - \frac{y_c e^{-y_c/\lambda}}{1-e^{-y_c/\lambda}}\right]^2.$$

Therefore, we have $$\frac{\frac{1}{T}\sum_{i=1}^{T} |V_i| - \left[\lambda - \frac{y_c e^{-y_c/\lambda}}{1-e^{-y_c/\lambda}}\right]}{\sqrt{\frac{\frac{1}{T}\sum_{i=1}^{T} |V_i|^2 - \left[\frac{1}{T}\sum_{i=1}^{T} |V_i|\right]^2}{T-1}}} \to \mathcal{N}(0, 1) \text{ in distribution as } T \to \infty.$$

In particular, $$\lim_{T \to \infty} Pr\left\{ \left| \frac{\frac{1}{T}\sum_{i=1}^{T} |V_i| - \left[\lambda - \frac{y_c e^{-y_c/\lambda}}{1-e^{-y_c/\lambda}}\right]}{\sqrt{\frac{\frac{1}{T}\sum_{i=1}^{T} |V_i|^2 - \left[\frac{1}{T}\sum_{i=1}^{T} |V_i|\right]^2}{T-1}}} \right| \leq Q^{-1}\left(\frac{\alpha}{2}\right) \right\} = 1 - \alpha \tag{51}$$

for any $0 < \alpha < 1$, where $Q(x) \triangleq \int_x^{+\infty} \frac{1}{\sqrt{2\pi}} e^{-u^2/2} du$.

Let $\lambda^+(V^T)$ be the unique solution to $$\lambda - \frac{y_c e^{-y_c/\lambda}}{1-e^{-y_c/\lambda}} - \tag{52}$$

$$\left[\frac{1}{T}\sum_{i=1}^{T} |V_i| + Q^{-1}\left(\frac{\alpha}{2}\right) \sqrt{\frac{\frac{1}{T}\sum_{i=1}^{T} |V_i|^2 - \left[\frac{1}{T}\sum_{i=1}^{T} |V_i|\right]^2}{T-1}}\right] = 0$$

and $\lambda^-(V^T)$ be the unique solution to $$\lambda - \frac{y_c e^{-y_c/\lambda}}{1-e^{-y_c/\lambda}} - \tag{53}$$

$$\left[\frac{1}{T}\sum_{i=1}^{T} |V_i| - Q^{-1}\left(\frac{\alpha}{2}\right) \sqrt{\frac{\frac{1}{T}\sum_{i=1}^{T} |V_i|^2 - \left[\frac{1}{T}\sum_{i=1}^{T} |V_i|\right]^2}{T-1}}\right] = 0.$$

Since $$s(\lambda) \triangleq \lambda - \frac{y_c \cdot e^{-y_c/\lambda}}{1-e^{-y_c/\lambda}}$$

as a function of $\lambda$ is strictly increasing over $\lambda>0$, it follows from (51), (52), and (53) that (51) is equivalent to $$\lim_{T \to \infty} Pr\{\lambda^-(V^T) \le \lambda \le \lambda^+(V^T)\} = 1 - \alpha. \tag{54}$$

In other words, $[\lambda^-(V^T), \lambda^+(V^T)]$ is a confidence interval for estimating $\lambda$ with asymptotic confidence level $1-\alpha$.

The above derivation provides a theoretic basis for us to develop a greedy method for determining l and for estimating $\bar{y}_c$, $\bar{b}$, and $\bar{\lambda}$ from $Y_1^n = (Y_1, Y_2, \ldots, Y_n)$. Select a desired confidence level $1-\alpha$ such as the one with $\alpha = 0.05$ or $0.02$. In view of (54), also select a threshold $T^* > 0$ such that for any $T \ge T^*$, $$Pr\{\lambda^-(V^T) \le \lambda \le \lambda^+(V^T)\}$$

can be well approximated by $1-\alpha$. As before, sort $|Y_1|$, $|Y_2|, \ldots, |Y_n|$ in ascending order into $W_1 \le W_2 \le \ldots \le W_n$. Then let $$W = (W_1, W_2, \ldots, W_n)$$

and write $(W_i, W_{i+1}, \ldots, W_j)$, for any $1 \le i \le j \le n$, as $W_i^j$, and $(W_1, W_2, \ldots, W_j)$ simply as $W^j$. Pick a T such that $T \ge T^*$, $W_T > 0$, and $W_{T+1} > W_T$. Let $$\Delta T \triangleq |\{i : W_i = W_{T+1}\}|.$$

Compute $\lambda^+(W^T)$ and $\lambda^-(W^T)$ as in (52) and (53) respectively with $y_c = W_T$, by replacing $V_i$ by $W_i$. Compute $\lambda(W^{T+\Delta T})$ as in (50) with $y_c = W_{T+\Delta T}$ by replacing $V_i$ by $W_i$. In view of the derivations from (50) to (54), $W^T$ and $W_{T+1}^{T+\Delta T}$ would be deemed to come from the same Laplacian model if $\lambda(W^{T+\Delta T}) \in [\lambda^-(W^T), \lambda^+(W^T)]$, and from different models otherwise. Using this criterion, one can then grow each segment recursively by padding each sample immediately adjacent to that segment into that segment until that sample and that segment are deemed to come from different models. This is the underlying idea behind the greedy method described as Algorithm 6 (FIG. 32) for estimating $y_{c_1}$, $b_1$, $\lambda_1$ from $Y_1^n$ or equivalently W. The resulting estimates of $y_{c_1}$, $b_1$, $\lambda_1$ are denoted by $Y_c(W)$, $B(W)$, and $\Lambda(W)$, respectively, for convenience.

Denote the value of T at the end of Algorithm 6 in response to W as T(W). After the first segment with length $T_1 = T(W)$ is identified and the values of $y_{c_1}$, $b_1$, and $\lambda_1$ are determined as $y_{c_1} = Y_c(W)$, $b_1 = B(W)$, and $\lambda_1 = \Lambda(W)$, Algorithm 6 can be applied again to the translated remaining samples $$(W_{T_1+1} - y_{c_1}, W_{T_1+2} - y_{c_1}, \ldots, W_n - y_{c_1})$$

with $y_s = y_{c_1}$ to determine the length $T_2$ of the second segment and the values of $y_{c_2}$, $b_2$, and $\lambda_2$:

$$T_2 = T(W_{T_1+1} - y_{c_1}, W_{T_1+2} - y_{c_1}, \ldots, W_n - y_{c_1})$$

$$y_{c_2} = y_{c_1} + Y_c(W_{T_1+1} - y_{c_1}, W_{T_1+2} - y_{c_1}, \ldots, W_n - y_{c_1})$$

$$b_2 = B(W_{T_1+1} - y_{c_1}, W_{T_1+2} - y_{c_1}, \ldots, W_n - y_{c_1})$$

$$\lambda_2 = \Lambda(W_{T_1+1} - y_{c_1}, W_{T_1+2} - y_{c_1}, \ldots, W_n - y_{c_1}).$$

This procedure can be repeated again and again until there are no more remaining samples, yielding a greedy method described as Algorithm 7 (FIG. 33) for determining l and for estimating $\bar{y}_c$, $\bar{b}$, and $\bar{\lambda}$ from $Y_1^n = (Y_1, Y_2, \ldots, Y_n)$, where the vector U denotes the dynamic translated remaining samples, and t denotes the cumulative length of all segments identified so far.

Let J denote the value of j at the end of Algorithm 7 in response to $Y_1^n$. Then $y_{c_{j-1}}$ is equal to a or $Y_{max}$. In the case of $y_{c_{j-1}} = a$, the value of l in the MLTCM given by (48) is equal to $J-2$. Otherwise, l is equal to $J-1$, and the last segment is from $Y_{max}$ to a with $b_{l+1} = 0$ and $\lambda_{l+1}$ defined arbitrary. Since solutions to (50), (52), and (53) can be computed effectively by the exponentially fast convergent Algorithm 2 (FIG. 13), Algorithm 7 is very efficient and runs essentially in linear time once the sorting of $Y_1^n$ into W is done. Experiments in Section 12 show that the resulting MLTCM has superior modeling accuracy.

11 Discrete Multiple Segment Transparent Composite Model

Though DCT in theory provides a mapping from a real-valued space to another real-valued space and generates continuous DCT coefficients, in practice (particularly in lossy image and video coding), DCT is often designed and implemented as a mapping from an integer-valued space (e.g., 8-bits pixels) to another integer-valued space and gives rise to integer DCT coefficients (e.g., 12-bits DCT coefficients in H.264). In addition, since most images and video are stored in a compressed format such as JPEG, H.264, etc., for applications (e.g., image enhancement, image retrieval, image annotation, etc.) based on compressed images and video, DCT coefficients are available only in their quantized values. Therefore, it is desirable to further improve the modeling accuracy of GMTCM for discrete (integer or quantized) DCT coefficients in practice by considering the discrete counterpart of continuous MTCMs, i.e., discrete MTCMs.

The particular discrete MTCM we shall consider and analyze in this section is the one where each segment is modeled by a truncated geometric distribution. The resulting discrete MTCM is broadly referred to as MGTCM in general and as BGTCM in the special case of two segments. To provide a unified treatment for both integer and quantized DCT coefficients, we introduce a quantization factor of step size. Then both integer and quantized DCT coefficients can be regarded as integers multiplied by a properly chosen step size.

11.1 MGTCM

Consider uniform quantization with dead zone, which is widely used in image and video coding (see, for example, H.264 and HEVC). Mathematically, the output of the uniform quantizer with dead zone $\Delta$ and step size q in response to an input X is given by $$Q(X) = q \times \text{sign}(X) \times \text{round}\left(\frac{||X| - (\Delta - q/2)|}{q}\right)$$

where $q/2 \le \Delta < q$. Assume that the input X is distributed according to the Laplacian distribution. Then the quantized index $$\text{sign}(X) \times \text{round}\left(\frac{||X| - (\Delta - q/2)|}{q}\right)$$

is distributed as follows $$p_0 = 1 - e^{-\frac{\Delta}{\lambda}} \tag{55}$$

$$p_i = \frac{1}{2} e^{-\frac{\Delta}{\lambda}} \left[1 - e^{-\frac{q}{\lambda}}\right] e^{-\frac{q}{\lambda}(|i|-1)}, i = \pm 1, \pm 2,$$

With the help of q, discrete (integer or quantized) DCT coefficients then take values of integers multiplied by q. (Hereafter, these integers will be referred to as DCT indices.) Note that $p_i$ in (55) is essentially a geometric distribution.

Using a geometric distribution to model each segment, we then get the MGTCM with l+1 segments given by $$p_i(\overline{K}, \overline{\lambda}, \overline{b}) \triangleq \begin{cases} b_0 & \text{if } i = 0 \\ \dfrac{b_1}{2} e^{-\frac{q}{\lambda_1}(|i|-1)} \dfrac{1 - e^{-\frac{q}{\lambda_1}}}{1 - e^{-\frac{q}{\lambda_1}K_1}} & \text{if } 0 < |i| \leq K_1 \\ \dfrac{b_2}{2} e^{-\frac{q}{\lambda_2}(|i|-K_1-1)} \dfrac{1 - e^{-\frac{q}{\lambda_2}}}{1 - e^{-\frac{q}{\lambda_2}[K_2-K_1]}} & \text{if } K_1 < |i| \leq K_2 \\ \vdots \\ \dfrac{b_{l+1}}{2} e^{-\frac{q}{\lambda_{l+1}}(|i|-K_l-1)} \dfrac{1 - e^{-\frac{q}{\lambda_{l+1}}}}{1 - e^{-\frac{q}{\lambda_{l+1}}[a-K_l]}} & \text{if } K_l < |i| \leq a \\ 0 & \text{otherwise} \end{cases} \quad (56)$$

where $\overline{K} = (K_1, \ldots, K_l)$
with
$K_0 = 0 < K_1 < K_2 < \ldots < K_l < K_{l+1} = a$ $\overline{\lambda} = (\lambda_1, \ldots, \lambda_l, \lambda_{l+1})$ with $\lambda_i \leq 0$, $\overline{b} = (b_0, b_1, \ldots b_{l+1})$ with $b_i \geq 0$ and $b_0 + b_1 + \ldots + b_{l+1} = 1$, and $a$ is the largest index in a given sequence of DCT indices. Here $a$ is assumed known, and $\overline{K}, \overline{\lambda}$, and $\overline{b}$ are model parameters.

11.2 ML Estimates of MGTCM Parameters

Let $u^n = u_1, u_2, \ldots, u_n$ be a sequence of DCT indices. Assume that $u^n$ behaves according to the MGTCM defined by (56) with $u_{max} \triangleq \max\{|u_i|: 1 \leq i \leq n\} \leq a$. When the number l+1 of segments is given, the parameters $\overline{K}, \overline{\lambda}$, and $\overline{b}$ can be estimated via ML estimation from $u^n$.

Let $N_0 = \{j: u_j = 0\}$. For any $1 \leq i \leq l+1$, let $$N_i(\overline{K}) = \{j: K_{i-1} < |u_j| \leq K_i\}$$

and define $$L_i(\overline{K}, \lambda) \triangleq |N_i(\overline{K})| \ln \frac{1 - e^{-\frac{q}{\lambda}}}{1 - e^{-\frac{q}{\lambda}[K_i - K_{i-1}]}} - \frac{q}{\lambda} \sum_{j \in N_i(\overline{K})} (|u_j| - K_{i-1} - 1).$$

Given l, the log-likelihood function of $u^n$ according to (56) is then equal to $$G(\overline{K}, \overline{\lambda}, \overline{b}) \triangleq |N_0| \ln b_0 + \sum_{i=1}^{l+1} |N_i(\overline{K})| \ln \frac{b_i}{2} + \sum_{i=1}^{l+1} L_i(\overline{K}, \lambda_i). \quad (57)$$

Given $\overline{K}$, further define $(\overline{\lambda}(\overline{K}), \overline{b}(\overline{K})) \triangleq \arg\max_{\overline{\lambda}, \overline{b}} G(\overline{K}, \overline{\lambda}, \overline{b})$.

Then it follows from (57) that $$b_0(\overline{K}) = \frac{|N_0|}{n},$$

and for any $1 \leq i \leq l+1$, $$b_i(\overline{K}) = \frac{|N_i(\overline{K})|}{n} \quad (58)$$

and $\lambda_i(\overline{K}) = \arg\max_{0 \leq \lambda \leq \infty} L_i(\overline{K}, \lambda)$.

Finally, the ML estimate of $\overline{K}$ is equal to $$\overline{K}^* = \arg\max_{\overline{K}} G(\overline{K}, \overline{\lambda}(\overline{K}), \overline{b}(\overline{K})). \quad (59)$$

Accordingly, the ML estimates of $\overline{\lambda}$ and $\overline{b}$ are respectively equal to $\lambda_i^* = \lambda_i(\overline{K}^*)$ and $b_i^* = b_i(\overline{K}^*)$ for any $1 \leq i \leq l+1$ with $$b_0^* = \frac{|N_0|}{n}.$$

Given $\overline{K}$, $\lambda_i(\overline{K})$ in (58) can be computed effectively by the exponentially fast convergent Algorithm 3 (FIG. 14); in particular, as shown therein, $\lambda_i(\overline{K})$ is the unique solution to $$\frac{1}{e^{q/\lambda} - 1} - \frac{K_i - K_{i-1}}{e^{[K_i - K_{i-1}]q/\lambda} - 1} - C = 0 \quad (60)$$

where $$C = \frac{1}{|N_i(\overline{K})|} \sum_{j \in N_i(\overline{K})} (|u_j| - K_{i-1} - 1)$$

and by convention, the solution to (60) is equal to 0 if $C \leq 0$, and $+\infty$ if $C \geq [K_i - K_{i-1} - 1]/2$. Therefore, the complexity of computing $\overline{K}^*, \overline{\lambda}^*$, and $\overline{b}^*$ lies mainly in comparing all possible combinations of $\overline{K}$ to $\overline{K}^*$, the complexity of which is $O(a^l)$. In the case of l=1, the complexity is essentially the same as that of computing the ML estimates of GMTCM parameters. In addition, since the distribution of the tail in the MGTCM defined by (56) converges to the uniform distribution over $(K_l, a] \cup [-a, -K_l)$ as $\lambda_{l+1}$ goes to $\infty$, BGTCM offers better modeling accuracy than does GMTCM, which is further confirmed by experiments in Section 12.

11.3 Greedy Estimation of l and Other MGTCM Parameters

When the number l+1 of segments in the MGTCM defined by (56) is unknown, it has to be estimated as well along with other parameters $\overline{K}, \overline{\lambda}$, and $\overline{b}$. In this subsection, we present a greedy algorithm for determining a desired value of l and estimating the corresponding parameters $\overline{K}, \overline{\lambda}$, and $\overline{b}$. The algorithm is similar to Algorithms 6 and 7 in principle. As such, we shall point out only places where modifications are needed.

Consider a generic truncated geometric distribution $$p_i(K, \lambda) \triangleq \begin{cases} \dfrac{1}{2} e^{-\frac{q}{\lambda}(|i|-1)} \dfrac{1 - e^{-\frac{q}{\lambda}}}{1 - e^{-\frac{q}{\lambda}K}} & \text{if } 0 < |i| \leq K \\ 0 & \text{otherwise.} \end{cases} \quad (61)$$

Let $V^T = (V_1, V_2, \ldots, V_T)$ be a sequence of samples drawn independently according to the generic truncated geometric distribution given by (61). As shown in Algorithm 3 (FIG. 14), the ML estimate $\lambda(V^T)$ of $\lambda$ from $V^T$ is the unique solution to $$\frac{1}{e^{q/\lambda} - 1} - \frac{K}{e^{Kq/\lambda} - 1} - C = 0 \qquad (62)$$

where $$C = \frac{1}{T}\sum_{i=1}^{T}(|V_i| - 1)$$

and by convention, the solution to (62) is equal to 0 if $C \le 0$, and $+\infty$ if $C \ge (K-1)/2$. In parallel with (52) and (53), let $\lambda^+(V^T)$ and $\lambda^-(V^T)$ be respectively the unique solution to $$\frac{1}{e^{q/\lambda} - 1} - \frac{K}{e^{Kq/\lambda} - 1} - \left[C + Q^{-1}\left(\frac{\alpha}{2}\right)\sqrt{\frac{\frac{1}{T}\sum_{i=1}^{T}|V_i|^2 - \left[\frac{1}{T}\sum_{i=1}^{T}|V_i|\right]^2}{T-1}}\right] = 0 \qquad (63)$$

and $$\frac{1}{e^{q/\lambda} - 1} - \frac{K}{e^{Kq/\lambda} - 1} - \left[C - Q^{-1}\left(\frac{\alpha}{2}\right)\sqrt{\frac{\frac{1}{T}\sum_{i=1}^{T}|V_i|^2 - \left[\frac{1}{T}\sum_{i=1}^{T}|V_i|\right]^2}{T-1}}\right] = 0. \qquad (64)$$

Then (54) remains valid. Note that $b_0 = |N_0|/n$. Let $\hat{n} = n - |N_0|$. Sort $|u_i|$, $i \notin N_0$, in ascending order into $W_1 \le W_2 \le \ldots \le W_{\hat{n}}$, and let $$W = (W_1, W_2, \ldots, W_{\hat{n}}).$$

Then a greedy algorithm similar to Algorithm 6 can be used to estimate $K_1$, $b_1$, and $\lambda_1$, from W, which is described in detail in Algorithm 8 (FIG. 34). The resulting estimates of $K_1$, $b_1$, and $\lambda_1$ from W are denoted by $K(W)$, $B(W)$, and $\Lambda(W)$, respectively, for convenience.

Denote the value of T at the end of Algorithm 8 in response to W as $T(W)$. Applying repeatedly Algorithm 8 to translated remaining samples until there are no more remaining samples, we get a greedy method described as Algorithm 9 (FIG. 35) for determining l and for estimating $\overline{K}$, $\overline{b}$, and $\overline{\lambda}$ from $u^n$, where the vector U denotes the dynamic translated remaining samples, and t denotes the cumulative length of all segments identified so far.

In practical implementation of Algorithms 8 and 9, the step of sorting $u_i$ could be avoided. Instead, one can equivalently collect the data histogram $\{h_j, j = 0, 1, \ldots, a\}$ from $u''$. Since solutions to (62) to (64) can be effectively computed by the exponentially fast convergent Algorithm 3 (FIG. 14), the major complexity of Algorithms 8 and 9 lies essentially in collecting the data histogram $\{h_j, j = 0, 1, \ldots, a\}$. Experiments in Section 12 show that the MGTCM derived by Algorithms 8 and 9 has superior modeling accuracy, where the number of segments is on average around 7.

12 Experimental Results on Tests of Modeling Accuracy

This section presents experimental results obtained from applying BLTCM to model continuous DCT coefficients with comparison to GG and LPTCM in non-multiple TCM as described above, and applying MGTCM and BGTCM to model DCT indices with comparison to GG, Laplacian and GMTCM in non-multiple TCM as described above. As DCT coefficients in real world application are often in their quantized values or take integer values (e.g., an integer approximation of DCT is used in H264 and HEVC), this section is mostly focused on the modeling performance of the discrete models MGTCM and BGTCM.

12.1 Tests of Modeling Accuracy

Two criteria are applied again in this section to test the modeling accuracy of the developed models and to compare them with other models in the literature. Again, the first one is the $\chi^2$, defined as follows, $$\chi^2 = \sum_{i=1}^{l} \frac{(n_i - n \cdot q_i)^2}{n \cdot q_i}, \qquad (65)$$

where l is the number of intervals into which the sample space is partitioned, n is the total number of samples, $n_i$ denotes the number of samples falling into the ith interval, and $q_i$ is the estimated probability by the underlying theoretical model that a sample falls into the interval i. Another criterion is the Kullback-Leibler (KL) divergence distance, which is defined as $$d = \sum_{i=1}^{l} p_i \ln \frac{p_i}{q_i}, \qquad (66)$$

where l is the alphabet size of a discrete source, $p_i$ represents probabilities observed from the data, and $q_i$ stands for probabilities obtained from a given model. Note that $p_i = 0$ is dealt with by defining $0 \ln 0 = 0$.

When a comparison is conducted, a factor $w_d$ is calculated to be the percentage of DCT frequencies among all tested AC positions that are in favor of one model over another model in terms of having a smaller KL divergence from the data distribution. Another factor $w_{\chi^2}$ is defined in a similar way, except that the comparison is carried out based on the $\chi^2$ test results for individual frequencies.

To illustrate the improvement of BGTCM over GMTCM for modeling low frequency DCT coefficients, experimental results are collected for low frequency DCT coefficients. Specifically, a zig-zag scan is performed and only the first 15 ACs along the scanning order are used for testing the modeling accuracy.

Three sets of testing images are deliberately selected to cover a variety of image content, as what have been used in Section 5 described above. The first set, as shown in FIG. 6, includes 9 standard 512×512 images with faces, animals, buildings, landscapes, etc. The second set, as shown in FIG. 7, has five high definition (1920×1080) frames from the class-B sequences used for HEVC standardization tests [3]. The third set, as shown in FIG. 8, is also taken from HEVC test sequences, as the Class F sequences for screen content, i.e., frames that are captured from computer screens.

12.2 Overall Comparisons for Each Image

For modeling continuous DCT coefficients, experiments have been conducted to do overall comparison among BLTCM, LPTCM, and GG model. For modeling DCT indices, comparative experiments have been conducted for two pairs of models. The first is to compare BGTCM and the GG model. The second comparison is between BGTCM and MGTCM. For the overall comparison between other pairs of models, the result can be seen without experimental data. For example, BGTCM always outperforms GMTCM and GMTCM always has a better modeling accuracy than the Laplacian model.

Table 10 (FIG. 36) shows the percentage $w_{\chi^2}$ ($w_d$, respectively) of frequencies among the 15 low AC positions that are in favor of BLTCM over the GG model for each of 9 images in Set 1 in terms of the $\chi^2$ metric (KL divergence, respectively). To illustrate the improvement of BLTCM over LPTCM, Table 11 (FIG. 37) shows the percentage $w_{\chi^2}$ ($w_d$, respectively) of frequencies among the 15 low AC positions that are in favor of LPTCM over the GG model for each of 9 images in Set 1 in terms of the $\chi^2$ metric (KL divergence, respectively). From Tables 10 and 11, it is clear that BLTCM significantly improves LPTCM and outperforms the GG model in terms of modeling accuracy for modeling continuous low frequency DCT coefficients.

Table 12 (FIG. 38) shows the percentage $w_{\chi^2}$ ($w_d$, respectively) of frequencies among the 15 low AC positions that are in favor of BGTCM over the GG model for each of images in all test sets in terms of the $\chi^2$ metric (KL divergence, respectively). Note that all images are coded by JPEG with QF=100 and the discrete/quantized DCT coefficients are read directly from the JPEG file. From Table 12, it is clear that BGTCM provides significantly better modeling accuracy overall than the GG model for these low-frequency DCT coefficients. To illustrate the improvement of BGTCM over GMTCM, Table 13 (FIG. 39) presents the overall comparative results between GMTCM and the GG model, which shows a fairly tied performance between GMTCM and the GG model for modeling the low frequencies. In comparison of Table 12 with Table 13. It is clear that BGTCM achieves its goal of improving the accuracy for modeling low frequency DCT coefficients while having its simplicity and practicality similar to those of GMTCM.

Table 14 (FIG. 40) presents the percentage $w_{\chi^2}$ ($w_d$, respectively) of frequencies among the 15 low AC positions that are in favor of the MGTCM derived from Algorithms 8 and 9 over BGTCM for each of images in all test sets in terms of the $\chi^2$ metric (KL divergence, respectively). Note that since the greedy algorithm was used, the modeling accuracy of the resulting MGTCM is not always guaranteed to be superior over that of BGTCM, although from the model establishment point of view, BGTCM is considered as a special case of MGTCM. Nevertheless, Table 14 shows that the greedy algorithm for MGTCM works fairly well and the resulting MGTCM generally provides better modeling accuracy than BGTCM. This is also true for the comparison between the MLTCM derived from Algorithms 2 and 3 and BLTCM, the detail of which is hence omitted here.

12.3 Comparisons of Modeling Accuracy for Individual Frequencies

While Tables 12-14 show comparative results for each image over all frequencies, it is of some interests to see the performance of all models for individual frequencies. Due to the space limit, only results for four images have been chosen to be shown in FIGS. 27-30. Yet, the selection of the four images is carried out in a way to be in more favor of other models rather than of the proposed models. Specifically, one image is selected from each test set to have the worse performance by the proposed BGTCM in Table 12, i.e., 'boat', 'CS', and 'B5'. In addition, the 'lenna' image, whose statistics has been well studied, is also selected.

Figure 27:
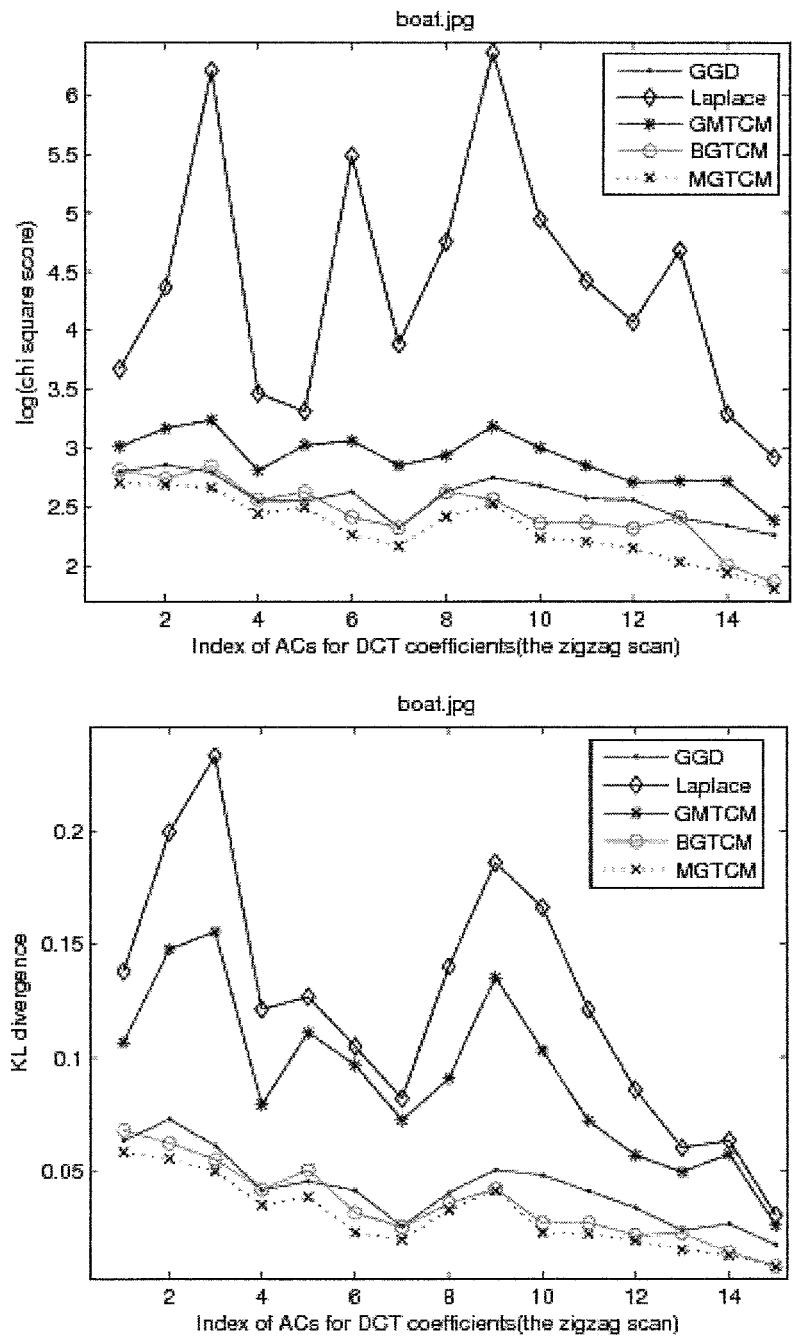
FIG. 27 illustrates the $\chi^2$ scores and KL divergence scores by GGD, Laplace, GMTCM, BGTCM and MGTCM for the first 15 low-frequency ACs along the zigzag order from JPEG-coded image 'boat' with QF=100.
Figure 28:
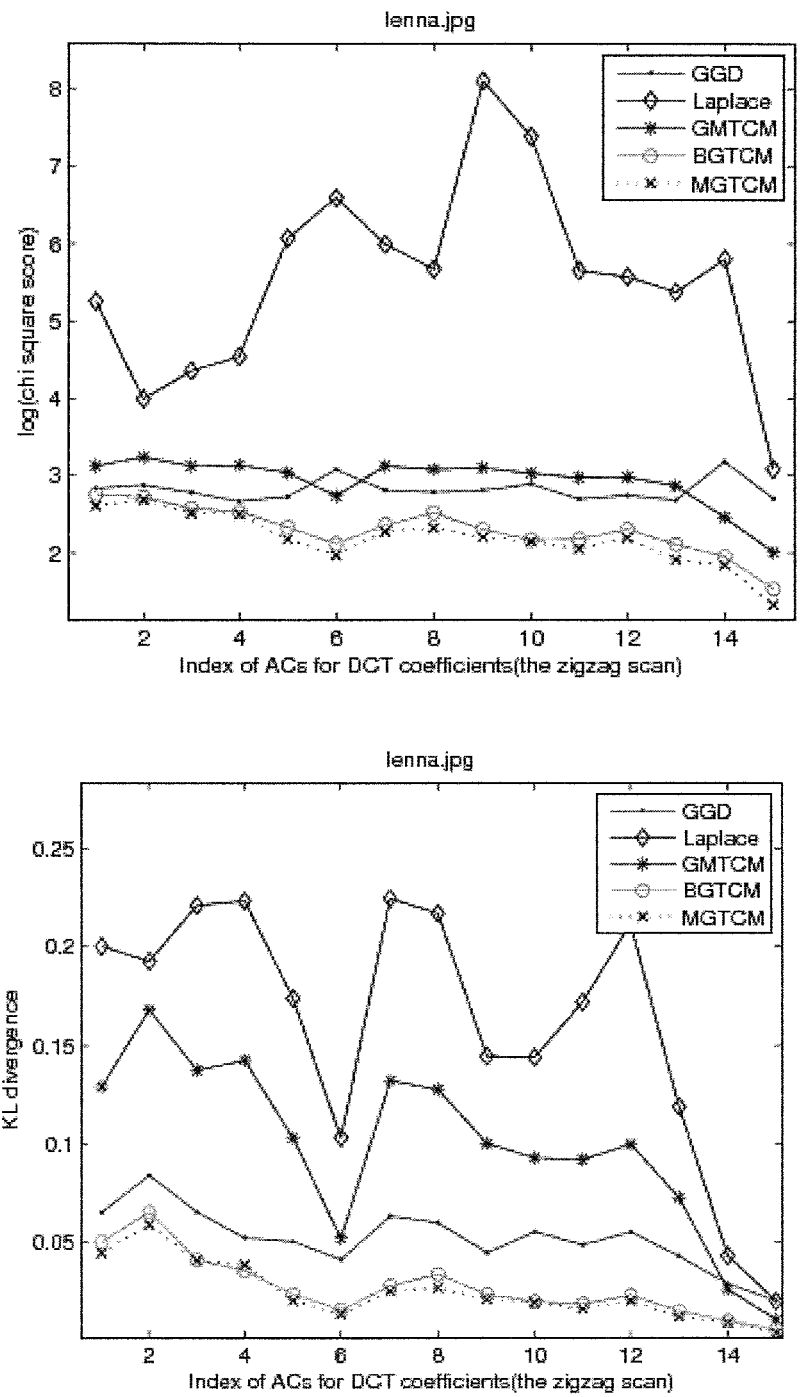
FIG. 28 illustrates the $\chi^2$ scores and KL divergence scores by GGD, Laplace, GMTCM, BGTCM and MGTCM for the first 15 low-frequency ACs along the zigzag order from JPEG-coded image 'lenna' with QF=100.
Figure 29:
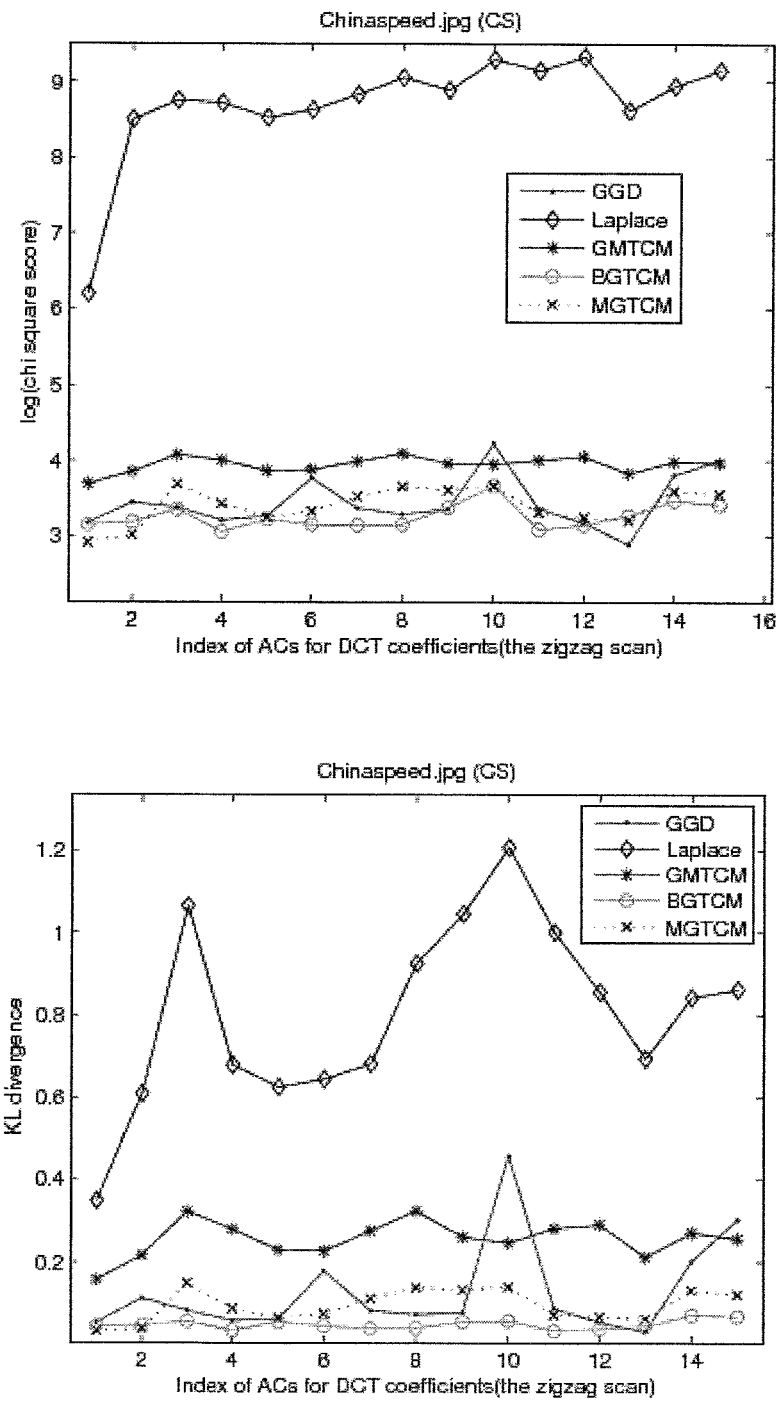
FIG. 29 illustrates the $\chi^2$ scores and KL divergence scores by GGD, Laplace, GMTCM, BGTCM and MGTCM for the first 15 low-frequency ACs along the zigzag order from JPEG-coded image 'CS' with QF=100.

As FIGS. 27-30 also show the value of the $\chi^2$ scores and the KL divergence, it helps to compare BGTCM with the GG model for their overall performance. For example, for the image of 'boat' and by the measurement of the $\chi^2$ score, BGTCM wins over the GG model for 9 frequencies and loses for 6 frequencies. Yet, a close look at the left panel of FIG. 27 shows that among the 15 ACs, there are 8 frequencies for which BGTCM has a dramatically lower $\chi^2$ score, while for the other 7 frequencies, including 6 in favor of the GG model and 1 in favor of BGTCM, the $\chi^2$ scores by BGTCM and the GG model are very close to each other. As a result, though in Table 12 we can only report that BGTCM wins 60% over the GG model for modeling the low frequencies of 'boat', FIG. 27 shows that BGTCM clearly outperforms the GG model for modeling 'boat' overall. Similar results can be seen for 'B5' while examining the detailed comparison between BGTCM and the GG model as shown in FIG. 30, which shows a clear win by BGTCM over the GG model while Table 12 only reports that BGTCM wins 67% over the GG model.

13 Conclusions to MTCM

Motivated by the need to improve modeling accuracy, especially for low frequency DCT coefficients, while having simplicity and practicality similar to those of the Laplacian model, the second part of this disclosure has extended the transparent composite model (TCM) concept disclosed in the first part of the disclosure (i.e., sections 1 to 7) by further separating DCT coefficients into multiple segments and modeling each segment by a different parametric distribution such as truncated Laplacian and geometric distributions, yielding a model dubbed a multiple segment TCM (MTCM). In the case of bi-segment TCMs, an efficient online algorithm has been developed for computing the maximum likelihood (ML) estimates of their parameters. In the case of general MTCMs based on truncated Laplacian and geometric distributions (referred to as MLTCM and MGTCM, respectively), a greedy algorithm has been further presented for determining a desired number of segments and for estimating other corresponding MTCM parameters. It has been shown that (1) the bi-segment TCM based on truncated Laplacian (BLTCM) and MLTCM derived by the greedy algorithm offer the best modeling accuracy for continuous DCT coefficients while having simplicity and practicality similar to those of Laplacian; and (2) the bi-segment TCM based on truncated geometric distribution (BGTCM) and MGTCM derived by the greedy algorithm offer the best modeling accuracy for discrete DCT coefficients while having simplicity and practicality similar to those of geometric distribution, thus making them a desirable choice for modeling continuous and discrete DCT coefficients (or other similar type of data) in real-world applications, respectively.

In accordance with an example embodiment, there is provided a non-transitory computer-readable medium containing instructions executable by a processor for performing any or all of the described methods.

In any or all of the described methods, the boxes or algorithm lines may represent events, steps, functions, processes, modules, state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

Although not specifically illustrated, it will be understood that the devices described herein include one or more processors and associated memory. The memory may include one or more application program, modules, or other programming constructs containing computer-executable instructions that, when executed by the one or more processors, implement the methods or processes described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

All patent references and publications described or referenced herein are hereby incorporated by reference in their entirety into the Detailed Description of Example Embodiments.

References

[1] T. Acharya and A. K. Ray, *Image Processing—Principles and Applications*, Wiley InterScience, 2006.

[2] F. Muller, "Distribution shape of two-dimensional DCT coefficients of natural images", *Electronics Letters*, Vol. 29, No. 22, October 1993.

[3] G. J. Sullivan; J.-R. Ohm; W.-J. Han; T. Wiegand, "Overview of the High Efficiency Video Coding (HEVC) Standard", *IEEE Transactions on Circuits and Systems for Video Technology*, Vol. 22, December 2012.

[4] T. Eude, R. Grisel, H. Cherifi, and R. Debrie, "On the Distribution of The DCT Coefficients", *Proc. IEEE Int. Conf. Acoustics, Speech, Signal Processing*, vol. 5, pp. 365-368, April 1994.

[5] A. Briassouli, P. Tsakalides, and A. Stouraitis, "Hidden Messages in Heavy-tails: DCT-Domain Watermark Detection using Alpha-Stable Models", *IEEE Transactions on Multimedia*, Vol. 7, No. 4, August 2005.

[6] M. I. H. Bhuiyan, M. O. Ahmad, and M. N. S. Swamy, "Modeling of the DCT Coefficients of Images", *Proc. of IEEE International Symposium on Circuits and Systems*, 2008, pp. 272-275.

[7] N. Kamaci, Y. Altunbasak, and R. Mersereau, "Frame Bit Allocation for the H.264/AVC Video Coder Via Cauchy-Density-Based Rate and Distortion Models", *IEEE Transactions on Circuits and Systems for Video Technology*, vol. 15, No. 8, August 2005.

[8] S. Nadarajah, "Gaussian DCT Coefficient Models", *Acta App. Math*, 2009, 106: 455-472.

[9] E. Lam, and J. Goodman, "A Mathematical Analysis of the DCT Coefficient Distributions for Images" *IEEE Transactions on Image Processing*, Vol. 9, No. 10, October 2000.

[10] I-M. Pao, and M. T. Sun, "Modeling DCT Coefficients for Fast Video Encoding", *IEEE Transactions on Circuits and Systems for Video Technology*, Vol. 9, No. 4, pp 608-616, June 1999.

[11] Rice, John (1995). Mathematical Statistics and Data Analysis (Second ed.). Duxbury Press.

[12] G. Sullivan, "Efficient scalar quantization of exponential and Laplacian random variables", *IEEE Transactions on Information Theory*, vol. 42, no. 5, pp. 1365-1374, 1996.

[13] Minh Do, and M. Vetterli, "Wavelet-based Texture Retrieval using Generalized Gaussian Density and Kullback-Leibler Distance", *IEEE Transactions on Image Processing*, Vol. 11, No. 2, February 2002.

[14] C. Tu, J. Liang, and T. Tran, "Adaptive runlength coding," *IEEE Signal Processing Letters*, Vol. 10, No. 3, pp. 61-64, March 1997.

[15] C. Tu and T. Tran, "Context-based entropy coding of block transform coefficients for image compression," *IEEE Transactions on Image Processing*, Vol. 11, No. 11, pp. 1271-1283, November 2002.

[16] X. Wu and N. Memon, "Context-based, adaptive, lossless image coding," *IEEE Transactions on Communications*, Vol. 45, pp. 437-444, April 1997.

The invention claimed is:

1. A method for modelling a set of transform coefficients, the method being performed by a device and comprising:
    determining at least one boundary coefficient value;
    determining one or more parameters for a first distribution model for transform coefficients of the set the magnitudes of which are greater than one of the boundary coefficient values;
    determining parameters for at least one further distribution model for transform coefficients of the set the magnitudes of which are less than the one of the boundary coefficient values; and
    performing a device operation on at least part of a composite distribution model which is a composite of the first distribution model and the at least one further distribution model having the respective determined parameters.

2. A method as claimed in claim 1, wherein said determining at least one boundary coefficient value includes determining the at least one boundary coefficient value which satisfies a maximum likelihood estimation between the set of transform coefficients and the composite distribution model.

3. A method as claimed in claim 1, wherein the at least one further distribution model includes at least one parametric distribution model.

4. A method as claimed in claim 3, wherein the at least one parametric distribution model includes at least one of: a truncated Laplacian distribution model, a truncated generalized Gaussian model, and a truncated geometric distribution model.

5. A method as claimed in claim 3, wherein determining parameters for the at least one further parametric distribution model includes determining a probability for the at least one further parametric distribution model and the parameters of the at least one further parametric distribution model itself.

6. A method as claimed in claim 1, wherein the first distribution model includes a uniform distribution model.

7. A method as claimed in claim 1, wherein the first distribution model includes a parametric distribution model.

8. A method as claimed in claim 1, wherein the composite distribution model is continuous and wherein the set of transform coefficients is continuous.

9. A method as claimed in claim 1, wherein the composite distribution model is discrete and wherein the set of transform coefficients is discrete.

10. A method as claimed in claim 1, wherein a candidate for each of the determined at least one boundary coefficient value is selected from the set of transform coefficients.

11. A method as claimed in claim 1, wherein the device operation includes at least one of: storing on a memory, transmitting to a second device, transmitting to a network, outputting to an output device, displaying on a display screen, determining image similarity between different images by comparing at least part of the composite distribution model, determining a goodness-of-fit between the composite distribution model and the set of transform coefficients, and generating an identifier which associates the composite distribution model with the set of discrete transform coefficients.

12. A method as claimed in claim 1, wherein the device operation includes at least one of: quantizing at least some of the set of transform coefficients based on the at least part of a composite distribution model; and performing lossless or lossy encoding on at least some of the set of transform coefficients based on the at least part of a composite distribution model.

13. A method as claimed in claim 1, wherein the device operation includes performing a device function on at least one of the subsets of transform coefficients which are each bounded by the at least one boundary coefficient value.

14. A method as claimed in claim 1, wherein said at least one boundary coefficient value includes at least two boundary coefficient values, and wherein the at least one further distribution model includes at least two further distribution models.

15. A method as claimed in claim 1, wherein the set of transform coefficients includes: discrete cosine transform coefficients, Laplace transform coefficients, Fourier transform coefficients, wavelet transform coefficients, or prediction residuals arising from prediction.

16. A method as claimed in claim 1, wherein the set of transform coefficients is stored in a memory of the device, or stored on a second device, or generated from a source media data.

17. A method as claimed in claim 1, wherein the at least one further distribution model is according to a truncated probability density function $$\frac{b}{2F(y_c|\theta)-1} f(y|\theta), |y| < y_c,$$

wherein the first distribution is according to a uniform distribution function $$\frac{1-b}{2(a-y_c)}, |y| > y_c,$$

wherein $y_c$ is one of the boundary coefficient values, $f(y|\theta)$ is a probability density function with parameters $\theta \in \Theta$, where $\theta$ is a vector, and $\Theta$ is a parameter space, $F(y|\theta)$ is a corresponding cumulative density function to $f(y|\theta)$, b is a probability parameter, and a represents the largest magnitude a sample y can take.

18. A method as claimed in claim 1, wherein the at least one further distribution model is according to a truncated Laplacian probability density function $$\frac{b}{1-e^{-y_c/\lambda}} \frac{1}{2\lambda} e^{-|y|/\lambda}, |y| < y_c,$$

wherein the first distribution is according to a uniform distribution function $$\frac{1-b}{2(a-y_c)}, y_c < |y| \le a,$$

wherein $y_c$ is one of the boundary coefficient values, b is a probability parameter, $\lambda$ is the parameter of the at least one further distribution model, and a represents the largest magnitude a sample y can take.

19. A method as claimed in claim 18, further comprising determining $\lambda_{y_c}$ as a maximum likelihood estimate of $\lambda$ in the truncated Laplacian probability density function for the sample set $\{Y_i : i \in S\}$ according to:
computing $$C = \frac{1}{|S|} \sum_{i \in S} |Y_i|;$$

for $i \ge 1$, computing $$\lambda_i = C + \frac{y_c \cdot e^{-y_c/\lambda_{i-1}}}{1-e^{-y_c/\lambda_{i-1}}},$$

for i=1, 2, . . . until $\lambda_i - \lambda_{i-1} < \epsilon$, where $\epsilon > 0$ is a prescribed threshold, and $\lambda_0 = C$; and
determining a final $\lambda_i$ as an approximation for $\lambda_{y_c}$.

20. A method as claimed in claim 1, wherein the composite model is according to a discrete distribution function:

$$\begin{cases} p_0 = bp \\ p_i = b(1-p)\frac{1}{2}\left[1-e^{-\frac{q}{\lambda}}\right]e^{-\frac{q}{\lambda}(|i|-1)}\Big/\left(1-e^{-\frac{q}{\lambda}K}\right) & \text{if } i = \pm 1, \pm 2, \ldots, \pm K \\ p_i = \frac{1-b}{2(a-K)} & \text{if } K < |i| \le a \end{cases}$$

wherein $1 \le K \le a$, b is a probability parameter, q is a step size, a is the largest index in a given sequence of discrete transform indices, p, $\lambda$ and K are model parameters, and K is one of the boundary coefficient values.

21. A method as claimed in claim 20, further comprising determining $\lambda_K$ as a maximum likelihood estimate of $\lambda$, for a sequence of indices $u^n = u_1, u_2, \ldots, u_n$, and $N_1(K) = \{j: 0 < |u_j| \le K\}$, according to:
computing $$C = \frac{1}{|N_1(K)|} \sum_{j \in N_1(K)} (|u_j| - 1);$$

initializing $$\lambda^{(0)} = \frac{q}{\ln\frac{1+C}{C}};$$

for $i \geq 1$, computing $$\begin{cases} C_i = C + \frac{K}{e^{Kq/\lambda^{(i-1)}} - 1} \\ \lambda^{(i)} = \frac{q}{\ln\frac{1+C_i}{C_i}} \end{cases}$$

for $i=1, 2, \ldots$ until $\lambda^{(i)} - \lambda^{(i-1)} < \in$, where $\in > 0$ is a prescribed threshold; and
determining a final $\lambda^{(i)}$ as an approximation for $\lambda_K$.

22. A method as claimed in claim 1, wherein the composite model is according to a probability density function:

$$p(y \mid \bar{y}_c, \bar{b}, \bar{\theta}) \triangleq \begin{cases} \frac{b_1}{2F(y_{c_1} \mid \theta_1) - 1} f(y \mid \theta_1) & \text{if } |y| < y_{c_1} \\ \frac{b_2}{2[F(y_{c_2} \mid \theta_2) - F(y_{c_1} \mid \theta_2)]} f(y \mid \theta_2) & \text{if } y_{c_1} < |y| < y_{c_2} \\ \vdots \\ \frac{b_l}{2[F(y_{c_l} \mid \theta_l) - F(y_{c_{l-1}} \mid \theta_l)]} f(y \mid \theta_l), & \text{if } y_{c_{l-1}} < |y| < y_{c_l} \\ \frac{b_{l+1}}{2[F(a \mid \theta_{l+1}) - F(y_{c_l} \mid \theta_{l+1})]} f(y \mid \theta_{l+1}), & \text{if } y_{c_l} < |y| \leq a \\ 0 & \text{otherwise} \end{cases}$$

wherein $l$ is the number of further distribution models included in the at least one further distribution model, $\bar{y}_c = (y_{c_1}, y_{c_2}, \ldots, y_{c_l})$ represent the at least one boundary coefficient value, $f(y|\theta)$ is a probability density function with parameters $\theta \in \Theta$, where $\theta$ is a vector, and $\Theta$ is a parameter space, $F(y|\theta)$ is a corresponding cumulative density function to $f(y|\theta)$, $\bar{b} = (b_1, b_2, \ldots, b_{l+1})$ is a probability vector with $b_{l+1}$ representing the probability for the first distribution model and each $b_i$, $1 \leq i \leq l$, representing the probability for the ith further distribution model, $\bar{\theta} = (\theta_1, \theta_2, \ldots, \theta_{l+1})$ with $\theta_{l+1}$ being the parameter of the first distribution model and each $\theta_i$, $1 \leq i \leq l$, being the parameter of the ith further distribution model, and a represents the largest magnitude a sample y can take.

23. A method as claimed in claim 1, wherein the composite model is according to a discrete distribution function:

$$p_i(\bar{K}, \bar{\lambda}, \bar{b}) \triangleq \begin{cases} b_0 & \text{if } i = 0 \\ \frac{b_1}{2} e^{-\frac{q}{\lambda_1}(|i|-1)} \frac{1 - e^{-\frac{q}{\lambda_1}}}{1 - e^{-\frac{q}{\lambda_1} K_1}} & \text{if } 0 < |i| \leq K_1 \\ \frac{b_2}{2} e^{-\frac{q}{\lambda_2}(|i|-K_1-1)} \frac{1 - e^{-\frac{q}{\lambda_2}}}{1 - e^{-\frac{q}{\lambda_2}[K_2 - K_1]}} & \text{if } K_1 < |i| \leq K_2 \\ \vdots \\ \frac{b_{l+1}}{2} e^{-\frac{q}{\lambda_{l+1}}(|i|-K_l-1)} \frac{1 - e^{-\frac{q}{\lambda_{l+1}}}}{1 - e^{-\frac{q}{\lambda_{l+1}}[a - K_l]}} & \text{if } K_l < |i| \leq a \\ 0 & \text{otherwise} \end{cases}$$

where $\bar{K} = (K_1, \ldots, K_l)$ with $K_0 = 0 < K_1 < K_2 < \ldots < K_l < K_{l+1} = a$, $\bar{\lambda} = (\lambda_1, \ldots, \lambda_l, \lambda_{l+1})$ with $\lambda_i \geq 0$, $\bar{b} = (b_0, b_1, \ldots, b_{l+1})$ with $b_i \leq 0$ and $b_0 + b_1 + \ldots + b_{l+1} = 1$, wherein $\bar{b}$ is a probability vector parameter, $l$ is the number of further distribution models included in the at least one further distribution model, q is a step size, a is the largest index in a given sequence of discrete transform indices, $\bar{K}$, $\bar{\lambda}$, and $\bar{b}$ are model parameters, and $\bar{K}$ represents the boundary coefficient values.

24. A method as claimed in claim 23, further comprising estimating $K_1$, $b_1$, and $\lambda_1$ using a greedy algorithm by:
initializing $K_1$;
recursively growing the segment bounded by $K_1$ by padding each sample immediately adjacent to that segment into that segment until that sample and that segment are deemed to come from different models;
selecting $K_1$ as the magnitude of the second last padded sample; and
determining $b_1$ and $\lambda_1$ based on all samples falling within the segement bounded by $K_1$.

25. A method as claimed in claim 24, further comprising determining l and the remaining values in $\bar{K}$, $\bar{\lambda}$, and $\bar{b}$ by repeatedly applying said greedy algorithm to the remaining samples which do not fall within segments bounded by all $K_i$ determined already until there are no more remaining samples.

26. A method as claimed in claim 1, wherein the composite model is according to a probability density function:

$$p(y \mid \bar{y}_c, \bar{b}, \bar{\lambda}) \triangleq \begin{cases} \frac{b_1}{1 - e^{-y_{c_1}/\lambda_1}} \frac{1}{2\lambda_1} e^{-\frac{|y|}{\lambda_1}} & \text{if } |y| < y_{c_1} \\ \frac{b_2}{1 - e^{-(y_{c_2} - y_{c_1})/\lambda_2}} \frac{1}{2\lambda_2} e^{-\frac{|y| - y_{c_1}}{\lambda_2}} & \text{if } y_{c_1} < |y| < y_{c_2} \\ \vdots \\ \frac{b_{l+1}}{1 - e^{-(y_{c_{l+1}} - y_{c_l})/\lambda_{l+1}}} \frac{1}{2\lambda_{l+1}} e^{-\frac{|y| - y_{c_l}}{\lambda_{l+1}}} & \text{if } y_{c_l} < |y| \leq a \\ 0 & \text{otherwise.} \end{cases}$$

wherein $l$ is the number of further distribution models included in the at least one further distribution model, $\bar{y}_c = (y_{c_1}, y_{c_2}, \ldots, y_{c_l})$ represents the at least one boundary coefficient value, $\bar{b} = (b_1, b_2, \ldots b_{l+1})$ is a probability vector with $b_{l+1}$ representing the probability for the first distribution model and each $b_i$, $1 \leq i \leq l$, representing the probability for the ith further distribution mode with $b_i \leq 0$ and $b_1 + b_2 + \ldots + b_l + b_{l+1} = 1$, $\bar{\lambda} = (\lambda_1, \lambda_2, \ldots, \lambda_{l+1})$ with $\lambda_{l+1}$ being the parameter of the first distribution model and each $\lambda_i$, $1 \leq i \leq l$, being the parameter of the ith further distribution model with $\lambda_i > 0$, $i = 1, 2, \ldots, l+1$, and a represents the largest magnitude a sample y can take.

27. A method as claimed in claim 26, further comprising estimating $y_{c_1}$, $b_1$, and $\lambda_1$ using a greedy algorithm by:
initializing $y_{c_1}$;
recursively growing the segment bounded by $y_{c_1}$ by padding each sample immediately adjacent to that segment into that segment until that sample and that segment are deemed to come from different models;
selecting $y_{c_1}$ as the magnitude of the second last padded sample; and
determining $b_1$ and $\lambda_1$ based on all samples falling within the segement bounded by $y_{c_1}$.

28. A method as claimed in claim 27, further comprising determining l and the remaining values in $\bar{y}_c$, $\bar{b}$, and $\bar{\lambda}$ by repeatedly applying said greedy algorithm to the remaining samples which do not fall within segments bounded by all $y_{c_i}$ already until there are no more remaining samples.

29. A device, comprising:
   memory;
   a component configured to access a set of transform coefficients; and
   a processor configured to execute instructions stored in the memory in order to:
   determine at least one boundary coefficient value,
   determine one or more parameters for a first distribution model for transform coefficients of the set the magnitudes of which are greater than one of the boundary coefficient values,
   determine parameters for at least one further distribution model for transform coefficients of the set the magnitudes of which are less than the one of the boundary coefficient values, and
   perform a device operation on at least part of a composite distribution model which is a composite of the first distribution model and the at least one further distribution model having the respective determined parameters.

30. A non-transitory computer readable medium containing instructions executable by a processor of a device for a set of transform coefficients, the instructions comprising:
   instructions for determining at least one boundary coefficient value;
   instructions for determining one or more parameters for a first distribution model for transform coefficients of the set the magnitudes of which are greater than one of the boundary coefficient values;
   instructions for determining parameters for at least one further distribution model for transform coefficients of the set the magnitudes of which are less than the one of the boundary coefficient values; and
   instructions for performing a device operation on at least part of a composite distribution model which is a composite of the first distribution model and the at least one further distribution model having the respective determined parameters.

* * * * *

UNITED STATES PATENT AND TRADEMARK OFFICE
CERTIFICATE OF CORRECTION

PATENT NO.         : 9,245,354 B2
APPLICATION NO.    : 14/273636
DATED              : January 26, 2016
INVENTOR(S)        : En-hui Yang et al.

It is certified that error appears in the above-identified patent and that said Letters Patent is hereby corrected as shown below:

Claims

Claim 17, Column 47, line 62, cancel the text beginning with "wherein" to and ending "take." in Column 47, line 67, and insert --wherein $y_c$ is one of the boundary coefficient values, $f(y|\theta)$ is a probability density function with parameters $\theta \in \Theta$, where $\theta$ is a vector, and $\Theta$ is a parameter space, $F(y|\theta)$ is a corresponding cumulative density function to $f(y|\theta)$, b is a probability parameter, and $a$ represents the largest magnitude a sample $y$ can take.--.

Claim 18, Column 48, line 17, cancel the text beginning with "wherein" to and ending "take." in Column 48, line 20, and insert --wherein $y_c$ is one of the boundary coefficient values, b is a probability parameter, $\lambda$ is the parameter of the at least one further distribution model, and $a$ represents the largest magnitude a sample $y$ can take.--.

Claim 20, Column 48, line 52, cancel the text beginning with "wherein" to and ending "values." in Column 48, line 55, and insert --wherein $1 \leq K \leq a$, b is a probability parameter, q is a step size, $a$ is the largest index in a given sequence of discrete transform indices, $p$, $\lambda$ and $K$ are model parameters, and $K$ is one of the boundary coefficient values.--.

Claim 21, Column 49, line 17, after the word "until" delete the expression "$\lambda^{(i)} - \lambda^{(i-1)}) < \in$, where $\in >$ 0" and replace with the expression "$\lambda^{(i)} - \lambda^{(i-1)} < \varepsilon$, where $\varepsilon > 0$".

Claim 22, Column 49, line 20, cancel the text starting with "22. A method as" to and ending "can take." in Column 49, line 50, and insert the following claim:

--22. A method as claimed in claim 1, wherein the composite model is according to a probability density function:

Signed and Sealed this
Second Day of August, 2016

Michelle K. Lee
*Director of the United States Patent and Trademark Office*

$$p(y|\bar{y}_c, \bar{b}, \bar{\theta})$$
$$\triangleq \begin{cases} \frac{b_1}{2F(y_{c_1}|\theta_1)-1} f(y|\theta_1) & if \ |y| < y_{c_1} \\ \frac{b_2}{2[F(y_{c_2}|\theta_2)-F(y_{c_1}|\theta_2)]} f(y|\theta_2) & if \ y_{c_1} < |y| < y_{c_2} \\ \vdots & \\ \frac{b_l}{2[F(y_{c_l}|\theta_l)-F(y_{c_{l-1}}|\theta_l)]} f(y|\theta_l), & if \ y_{c_{l-1}} < |y| < y_{c_l} \\ \frac{b_{l+1}}{2[F(a|\theta_{l+1})-F(y_{c_l}|\theta_{l+1})]} f(y|\theta_{l+1}), & if \ y_{c_l} < |y| \leq a \\ 0 & otherwise \end{cases}$$

wherein $l$ is the number of further distribution models included in the at least one further distribution model, $\bar{y}_c = (y_{c_1}, y_{c_2}, \cdots, y_{c_l})$ represent the at least one boundary coefficient value, $f(y|\theta)$ is a probability density function with parameters $\theta \in \Theta$, where $\theta$ is a vector, and $\Theta$ is a parameter space, $F(y|\theta)$ is a corresponding cumulative density function to $f(y|\theta)$, $\bar{b} = (b_1, b_2, \cdots, b_{l+1})$ is a probability vector with $b_{l+1}$ representing the probability for the first distribution model and each $b_i$, $1 \leq i \leq l$, representing the probability for the $i$th further distribution model, $\bar{\theta} = (\theta_1, \theta_2, \cdots, \theta_{l+1})$ with $\theta_{l+1}$ being the parameter of the first distribution model and each $\theta_i$, $1 \leq i \leq l$, being the parameter of the $i$th further distribution model, and $a$ represents the largest magnitude a sample $y$ can take.--.

Claim 23, Column 49, line 51, cancel the text starting with "23. A method as" to and ending "coefficient values." in Column 50, line 9, and insert the following claim:

--23. A method as claimed in claim 1, wherein the composite model is according to a discrete distribution function:

$$p_i(\bar{K}, \bar{\lambda}, \bar{b})$$
$$\triangleq \begin{cases} b_0 & if \ i = 0 \\ \frac{b_1}{2} e^{-\frac{q}{\lambda_1}(|i|-1)} \frac{1-e^{-\frac{q}{\lambda_1}}}{1-e^{-\frac{q}{\lambda_1}K_1}} & if \ 0 < |i| \leq K_1 \\ \frac{b_2}{2} e^{-\frac{q}{\lambda_2}(|i|-K_1-1)} \frac{1-e^{-\frac{q}{\lambda_2}}}{1-e^{-\frac{q}{\lambda_2}(K_2-K_1)}} & if \ K_1 < |i| \leq K_2 \\ \vdots & \\ \frac{b_{l+1}}{2} e^{-\frac{q}{\lambda_{l+1}}(|i|-K_l-1)} \frac{1-e^{-\frac{q}{\lambda_{l+1}}}}{1-e^{-\frac{q}{\lambda_{l+1}}(a-K_l)}} & if \ K_l < |i| \leq a \\ 0 & otherwise \end{cases}$$

where $\bar{K} = (K_1, \cdots, K_l)$ with $K_0 = 0 < K_1 < K_2 < \cdots < K_l < K_{l+1} = a$, $\bar{\lambda} = (\lambda_1, \cdots, \lambda_l, \lambda_{l+1})$ with $\lambda_i \geq 0$, $\bar{b} = (b_0, b_1, \cdots, b_{l+1})$ with $b_i \geq 0$ and $b_0 + b_1 + \cdots + b_{l+1} = 1$, wherein $\bar{b}$ is a probability vector parameter, $l$ is the number of further distribution models included in the at least one further distribution model, q is a step size, $a$ is the largest index in a given sequence of discrete transform indices, $\bar{K}$, $\bar{\lambda}$, and $\bar{b}$ are model parameters, and $\bar{K}$ represents the boundary coefficient values.--.

CERTIFICATE OF CORRECTION (continued)
U.S. Pat. No. 9,245,354 B2

Claim 25, Column 50, line 21, cancel the text starting with "25. A method as" to and ending "samples." in Column 50, line 26, and insert the following claim:

--25. A method as claimed in claim 24, further comprising determining $l$ and the remaining values in $\bar{K}$, $\bar{\lambda}$, and $\bar{b}$ by repeatedly applying said greedy algorithm to the remaining samples which do not fall within segments bounded by all $K_i$ determined already until there are no more remaining samples.--.

Claim 26, Column 50, line 27, cancel the text starting with "26. A method as" to and ending "can take." in Column 50, line 53, and insert the following claim:

--26. A method as claimed in claim 1, wherein the composite model is according to a probability density function:

$$p(y|\bar{y}_c, \bar{b}, \bar{\lambda}) \triangleq \begin{cases} \frac{b_1}{1-e^{-y_{c_1}/\lambda_1}} \frac{1}{2\lambda_1} e^{-\frac{|y|}{\lambda_1}} & \text{if } |y| < y_{c_1} \\ \frac{b_2}{1-e^{-(y_{c_2}-y_{c_1})/\lambda_2}} \frac{1}{2\lambda_2} e^{-\frac{|y|-y_{c_1}}{\lambda_2}} & \text{if } y_{c_1} < |y| < y_{c_2} \\ \vdots \\ \frac{b_{l+1}}{1-e^{-(y_{c_{l+1}}-y_{c_l})/\lambda_{l+1}}} \frac{1}{2\lambda_{l+1}} e^{-\frac{|y|-y_{c_l}}{\lambda_{l+1}}} & \text{if } y_{c_l} < |y| \leq a \\ 0 & \text{otherwise.} \end{cases}$$

wherein $l$ is the number of further distribution models included in the at least one further distribution model, $\bar{y}_c = (y_{c_1}, y_{c_2}, \cdots, y_{c_l})$ represents the at least one boundary coefficient value, $\bar{b} = (b_1, b_2, \cdots, b_{l+1})$ is a probability vector with $b_{l+1}$ representing the probability for the first distribution model and each $b_i$, $1 \leq i \leq l$, representing the probability for the $i$th further distribution mode with $b_i \geq 0$ and $b_1 + b_2 + \cdots + b_l + b_{l+1} = 1$, $\bar{\lambda} = (\lambda_1, \lambda_2, \cdots, \lambda_{l+1})$ with $\lambda_{l+1}$ being the parameter of the first distribution model and each $\lambda_i$, $1 \leq i \leq l$, being the parameter of the $i$th further distribution model with $\lambda_i \geq 0$, $i = 1, 2, \cdots, l+1$, and $a$ represents the largest magnitude a sample $y$ can take.--.

Claim 28, Column 50, line 66, delete the letter "1" and insert "$l$"; Column 51, line 1, after the variable "$y_{c_l}$" add the word --determined--.